US012261298B2

(12) United States Patent
Wang et al.

(10) Patent No.: US 12,261,298 B2
(45) Date of Patent: Mar. 25, 2025

(54) POLYMER-INORGANIC SOLID-ELECTROLYTE INTERPHASE FOR STABLE METAL BATTERIES UNDER LEAN ELECTROLYTE CONDITIONS

(71) Applicant: THE PENN STATE RESEARCH FOUNDATION, University Park, PA (US)

(72) Inventors: Donghai Wang, University Park, PA (US); Tom Mallouk, University Park, PA (US); Yue Gao, University Park, PA (US)

(73) Assignee: The Penn State Research Foundation, University Park, PA (US)

(*) Notice: Subject to any disclaimer, the term of this patent is extended or adjusted under 35 U.S.C. 154(b) by 699 days.

(21) Appl. No.: 17/437,202

(22) PCT Filed: Mar. 9, 2020

(86) PCT No.: PCT/US2020/021677
§ 371 (c)(1),
(2) Date: Sep. 8, 2021

(87) PCT Pub. No.: WO2020/185664
PCT Pub. Date: Sep. 17, 2020

(65) Prior Publication Data
US 2022/0173396 A1 Jun. 2, 2022

Related U.S. Application Data

(60) Provisional application No. 62/815,596, filed on Mar. 8, 2019.

(51) Int. Cl.
*H01M 4/60* (2006.01)
*H01M 4/38* (2006.01)
(Continued)

(52) U.S. Cl.
CPC .......... *H01M 4/602* (2013.01); *H01M 4/382* (2013.01); *H01M 4/8668* (2013.01);
(Continued)

(58) Field of Classification Search
CPC .... H01M 4/602; H01M 4/382; H01M 4/8668; H01M 10/0525; H01M 10/0562; H01M 10/44

See application file for complete search history.

(56) References Cited

U.S. PATENT DOCUMENTS

2002/0086206 A1 7/2002 Fauteux et al.
2014/0134480 A1 5/2014 Khasanov et al.
(Continued)

FOREIGN PATENT DOCUMENTS

WO 2018118951 A1 6/2018

OTHER PUBLICATIONS

International Search Report and Written Opinion mailed Jun. 12, 2020 in PCT/US2020/021677 (11 pages).
(Continued)

*Primary Examiner* — Karie O'Neill Apicella
(74) *Attorney, Agent, or Firm* — Meunier Carlin & Curfman LLC

(57) ABSTRACT

Disclosed is a reactive polymer composite comprising a reactive functionalized polymer having a main polymer chain with functionalization along the main polymer chain, wherein the functionalization comprises one or more functional groups that are configured to react with a metal electrode to form a polymeric metal salt and one, or more functional groups configured to electrochemically decompose. Also disclosed are electrodes and batteries comprising the same. Also disclosed are methods of making the same.

27 Claims, 36 Drawing Sheets

(51) Int. Cl.
    *H01M 4/86* (2006.01)
    *H01M 10/0525* (2010.01)
    *H01M 10/0562* (2010.01)
    *H01M 10/44* (2006.01)

(52) U.S. Cl.
    CPC ... *H01M 10/0525* (2013.01); *H01M 10/0562* (2013.01); *H01M 10/44* (2013.01); *H01M 2300/0065* (2013.01)

(56) References Cited

U.S. PATENT DOCUMENTS

| | | |
|---|---|---|
| 2016/0141598 A1 | 5/2016 | Dai et al. |
| 2016/0336599 A1 | 11/2016 | Perng et al. |
| 2019/0036162 A1* | 1/2019 | Oh .................. C08K 5/0025 |

OTHER PUBLICATIONS

Aurbach, D. Review of selected electrode-solution interactions which determine the performance of Li and Li ion batteries. J. Power Sources 89, 206-218 (2000).

Aurbach, D., Zinigrad, E., Cohen, Y. & Teller, H. A short review of failure mechanisms of lithium metal and lithiated graphite anodes in liquid electrolyte solutions. Solid State Ionics 148, 405-416 (2002).

Basile, A., Bhatt, A. I. & O'Mullane, A. P. Stabilizing lithium metal using ionic liquids for long-lived batteries. Nat. Commun. 7, ncomms11794 (2016).

Carpick, R. W., Ogletree, D. F. & Salmeron,M. and Friction vs Load Measurements. 400, 395-400 (1999).

Chen, S. et al. Functional Organosulfide Electrolyte Promotes an Alternate Reaction Pathway to Achieve High Performance in Lithium-Sulfur Batteries. Angew. Chemie Int. Ed. 55, 4231-4235 (2016).

Cheng, X. B., Zhang, R., Zhao, C. Z. & Zhang, Q. Toward Safe Lithium Metal Anode in Rechargeable Batteries: A Review. Chem. Rev. 117, 10403-10473 (2017).

Cheng, X.-B. et al. Nanodiamonds suppress the growth of lithium dendrites. Nat. Commun. 8, 336 (2017).

Choi, N. S. et al. Challenges facing lithium batteries and electrical double-layer capacitors. Angew. Chemie—Int. Ed. 51, 9994-10024 (2012).

Choi, S. M. et al. Cycling characteristics of lithium metal batteries assembled with a surface modified lithium electrode. J. Power Sources 244, 363-368 (2013).

Ding, F. et al. Dendrite-Free Lithium Deposition via Self-Healing Electrostatic Shield Mechanism. J. Am. Chem. Soc. 135, 4450-4456 (2013).

Dudney, N. J. Addition of a thin-film inorganic solid electrolyte (Lipon) as a protective film in lithium batteries with a liquid electrolyte. J. Power Sources 89, 176-179 (2000).

Ebenstein, D. M. & Wahl, K. J. A comparison of JKR-based methods to analyze quasi-static and dynamic indentation force curves. J. Colloid Interface Sci. 298, 652-62 (2006).

El Ouatani, L. et al., The Effect of Vinylene Carbonate Additive on Surface Film Formation on Both Electrodes in Li-Ion Batteries. J. Electrochem. Soc. 156, A103 (2009).

Fan, X. et al. Non-flammable electrolyte enables Li-metal batteries with aggressive cathode chemistries. Nat. Nanotechnol. 1-8 (2018).

Foroozan, T. et al. Synergistic Effect of Graphene Oxide for Impeding the Dendritic Plating of Li. Adv. Funct. Mater. 28, 1705917 (2018).

Fujigaya, Tsuyohiko, et al., New photoresist materials for 157-nm lithography. poly [vinylsulfonyl fluoride-co-4-(1, 1, 1, 3, 3, 3-hexafluoro-2-hydroxypropyl)-styrene] partially protected with tert-butoxycarbonyl. Chemistry of materials 15.7 (2003): 1512-1517.

Gao, Y. et al. General Method of Manipulating Formation, Composition, and Morphology of Solid-Electrolyte Interphases for Stable Li-Alloy Anodes. J. Am. Chem. Soc. 139, 17359-17367 (2017).

Gao, Y. et al. Interfacial Chemistry Regulation via a Skin-Grafting Strategy Enables High-Performance Lithium-Metal Batteries. J. Am. Chem. Soc. 139, 15288-15291 (2017).

Gao, Y. et al. Salt-Based Organic-Inorganic Nanocomposites: Towards A Stable Lithium Metal/Li10GeP2S12 Solid Electrolyte Interface. Angew. Chemie Int. Ed. 57, 13608-13612 (2018).

Goodenough, J. B. & Park, K.-S. S. The Li-ion rechargeable battery: A perspective. J. Am. Chem. Soc. 135, 1167-76 (2013).

Greaves, G. N., Greer, A. L., Lakes, R. S. & Rouxel, T. Poisson's ratio and modern materials. Nat. Mater. 10, 823-837 (2011).

Green, C. P. & Sader, J. E. Frequency response of cantilever beams immersed in viscous fluids near a solid surface with applications to the atomic force microscope. J. Appl. Phys. 98, 114913 (2005).

Kazyak, E., Wood, K. N. & Dasgupta, N. P. Improved Cycle Life and Stability of Lithium Metal Anodes through Ultrathin Atomic Layer Deposition Surface Treatments. Chem. Mater. 27, 6457-6462 (2015).

Kim, H. et al. Metallic anodes for next generation secondary batteries. Chem. Soc. Rev. 42, 9011-34 (2013).

Kovtyukhova, N. I. et al. Layer-by-Layer Assembly of Ultrathin Composite Films from Micron-Sized Graphite Oxide Sheets and Polycations. Chem. Mater. 11, 771-778 (1999).

Kuznetsov, V. et al. Wet Nanoindentation of the Solid Electrolyte Interphase on Thin Film Si Electrodes. ACS Appl. Mater. Interfaces 7, 23554-23563 (2015).

Li, G. et al. Organosulfide-plasticized solid-electrolyte interphase layer enables stable lithium metal anodes for long-cycle lithium-sulfur batteries. Nat. Commun. 8, 850 (2017).

Li, G. et al. Stable metal battery anodes enabled by polyethylenimine sponge hosts by way of electrokinetic effects. Nat. Energy 3, 1076-1083 (2018).

Li, N.-W., Yin, Y.-X., Yang, C.-P. & Guo, Y.-G. An Artificial Solid Electrolyte Interphase Layer for Stable Lithium Metal Anodes. Adv. Mater. 28, 1853-1858 (2016).

Li, Y. et al. Atomic structure of sensitive battery materials and interfaces revealed by cryo-electron microscopy. Science (80-. ). 358, 506-510 (2017).

Liang, X. et al. A facile surface chemistry route to a stabilized lithium metal anode. Nat. Energy 6, 17119 (2017).

Lin, D. et al. Layered reduced graphene oxide with nanoscale interlayer gaps as a stable host for lithium metal anodes. Nat. Nanotechnol. 11, 626-632 (2016).

Lin, D., Liu, Y. & Cui, Y. Reviving the lithium metal anode for high-energy batteries. Nat. Nanotechnol. 12, 194-206 (2017).

Liu, K. et al. Lithium Metal Anodes with an Adaptive "Solid-Liquid" Interfacial Protective Layer. J. Am. Chem. Soc. 139, 4815-4820 (2017).

Lu, Y., Korf, K., Kambe, Y., Tu, Z. & Archer, L. A. Ionic-liquid-nanoparticle hybrid electrolytes: Applications in lithium metal batteries. Angew. Chemie—Int. Ed. 53, 488-492 (2014).

Lu, Y., Tu, Z. & Archer, L. A. Stable lithium electrodeposition in liquid and nanoporous solid electrolytes. Nat. Mater. 13, 961-969 (2014).

Markevich, E., Salitra, G. & Aurbach, D. Fluoroethylene Carbonate as an Important Component for the Formation of an Effective Solid Electrolyte Interphase on Anodes and Cathodes for Advanced Li-Ion Batteries. ACS Energy Lett. 2, 1337-1345 (2017).

Meyer, B. M., Leifer, N., Sakamoto, S., Greenbaum, S. G. & Grey, C. P. High Field Multinuclear NMR Investigation of the SEI Layer in Lithium Rechargeable Batteries. Electrochem. Solid-State Lett. 8, A145 (2005).

Peled, E. & Menkin, S. Review—SEI: Past, Present and Future. J. Electrochem. Soc. 164, A1703-A1719 (2017).

Piétrement, O. & Troyon, M. General equations describing elastic indentation depth and normal contact stiffness versus load. J. Colloid Interface Sci. 226, 166-171 (2000).

Qian, J. et al. High rate and stable cycling of lithium metal anode. Nat. Commun. 6, 6362 (2015).

Sacci, R. L. et al. Direct visualization of initial SEI morphology and growth kinetics during lithium deposition by in situ electrochemical transmission electron microscopy. Chem. Commun. 50, 2104 (2014).

(56) References Cited

OTHER PUBLICATIONS

Suo, L., Hu, Y.-S., Li, H., Armand, M. & Chen, L. A new class of Solvent-in-Salt electrolyte for high-energy rechargeable metallic lithium batteries. Nat. Commun. 4, 1481 (2013).

Tarascon, J. M. & Armand, M. Issues and challenges facing rechargeable lithium batteries. Nature 414, 359-67 (2001).

Tikekar, M. D., Choudhury, S., Tu, Z. & Archer, L. A. Design principles for electrolytes and interfaces for stable lithium-metal batteries. Nat. Energy 1, 16114 (2016).

Tu, Z. et al. Designing Artificial Solid-Electrolyte Interphases for Single-Ion and High-Efficiency Transport in Batteries. Joule 1, 394-406 (2017).

Tung, S.-O., Ho, S., Yang, M., Zhang, R. & Kotov, N. A. A dendrite-suppressing composite ion conductor from aramid nanofibres. Nat. Commun. 6, 6152 (2015).

Wang, X. et al. New Insights on the Structure of Electrochemically Deposited Lithium Metal and Its Solid Electrolyte Interphases via Cryogenic TEM. Nano Lett. 17, 7606-7612 (2017).

Xu, W. et al. Lithium metal anodes for rechargeable batteries. Energy Environ. Sci. 7, 513-537 (2014).

Yan, K. et al. Selective deposition and stable encapsulation of lithium through heterogeneous seeded growth. Nat. Energy 1, 16010 (2016).

Ye, H. et al. Stable Li Plating/Stripping Electrochemistry Realized by a Hybrid Li Reservoir in Spherical Carbon Granules with 3D Conducting Skeletons. J. Am. Chem. Soc. 139, 5916-5922 (2017).

Zachman, M. J., Tu, Z., Choudhury, S., Archer, L. A. & Kourkoutis, L. F. Cryo-STEM mapping of solid-liquid interfaces and dendrites in lithium-metal batteries. Nature 560, 345-349 (2018).

Zhang, H. et al. Electrolyte additives for lithium metal anodes and rechargeable lithium metal batteries: progresses and perspectives. Angew. Chemie Int. Ed. (2018). doi:dx.doi.org/10.1002/anie.201712702.

Zhang, Y. et al. Dendrite-free lithium deposition with self-aligned nanorod structure. Nano Lett. 14, 6889-6896 (2014).

Zhao, J. et al. Surface Fluorination of Reactive Battery Anode Materials for Enhanced Stability. J. Am. Chem. Soc. 139, 11550-11558 (2017).

Zheng, J. et al. Electrolyte additive enabled fast charging and stable cycling lithium metal batteries. Nat. Energy 2, 17012 (2017).

International Preliminary Report on Patentability issued for Application No. PCT/US2020/021677, dated Sep. 23, 2021.

* cited by examiner

POLYMER-INORGANIC SOLID-ELECTROLYTE INTERPHASE FOR STABLE METAL BATTERIES UNDER LEAN ELECTROLYTE CONDITIONS

CROSS-REFERENCE TO RELATED APPLICATIONS

This application is a United States National Phase Patent Application if International Patent Application Number PCT/US2020/021677, filed on Mar. 9, 2020, which claims benefit of U.S. Provisional Application No. 62/815,596, filed Mar. 8, 2019, which are hereby incorporated herein by reference in their entirety.

STATEMENT ACKNOWLEDGING GOVERNMENT SUPPORT

This invention was made with government support under Grant No. DE-EE0008198 awarded by the Department of Energy and under Grant No. DMR1807116 awarded by the National Science Foundation. The Government has certain rights in the invention.

TECHNICAL FIELD

This application relates generally to metal batteries with a stable solid-electrolyte interphase.

BACKGROUND

Rechargeable battery technology based on lithium (Li) metal anodes shows great promise in meeting the energy density demand for portable electronics and electric vehicles. In Li metal batteries, the solid-electrolyte interphase (SEI) is crucial in stabilizing the Li anode, both in terms of avoiding undesirable reactions with the electrolyte and in facilitating stable Li deposition. The SEI is a salt layer on the Li surface that is formed by electrolyte decomposition at low operating potentials. Unfortunately, the SEI is mechanically unstable under the huge interfacial fluctuations and morphological changes of the Li anode and, therefore, constantly reforms upon cycling. This process consumes the electrolyte, resulting in low efficiency of Li deposition and rapid battery failure (FIG. 1A). In this process, the SEI layer becomes progressively structurally inhomogeneous, promoting uneven Li deposition and dendrite growth. Although the use of hosts and mechanically robust films can prevent dendrite growth, the SEI remains unstable, and this has become the bottleneck in Li anode technology.

Researchers have, for decades, approached this problem in two ways. A routine strategy is to replace the electrolyte-derived SEI by ex-situ fabricated protective layers such as inorganic salts, Li-alloys, and polymers. However, these layers can crack and are not reformable upon cycling, triggering Li-electrolyte reactions at the exposed surface. Another approach is to design new electrolytes (e.g., concentrated electrolytes, ionic liquids, and fluorinated electrolytes) or to use sacrificial additives with conventional electrolytes. The so-formed surface-electrolyte interphase (SEI) can reduce Li consumption, but it, nevertheless, continues to constantly consume electrolyte. Consequently, current methods have, in general, achieved cycling stability with a large excess of electrolyte (the electrolyte-to-capacity ratio is typically above 40 $\mu L\ mAh^{-1}$), which lowers the energy density of the battery.

In practical batteries, the mass and volume of electrolyte must be kept below 10 $\mu L\ mAh^{-1}$ to achieve high energy density. This requires not only a highly stable SEI layer but also strict prevention of electrolyte loss. Unfortunately, the structure and stability of the electrolyte-derived SEI are determined by the electrolyte and involve the competitive reactions of different solvents and salts. The reaction products deposit onto the Li surface in a spontaneous manner, resulting in a failure to control the composition and structure of the SEI. An approach to rationally design a stable SEI using a functional SEI precursor rather than the electrolyte is thus needed to address the problem of the unstable SEI and to enable practical Li anodes.

These needs and other needs at least partially satisfied by the present disclosure.

SUMMARY

The present disclosure is directed to a reactive polymer composite comprising a reactive functionalized polymer having a main polymer chain with functionalization along the main polymer chain, wherein the functionalization comprises one or more functional groups that are configured to react with a metal electrode to form a polymeric metal salt and one, or more functional groups configured to electrochemically decompose.

Also disclosed herein are aspects, wherein the reactive polymer composite further comprises a filler from greater than 0 to about 60 wt %. Also disclosed is the reactive polymer composite, as described in any one of the preceding aspects, wherein the main polymer chain comprises an aliphatic backbone, a polyaromatic backbone, a polycyclic backbone, a polysaccharide backbone, or any combination thereof. Further disclosed herein is the reactive polymer composite, as described in any one of the preceding aspects, wherein the one or more functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH-SO_2-F$, $N(R^1)-SF_3$ group, $SO_2-N(F)-SO_2-R^2$ group, substituted or unsubstituted fluoro-pyridinium triflate; wherein L is independently selected from null, $C_1-C_{10}$ alkyl, $C_1-C_{10}$ alkoxy, $C_6-C_{14}$ aryl, $C_1-C_{14}$ heteroaryl, $C_6-C_{14}$ aryloxy, imidazole, —NH—, pyridine, and wherein L is optionally substituted with $C_1-C_{10}$ alkyl, $C_1-C_{10}$ alkoxy, $C_2-C_{10}$ alkenyl, $C_2-C_{10}$ alkynyl, $C_6-C_{14}$ aryl, $C_1-C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein $R^1$ and $R^2$, each independent of the other, selected from hydrogen, $C_1-C_{10}$ alkyl, $C_1-C_{10}$ alkoxy, $C_6-C_{14}$ aryl, $C_1-C_{14}$ heteroaryl, $C_6-C_{14}$ aryloxy, imidazole, amine, pyridine, and wherein each of $R^1$ and $R^2$ independent of the other, is optionally substituted with $C_1-C_{10}$ alkyl, $C_1-C_{10}$ alkoxy, $C_2-C_{10}$ alkenyl, $C_2-C_{10}$ alkynyl, $C_6-C_{14}$ aryl, $C_1-C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

Yet further disclosed is the reactive polymer composite, as described in any one of the preceding aspects, wherein the filler comprises graphene oxide, reduced graphene oxide, borophene, molybdenite, silicon oxide, metal oxide, metal halides, or any combination thereof.

In yet other aspects, disclosed is the reactive polymer composite, as described in any one of the preceding aspects, wherein the reactive functionalized polymer comprises one or more monomeric units selected from:

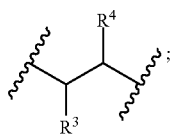

wherein

R³ is independently selected at each occurrence from an epoxide group; a cyclic acetal group; a cyclic carbonate group; and R⁴ is hydrogen; or R³ and R⁴ are brought together with the carbons to which they are attached to form a cyclic carbonate group.

Further is disclosed the reactive polymer composite, as described in any one of the preceding aspects, wherein the polymer comprises one or more of

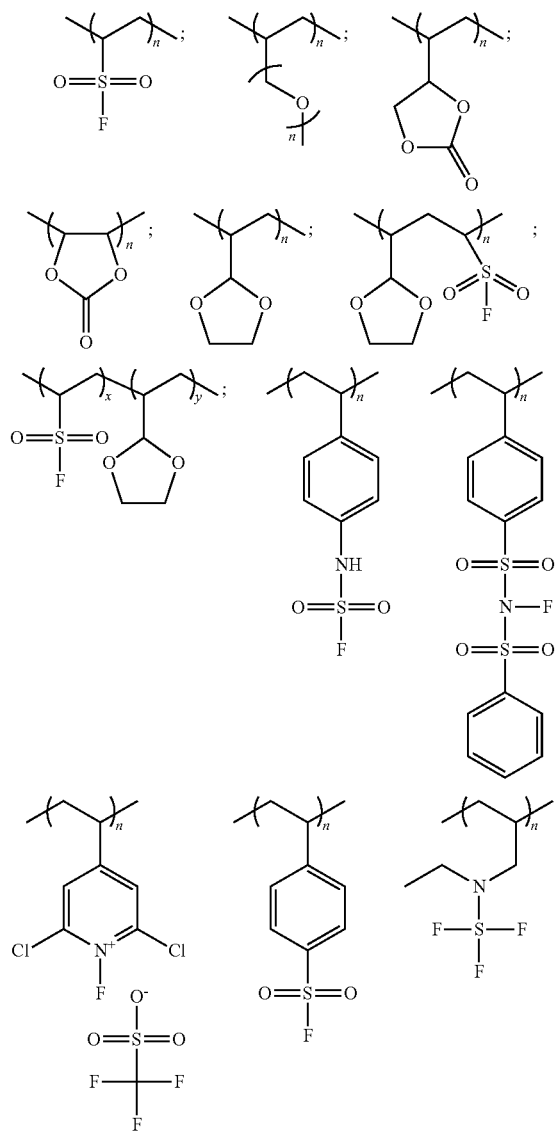

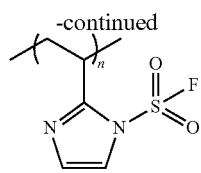

wherein n is an integer number from 1 to 100, and wherein x and y each, independently, is an integer number from 1 to 100 and present in a ration from 1:10 to 10:1.

Still further disclosed herein is the reactive polymer composite, as described in any one of the preceding aspects, wherein the metal electrode comprises lithium, sodium, zinc, or any alloys thereof. Also disclosed is the reactive polymer composite, as described in any one of the preceding aspects, wherein the reactive polymer composite is lamellar.

In yet further aspects, disclosed herein is an electrode comprising: a) an active electrode material comprising a metal; b) reactive polymer composite comprising a reactive functionalized polymer having a main polymer chain with functionalization along the main polymer chain, wherein the functionalization comprises one or more functional groups that are configured to react with a metal electrode to form a polymeric metal salt and one, or more functional groups configured to electrochemically decompose; and c) a solid-electrolyte interphase layer, wherein the solid-electrolyte interphase layer comprises the polymeric metal salt. In still further aspects, described herein as the electrode where the reactive polymer composite further comprises a filler from greater than 0 to about 60 wt %. In yet further aspects described is the electrode, as described in any one of the preceding aspects, wherein the main polymer chain comprises an aliphatic backbone, a polyaromatic backbone, a polycyclic backbone, a polysaccharide backbone, or any combination thereof.

Also disclosed is the electrode, as described in any one of the preceding aspects, wherein the one or more functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH-SO_2-F$, $N(R^1)-SF_3$ group, $SO_2-N(F)-SO_2-R^2$ group, substituted or unsubstituted fluoropyridinium triflate; wherein L is independently selected from null, $C_1-C_{10}$ alkyl, $C_1-C_{10}$ alkoxy, $C_6-C_{14}$ aryl, $C_1-C_{14}$ heteroaryl, $C_6-C_{14}$ aryloxy, imidazole, $-NH-$, pyridine, and wherein L is optionally substituted with $C_1-C_{10}$ alkyl, $C_1-C_{10}$ alkoxy, $C_2-C_{10}$ alkenyl, $C_2-C_{10}$ alkynyl, $C_6-C_{14}$ aryl, $C_1-C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein $R^1$ and $R^2$, each independent of the other, selected from hydrogen, $C_1-C_{10}$ alkyl, $C_1-C_{10}$ alkoxy, $C_6-C_{14}$ aryl, $C_1-C_{14}$ heteroaryl, $C_6-C_{14}$ aryloxy, imidazole, amine, pyridine, and wherein each of $R^1$ and $R^2$ independent of the other, is optionally substituted with $C_1-C_{10}$ alkyl, $C_1-C_{10}$ alkoxy, $C_2-C_{10}$ alkenyl, $C_2-C_{10}$ alkynyl, $C_6-C_{14}$ aryl, $C_1-C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

Yet further disclosed is the electrode, as described in any one of the preceding aspects, wherein the filler comprises graphene oxide, reduced graphene oxide, borophene, molybdenite, silicon oxide, metal oxide, metal halides, or any combination thereof.

In still further aspects disclosed is the electrode, as described in any one of the preceding aspects, wherein the reactive functionalized polymer comprises one or more monomeric units selected from:

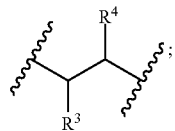

wherein

R³ is independently selected at each occurrence from an epoxide group; a cyclic acetal group; a cyclic carbonate group; and R⁴ is hydrogen; or R³ and R⁴ are brought together with the carbons to which they are attached to form a cyclic carbonate group.

Also disclosed herein is the electrode, as described in any one of the preceding aspects, wherein the polymer comprises one or more of

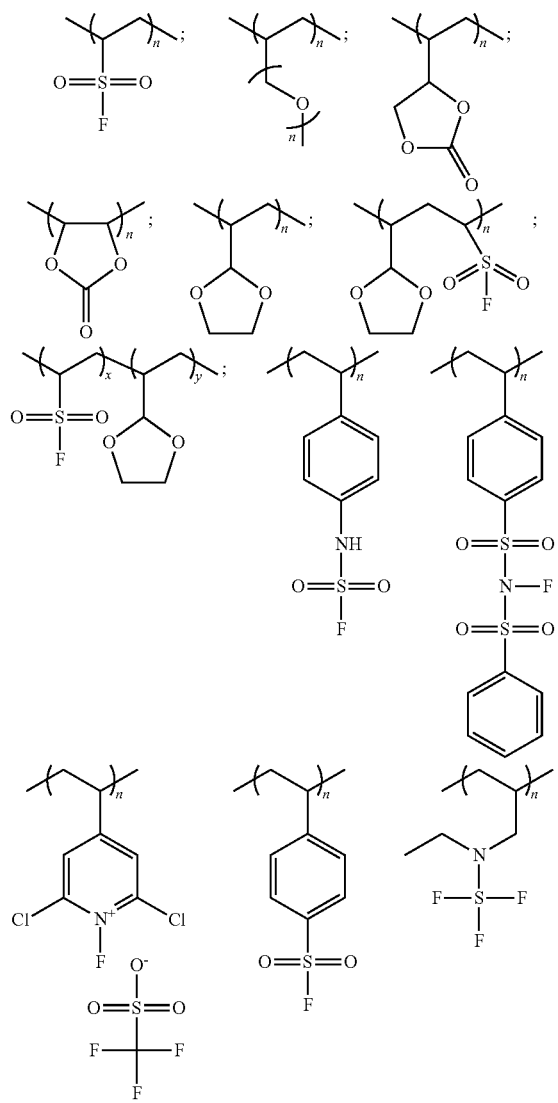

-continued

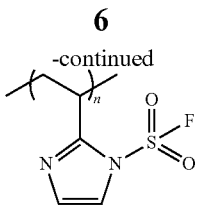

wherein n is an integer number from 1 to 100, and wherein x and y each, independently, is an integer number from 1 to 100 and present in a ration from 1:10 to 10:1.

Also is disclosed the electrode, as described in any one of the preceding aspects, wherein the reactive polymer composite is lamellar. Still further disclosed is the electrode, as described in any one of the preceding aspects, wherein the metal comprises lithium, sodium, zinc, or any alloys thereof. Further disclosed herein is the electrode, as described in any one of the preceding aspects, wherein the solid-electrolyte interphase layer further comprises one or more metal salts. Still further disclosed herein is the electrode, as described in any one of the preceding aspects, wherein the solid-electrolyte interphase layer comprises the filler. And yet still further disclosed herein is the electrode, as described in any one of the preceding aspects, wherein the solid-electrolyte interphase layer is homogeneous.

Also disclosed herein is the electrode, as described in any one of the preceding aspects, wherein the electrode is configured to maintain substantially defect-free morphology for about 600 charge/discharge cycles in an electrolyte solution. Further disclosed herein is the electrode, as described in any one of the preceding aspects, wherein the solid-electrolyte interphase layer has a thickness from about 50 nm to about 200 nm. While in other aspects, disclosed herein is the electrode, as described in any one of the preceding aspects, wherein the solid-electrolyte interphase layer is substantially stable at a temperature from about −10° C. to about 50° C. In still further aspects, disclosed herein is the electrode, as described in any one of the preceding aspects, wherein the reactive polymer composite has a thickness from about 500 nm to about 10 microns. Yet further disclosed herein is the electrode, as described in any one of the preceding aspects, wherein the electrode further comprises a 3-D host material.

Still further disclosed herein is a battery comprising: a) an anode material comprising: i) an active electrode material comprising a metal; ii) a reactive polymer composite comprising a reactive functionalized polymer having a main polymer chain with functionalization along the main polymer chain, wherein the functionalization comprises one or more functional groups that are configured to react with a metal electrode to form a polymeric metal salt and one or more functional groups configured to electrochemically decompose; and iii) a solid-electrolyte interphase layer, wherein the solid-electrolyte interphase layer comprises the polymeric metal salt; and b) an electrolyte; and c) a cathode, and wherein the battery exhibits substantially stable cycling for at least 600 cycles. Still further disclosed herein is the battery, as described in any one of the preceding aspects, wherein the reactive polymer composite further comprises a filler from greater than 0 to about 60 wt %.

Yet in further aspects, disclosed herein is the battery, as described in any one of the preceding aspects, wherein the main polymer chain comprises an aliphatic backbone, a polyaromatic backbone, a polycyclic backbone, a polysaccharide backbone, or any combination thereof. Still further disclosed herein is the battery, as described in any one of the preceding aspects, wherein the one or more functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH-SO_2-F$, $N(R^1)-SF_3$ group, $SO_2-N(F)-SO_2-R^2$ group, substituted or unsubstituted fluoropyridinium triflate; wherein L is independently selected from null, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, $-NH-$, pyridine, and wherein L is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein $R^1$ and $R^2$, each independent of the other, selected from hydrogen, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, amine, pyridine, and wherein each of $R^1$ and $R^2$ independent of the other, is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

Yet further disclosed is the battery, as described in any one of the preceding aspects, wherein the filler comprises graphene oxide, reduced graphene oxide, borophene, molybdenite, silicon oxide, metal oxide, metal halides, or any combination thereof. In still further aspects disclosed is the battery, as described in any one of the preceding aspects, wherein the reactive functionalized polymer comprises one or more monomeric units selected from:

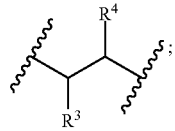

wherein
R³ is independently selected at each occurrence from an epoxide group; a cyclic acetal group; a cyclic carbonate group; and R⁴ is hydrogen; or R³ and R⁴ are brought together with the carbons to which they are attached to form a cyclic carbonate group.

Also disclosed herein is the battery, as described in any one of the preceding aspects, wherein the polymer comprises one or more of

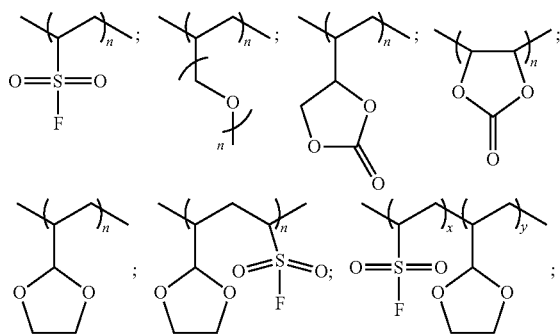

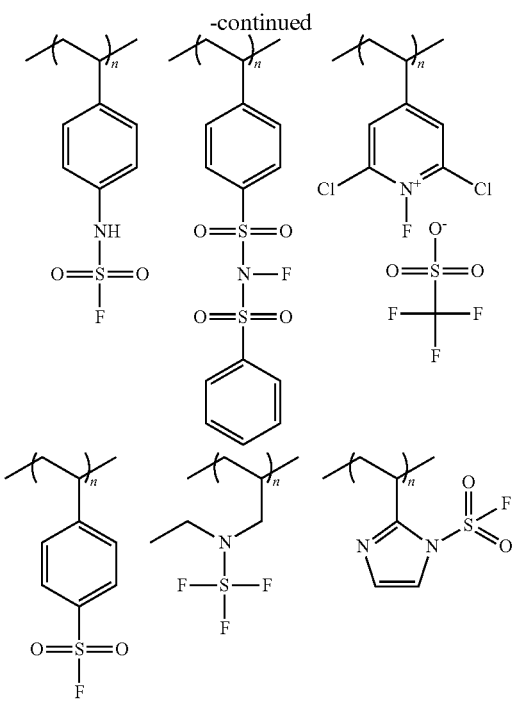

wherein n is an integer number from 1 to 100, and wherein x and y each, independently, is an integer number from 1 to 100 and present in a ration from 1:10 to 10:1.

Also disclosed herein is the battery, as described in any one of the preceding aspects, wherein the reactive polymer composite is lamellar. Still further disclosed herein is the battery, as described in any one of the preceding aspects wherein the metal comprises lithium, sodium, zinc, or any alloys thereof. Yet still further, disclosed herein is the battery, as described in any one of the preceding aspects, wherein the solid-electrolyte interphase layer further comprises one or more metal salts. In yet further aspects disclosed herein is the battery, as described in any one of the preceding aspects wherein the solid-electrolyte interphase comprises the filler. In still further aspects, disclosed herein is the battery, as described in any one of the preceding aspects, wherein the solid-electrolyte interphase layer is homogeneous.

Also disclosed herein is the battery, as described in any one of the preceding aspects, wherein the electrode is configured to maintain substantially defect-free morphology for about 600 charge/discharge cycles in the electrolyte. Further disclosed herein is the battery, as described in any one of the preceding aspects, wherein the solid-electrolyte interphase layer has a thickness from about 50 nm to about 200 nm.

Also disclosed herein is the battery, as described in any one of the preceding aspects, wherein the reactive polymer composite has a thickness from about 500 nm to about 10 microns. In yet further aspects, disclosed herein is the battery, as described in any one of the preceding aspects, wherein the electrode further comprises a 3-D host material.

In some aspects, disclosed herein is the battery, as described in any one of the preceding aspects, wherein the battery exhibits an electrolyte-to-capacity ratio of less than about 15 μL mAh$^{-1}$. Also disclosed herein is the battery, as described in any one of the preceding aspects, wherein the battery exhibits a coulombic efficiency for a metal deposition greater than about 95% when measured at a predetermined current density.

Still further disclosed herein is the battery, as described in any one of the preceding aspects, wherein the predetermined current density is from about 0.1 mAh cm$^{-2}$ to about 10 mAh cm$^{-2}$. Also disclosed herein is the battery, as described in any one of the preceding aspects, wherein the battery exhibits electrolyte retention of at least 70% after at least 100 cycles. Yet further disclosed herein is the battery, as described in any one of the preceding aspects, wherein the solid-electrolyte interphase layer is substantially stable at a temperature from about −10° C. to about 50° C.

In still further aspects, disclosed herein is a method comprising: disposing a reactive polymer composite on an active electrode material, wherein the reactive polymer composite comprises a reactive functionalized polymer having a main polymer chain with functionalization along the main polymer chain, wherein the functionalization comprises one or more functional groups that are configured to react with a metal electrode to form a polymeric metal salt and one or more functional groups configured to electrochemically decompose; and wherein the active electrode material comprises a metal; and forming an electrode comprising a solid-electrolyte interphase layer comprising the polymeric metal salt. Also disclosed is the method, wherein the reactive polymer composite further comprises a filler from greater than 0 to about 60 wt %.

Still further disclosed herein is the method, as described in any one of the preceding aspects, wherein the main polymer chain comprises an aliphatic backbone, a polyaromatic backbone, a polycyclic backbone, a polysaccharide backbone, or any combination thereof. Still further disclosed herein is the method, as described in any one of the preceding aspects, wherein the one or more functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, SO$_2$F group, NH—SO$_2$—F, N(R$^1$)—SF$_3$ group, SO$_2$—N(F)—SO$_2$—R$^2$ group, substituted or unsubstituted fluoropyridinium triflate; wherein L is independently selected from null, C$_1$-C$_{10}$ alkyl, C$_1$-C$_{10}$ alkoxy, C$_6$-C$_{14}$ aryl, C$_1$-C$_{14}$ heteroaryl, C$_6$-C$_{14}$ aryloxy, imidazole, —NH—, pyridine, and wherein L is optionally substituted with C$_1$-C$_{10}$ alkyl, C$_1$-C$_{10}$ alkoxy, C$_2$-C$_{10}$ alkenyl, C$_2$-C$_{10}$ alkynyl, C$_6$-C$_{14}$ aryl, C$_1$-C$_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein R$^1$ and R$^2$, each independent of the other, selected from hydrogen, C$_1$-C$_{10}$ alkyl, C$_1$-C$_{10}$ alkoxy, C$_6$-C$_{14}$ aryl, C$_1$-C$_{14}$ heteroaryl, C$_6$-C$_{14}$ aryloxy, imidazole, amine, pyridine, and wherein each of R$^1$ and R$^2$ independent of the other, is optionally substituted with C$_1$-C$_{10}$ alkyl, C$_1$-C$_{10}$ alkoxy, C$_2$-C$_{10}$ alkenyl, C$_2$-C$_{10}$ alkynyl, C$_6$-C$_{14}$ aryl, C$_1$-C$_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

Yet further disclosed is the method, as described in any one of the preceding aspects, wherein the filler comprises graphene oxide, reduced graphene oxide, borophene, molybdenite, silicon oxide, metal oxide, metal halides, or any combination thereof.

In still further aspects disclosed is the method, as described in any one of the preceding aspects, wherein the reactive functionalized polymer comprises one or more monomeric units selected from:

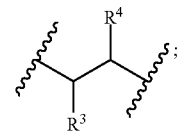

wherein
R$^3$ is independently selected at each occurrence from an epoxide group; a cyclic acetal group; a cyclic carbonate group; and R$^4$ is hydrogen; or R$^3$ and R$^4$ are brought together with the carbons to which they are attached to form a cyclic carbonate group.

Also disclosed herein is the method, as described in any one of the preceding aspects, wherein the polymer comprises one or more of

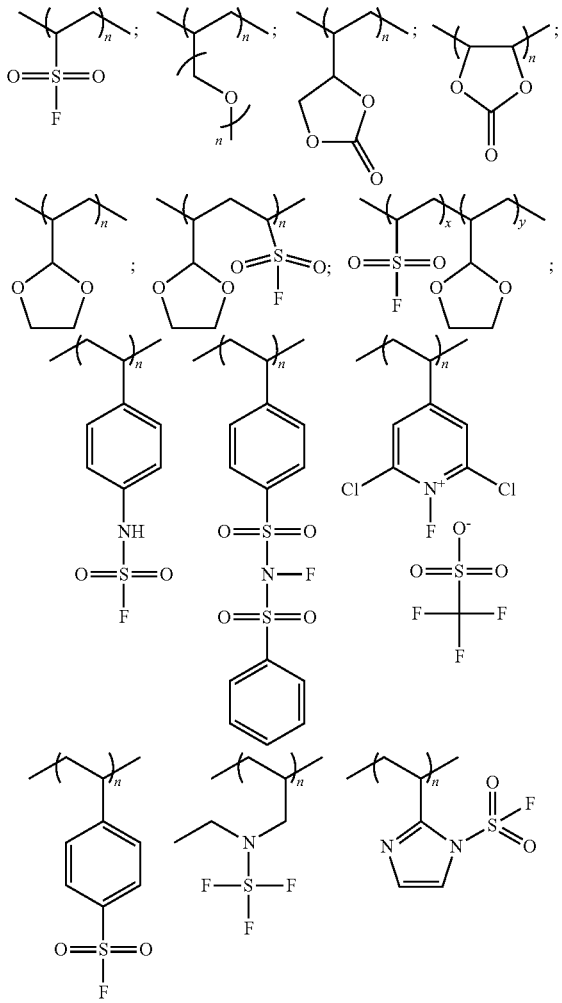

wherein n is an integer number from 1 to 100, and wherein x and y each, independently, is an integer number from 1 to 100 and present in a ration from 1:10 to 10:1. Also, disclosed herein is the method, as described in any one of the preceding aspects, wherein the reactive polymer composite is lamellar.

In still further aspects, disclosed herein is the method, as described in any one of the preceding aspects, wherein the metal comprises lithium, sodium, zinc, or any alloys thereof.

While yet in other aspects, disclosed herein is the method, as described in any one of the preceding aspects, wherein the solid-electrolyte interphase layer further comprises one or more metal salts. Still further disclosed herein is the method, as described in any one of the preceding aspects, wherein the solid-electrolyte interphase layer comprises the filler. Yet further disclosed herein is the method, as described in any one of the preceding aspects, wherein the solid-electrolyte interphase layer is homogeneous. In still further aspects, disclosed herein is the method, as described in any one of the preceding aspects, wherein the electrode is configured to maintain substantially defect-free morphology for about 600 charge/discharge cycles in an electrolyte solution.

Also disclosed herein is the method, as described in any one of the preceding aspects, wherein the solid-electrolyte interphase layer has a thickness from about 50 nm to about 200 nm. In yet other aspects, disclosed herein is the method, as described in any one of the preceding aspects, wherein the solid-electrolyte interphase layer is substantially stable at a temperature from about −10° C. to about 50° C. In still further aspects, disclosed herein is the method, as described in any one of the preceding aspects, wherein the reactive polymer composite has a thickness from about 500 nm to about 10 microns. Also, disclosed herein is the method, as described in any one of the preceding aspects, wherein the metal is deposited on a 3-D host material to form the active electrode material.

In certain aspects, also disclosed is a method comprising providing a) an electrode, as described in any one of the preceding aspects, wherein the electrode is an anode; b) an electrolyte; and c) a cathode to form a battery exhibiting substantially stable cycling for at least 600 cycles. In yet further aspects, disclosed is the method, wherein the battery exhibits an electrolyte-to-capacity ratio of less than about 15 $\mu L\,mAh^{-1}$. While yet in other aspects, disclosed herein is the method, as described in any one of the preceding aspects, wherein the battery exhibits a coulombic efficiency for a metal deposition greater than about 95% as measured at a predetermined current density. Still disclosed herein is the method, as described in any one of the preceding aspects, wherein the predetermined current density is from about 0.1 mAh $cm^{-2}$ to about 10 mAh $cm^{-2}$. Yet further disclosed herein is the method, as described in any one of the preceding aspects, wherein the battery exhibits electrolyte retention of at least 70% after at least 100 cycles.

Additional aspects of the disclosure will be set forth, in part, in the detailed description, figures, and claims which follow, and in part will be derived from the detailed description or can be learned by practice of the invention. It is to be understood that both the foregoing general description and the following detailed description are exemplary and explanatory only and are not restrictive of the invention as disclosed.

DESCRIPTION OF DRAWINGS

FIG. 1A shows a formation of electrolyte-derived SEI via electrolyte decomposition; FIG. 1B depicts a schematic of a polymer-inorganic SEI design using the RPC precursor rather than the electrolyte; and FIG. 1C depicts a schematic of the RPC-derived stable SEI in one aspect.

FIGS. 6A-6D show the evaluation of various building blocks for constructing the RPC in one aspect. The efficiencies were achieved in the Li|Cu cell with a Li deposition capacity of 1.0 mA $cm^{-2}$ at a current density of 0.5 mA $cm^{-2}$. FIGS. 6E-6F show side- and top-view SEM images of the uncycled RPC-stabilized Li, respectively.

FIG. 8A shows the efficiency of the Li|Cu cell, where GO nanosheets were coated on the surface of the Cu electrode. FIGS. 8B-8C show top-view SEM images of the surface morphology of cycled GO-coated Li electrode after 30 cycles in a carbonate electrolyte.

FIG. 9A shows XRD patterns of the RPC, P(SF-DOL), and GO sheets. FIGS. 9B-9C show the TGA curves of the RPC and P(SF-DOL), respectively. FIGS. 9D-9E show AFM indentation curves of the RPC and P(SF-DOL), respectively. FIG. 9F shows a contact angle between RPC-coated Li and 1 M $LiPF_6$ in EC/EMC electrolyte. FIG. 9G shows a high-resolution C 1s, F 1s, S 2p XPS spectra of the P(SF-DOL) polymer before (blue curves (1)) and after (red curves (2)) being mixed with GO nanosheets in an NMP solution. FIG. 9H shows a $^1$H NMR spectra of the P(SF-DOL) polymer before (blue curves (1)) and after (red curves (2)) being mixed with GO nanosheets.

FIG. 10A shows a schematic of the cycled RPC-stabilized Li in one aspect (the electrode surface is covered by an unreacted RPC layer (yellow (1)), and the RPC-derived SEI layer (green (2)) lies in between the unreacted RPC and Li, and black lines (3) represent the GO nanosheets). FIG. 10B shows high-resolution XPS spectra of the unreacted RPC in one aspect. FIG. 10C shows high-resolution XPS spectra of the RPC-derived SEI layer in one aspect (the unreacted RPC retains its chemical structure, and the SEI consists primarily of a polymer integrating side groups of —$SO_2$—Li and —C—O—Li, nanoparticles of LiF, and GO nanosheets). FIG. 10D shows a comparison of the elemental concentrations of the RPC-derived SEI and carbonate electrolyte-derived SEI in one aspect (the RPC-derived SEI containing high concentrations of C and O is predominantly organic, compared to the electrolyte-derived SEI which contains high concentrations of Li and F).

FIG. 11A shows a schematic of the surface passivating layer (red layer (1)) at the interface, which is formed by the chemical reaction between P(SF-DOL) (yellow layer (2)) and Li (grey layer (3)). FIGS. 11B-11D show high-resolution XPS spectra of the unreacted P(SF-DOL) (FIG. 11B) and delaminated interface (both the P(SF-DOL) (FIG. 11C) and Li (FIG. 11D) sides) after the reaction. LiF and a polymer with side groups of —SO$_2$—Li and —CHO$_2$(CH$_2$)$_2$—) were observed at the Li/P(SF-DOL) interface. FIG. 11E shows a schematics of the reaction between GO nanosheets and Li metal. FIG. 11F-11G show high-resolution XPS spectra of the pristine GO (FIG. 11F) and delaminated interface of GO after the reaction (FIG. 11G) —CO$_2$—Li signals were found at the interface of the delaminated GO film.

FIGS. 18A-18C show morphology of the cycled RPC-stabilized Li, observed by top- (FIG. 18A) and side-view (FIG. 18B) SEM and optical profilometry images of the surface (FIG. 18C). FIG. 18D-18F show morphology of the cycled bare Li, probed by top- (FIG. 18D) and side-view (FIG. 18E) SEM and optical profilometry images (FIG. 18F). FIG. 18G-18I show TEM images of the interface of RPC-stabilized Li. Three layers were found at the interface (FIG. 18G), recognized as the unreacted RPC, RPC-derived SEI, and Li, respectively. In the Li region (FIG. 18H), metallic Li lattice was observed (indicated by the red circles). In the RPC-derived SEI layer (FIG. 18I), an amorphous layer containing embedded LiF nanocrystals (indicated by the orange circles) was observed. FIG. 18J shows a STEM image of the interface of the RPC-stabilized Li. FIG. 18A shows a Li K-edge spectra of the boxed regions in FIG. 18J. FIG. 18L shows an EDS image based on FIG. 18J. A three-layer structure at the interface was confirmed. All the RPC-stabilized Li samples were collected after 30 exemplary cycles.

FIGS. 19A-19B show top- and side-view SEM images of the RPC-stabilized Li after 100 cycles. FIGS. 19C-19D SEM images of the RPC-stabilized Li after 20 (FIG. 19C) and 50 (FIG. 19D) cycles with a deposition capacity of 2.0 mAh cm$^{-2}$. All Li electrodes were prepared by cycling a Li|Li symmetric cell in a 1 M LiPF$_6$ in EC:EMC:FEC (3:7:1, v/v/v) electrolyte for 10 cycles. The Li plating/stripping amount is 1.0 mAh cm$^{-2}$.

FIGS. 20A-20D show elemental mapping images of C, F, and S based on FIG. 20A (top view). FIGS. 20E-20H show elemental mapping images of C, F, and S based on FIG. 20E (side view).

FIGS. 21A-21B show bare Li electrodes before (FIG. 21A) and after (FIG. 21B) cycling. FIGS. 21C-21D show the RPC-stabilized Li electrodes before (FIG. 21C) and after (FIG. 21D) cycling. The electrodes were cycled with the real capacity of 1.0 mAh cm$^{-2}$ at the current density of 1.0 mA cm$^{-2}$ and for 30 cycles.

FIGS. 22A-22B show high-resolution XPS spectra of the unreacted RPC (FIG. 22A) and RPC-derived SEI (FIG. 22B) after 200 cycles. The unreacted RPC retains the chemical structure of pristine RPC. The RPC-derived SEI mainly consists of a polymer integrating side groups of —SO$_2$—Li, —C—O—Li, and —SO$_2$—F, inorganic Li salts (LiF and LiOR), and GO nanosheets. FIG. 22C shows a comparison of the elemental concentrations of the RPC-derived SEI after 30 (orange line (1)) and 200 (blue line (2)) cycles. These two RPC-derived SEI layers show highly consistent concentrations of C, O, Li, F, and S elements. FIG. 22D shows SEM images of the surface of the RPC-stabilized Li electrodes after 200, 300, 400, and 500 cycles. The RPC-stabilized Li electrodes were cycled in a 1 M LiPF$_6$ in EC/EMC/FEC electrolyte. The Li plating/stripping amount for each cycle is 1.0 mAh cm$^{-2}$.

FIG. 23A shows an SEM image of a cycled Li anode with an unreacted RPC layer on the top surface. FIG. 23B shows an SEM image of the same piece of Li anode with exposed deposited Li on the top surface. The unreacted RPC layer was removed by DMF wash. FIG. 23C shows depth-profiling XPS spectra acquired after sputtering for 0, 60s, 120s, and 180s of a cycled Li anode with exposed deposited Li on the top surface (corresponding to FIG. 23B). The sputtering rate is ~10 nm min$^{-1}$ (calculated based on a SiO$_2$).

FIGS. 32A-32B show electrochemical impedance spectroscopy measurements of symmetric cells using RPC-stabilized (FIG. 32A) and bare (FIG. 32B) Li. FIG. 32C shows the efficiency of Li deposition in Li|3D host cells at a capacity of 4.0 mAh cm$^{-2}$.

FIG. 37A shows an illustration of the preparation process. FIGS. 37B-37D show SEM images of the bare 3D host (FIG. 37B), SEI-removed Li@3D host (FIG. 37C), and RPC-stabilized Li@3D host (FIG. 37D) electrodes. FIG. 37E shows the XPS spectra of the surface of a Li@3D host electrode. The SEI layer generated in the Li deposition step has been removed. FIG. 37F shows the XPS spectra of the surface of an RPC-stabilized Li@3D host electrode. The signals of RPC can be found on the electrode surface.

FIG. 38C shows efficiencies of Li plating and stripping on a flat stainless steel foil at a deposition amount of 1.0 mAh cm$^{-2}$. 1 M LiPF$_6$ in EC/EMC with 2% LiBOB electrolyte was used.

FIG. 40A shows the cycling stability of Li|NCM 523 cells tested under lean electrolyte (12 μL mAh$^{-1}$) and excess Li (120 μm Li foil) conditions. FIG. 40B shows the cycling stability of Li|NCM 523 cells tested under lean electrolyte (7 μL mAh$^{-1}$), limited Li excess (1.9-fold excess of Li in a 3D host), and high capacity (3.4 mAh cm$^{-2}$) conditions. FIGS. 40C-40D show a $^{19}$F NMR spectra of the electrolyte taken from cells with electrolyte-derived SEI (FIG. 40C) and RPC-derived SEI (FIG. 40D), respectively. The initial electrolyte amount, correlating with the area of PF$_6$ before cycling, was normalized to 100%. Fluorobenzene (Ref.) was used as the internal reference.

FIG. 42A shows a cell using the RPC-stabilized Li anode in a lean electrolyte. FIG. 42B shows a cell using the bare Li anode in a lean electrolyte.

FIG. 43A shows a cell using the RPC-stabilized Li@3D host anode in a lean electrolyte. FIG. 43B shows a cell using the bare Li@3D host anode in a lean electrolyte.

Figure 1:
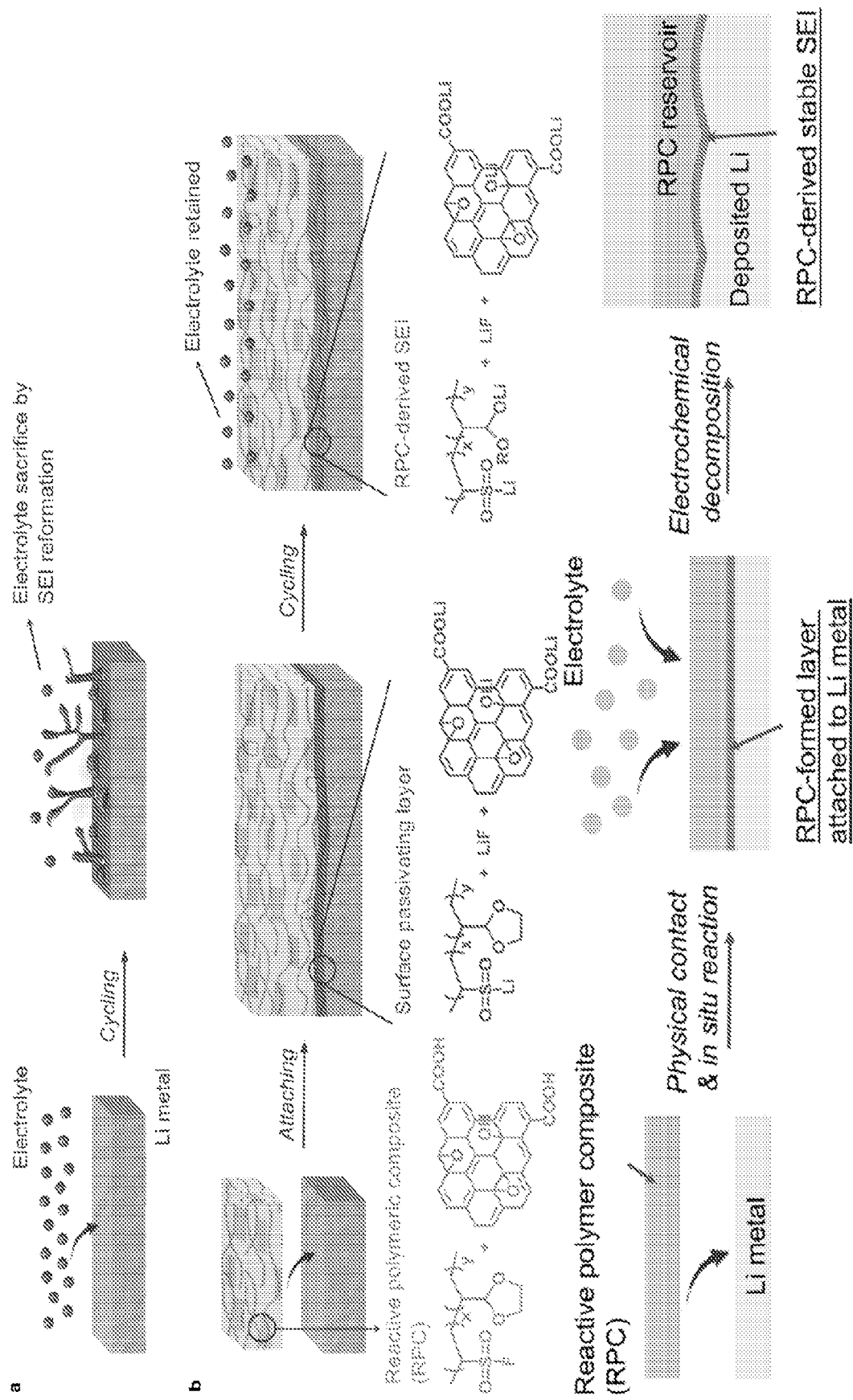
FIG. 1 depicts a schematic of the molecular level design of a polymer-inorganic SEI using a reactive polymeric composite (RPC)

The accompanying figures, which are incorporated in and constitute a part of this specification, illustrate several aspects described below.

DETAILED DESCRIPTION

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

Definitions

As used herein, the terms "optional" or "optionally" means that the subsequently described event or circumstance can or cannot occur and that the description includes instances where said event or circumstance occurs and instances where it does not.

It is appreciated that certain features of the disclosure, which are, for clarity, described in the context of separate aspects, can also be provided in combination in a single aspect. Conversely, various features of the disclosure, which are, for brevity, described in the context of a single aspect, can also be provided separately or in any suitable subcombination.

As used in the description and the appended claims, the singular forms "a," "an," and "the" include plural referents unless the context clearly dictates otherwise.

Thus, for example, a reference to "a polymer" includes two or more such polymers, reference to "a battery" includes two or more such batteries and the like.

It is also to be understood that the terminology used herein is for the purpose of describing particular aspects only and is not intended to be limiting. As used in the specification and in the claims, the term "comprising" can include the aspects "consisting of" and "consisting essentially of."

For the terms "for example" and "such as," and grammatical equivalences thereof, the phrase "and without limitation" is understood to follow unless explicitly stated otherwise.

As used herein, the term "substituted" means that a hydrogen atom is removed and replaced by a substituent. It is contemplated to include all permissible substituents of organic compounds. As used herein, the phrase "optionally substituted" means unsubstituted or substituted. It is to be understood that substitution at a given atom is limited by valency. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent and that the substitution results in a stable compound, e.g., a compound that does not spontaneously undergo transformation such as by rearrangement, cyclization, elimination, etc. In still further aspects, it is understood that when the disclosure describes a group being substituted, it means that the group is substituted with one or more (i.e., 1, 2, 3, 4, or 5) groups as allowed by valence selected from alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

Also provided herein are salts of the compounds described herein. It is understood that the disclosed salts can refer to derivatives of the disclosed compounds wherein the parent compound is modified by converting an existing acid or base moiety to its salt form. Examples of the salts include, but are not limited to, mineral or organic acid salts of basic residues such as amines; alkali or organic salts of acidic residues such as carboxylic acids; and the like.

The expressions "ambient temperature" and "room temperature" as used herein are understood in the art and refer generally to a temperature, e.g., a reaction temperature, that is about the temperature of the room in which the reaction is carried out, for example, a temperature from about 20° C. to about 30° C.

"$R^1$," "$R^2$," "$R^3$," "$R^4$," etc. are used herein as generic symbols to represent various specific substituents. These symbols can be any substituent, not limited to those disclosed herein, and when they are defined to be certain substituents in one instance, they can, in another instance, be defined as some other substituents.

At various places in the present specification, divalent linking substituents are described. It is specifically intended that each divalent linking substituent includes both the forward and backward forms of the linking substituent. For example, —NR(CR'R")$_n$— includes both —NR(CR'R")$_n$— and —(CR'R")$_n$NR—. Where the structure clearly requires a linking group, the Markush variables listed for that group are understood to be linking groups.

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

Throughout the definitions, the term "$C_n$-$C_m$" indicates a range that includes the endpoints, wherein n and m are integers and indicate the number of carbons. Examples include, without limitation, $C_1$-$C_4$, $C_1$-$C_6$, and the like.

The term "aliphatic" as used herein refers to a non-aromatic hydrocarbon group and includes branched and unbranched, alkyl, alkenyl, or alkynyl groups. As used herein, the term "Cn-Cm alkyl," employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-I-butyl, n-pentyl, 3-pentyl, n-hexyl, 1,2,2-trimethylpropyl, heptyl, octyl, nonyl, decyl, dodecyl, tetradecyl, hexadecyl, eicosyl, tetracosyl, and the like. In various aspects, the alkyl group contains from 1 to 24 carbon atoms, from 1 to 12 carbon atoms, from 1 to 10 carbon atoms, from 1 to 8 carbon atoms, from 1 to 6 carbon atoms, from 1 to 4 carbon atoms, from 1 to 3 carbon atoms, or 1 to 2 carbon atoms. The alkyl group can also be substituted or unsubstituted. Throughout the specification "alkyl" is generally used to refer to both unsubstituted alkyl groups and substituted alkyl groups; however, substituted alkyl groups are also specifically referred to herein by identifying the specific substituent(s) on the alkyl group. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below and the like. When "alkyl" is used in one instance, and a specific term such as "alkylalcohol" is used in another, it is not meant to imply that the term "alkyl" does not also refer to specific terms such as "alkylalcohol" and the like.

As used herein, "$C_n$-$C_m$ alkenyl" refers to an alkyl group having one or more double carbon-carbon bonds and having n to m carbons. Examples of alkenyl groups include, but are not limited to, ethenyl, n-propenyl, isopropenyl, n-butenyl, seobutenyl, and the like. In various aspects, the alkenyl moiety contains 2 to 6, 2 to 4, or 2 to 3 carbon atoms. Asymmetric structures such as $(R^1R^2)C=C(R^3R^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, thiol, or phosphonyl, as described below.

As used herein, "$C_n$-$C_m$ alkynyl" refers to an alkyl group having one or more triple carbon-carbon bonds and having n to m carbons. Exemplary alkynyl groups include, but are not limited to, ethynyl, propyn-1-yl, propyn-2-yl, and the like. In various aspects, the alkynyl moiety contains 2 to 6, 2 to 4, or 2 to 3 carbon atoms. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described below.

As used herein, the term "$C_n$-$C_m$ alkylene," employed alone or in combination with other terms, refers to a divalent alkyl linking group having n to m carbons. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In various aspects, the alkylene moiety contains 2 to 6, 2 to 4, 2 to 3, 1 to 6, 1 to 4, or 1 to 2 carbon atoms.

As used herein, the term "$C_n$-$C_m$ alkoxy," employed alone or in combination with other terms, refers to a group of formula —O-alkyl, wherein the alkyl group has n to m carbons. Example of alkoxy groups includes methoxy, ethoxy, propoxy (e.g., w-propoxy and isopropoxy), tert-butoxy, and the like. In various aspects, the alkyl group has 1 to 6, 1 to 4, or 1 to 3 carbon atoms.

The terms "amine" or "amino" as used herein are represented by the formula —$NR^1R^2$, where $R^1$ and $R^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above. "Amido" is —C(O)$NR^1R^2$.

As used herein, the term "$C_n$-$C_m$ alkylamino" refers to a group of formula —NH(alkyl), wherein the alkyl group has n to m carbon atoms. In various aspects, the alkyl group has 1 to 6, 1 to 4, or 1 to 3 carbon atoms.

As used herein, the term "$C_n$-$C_m$ alkoxycarbonyl" refers to a group of formula —C(O)O-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylcarbonyl" refers to a group of formula —C(O)-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylcarbonylamino" refers to a group of formula —NHC(O)-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylsulfonylamino" refers to a group of formula —NHS(O)$_2$-alkyl, wherein the alkyl group has n to m carbon atoms. In various aspects, the alkyl group has 1 to 6, 1 to 4, or 1 to 3 carbon atoms.

The term "aldehyde" as used herein is represented by the formula —C(O)H. Throughout this specification "C(O)" or "CO" is a shorthand notation for C=O, which is also referred to herein as a "carbonyl."

The term "carboxylic acid" as used herein is represented by the formula —C(O)OH. A "carboxylate" or "carboxyl" group as used herein is represented by the formula —C(O)$O^-$.

The term "ester" as used herein is represented by the formula —OC(O)$R^1$ or —C(O)O$R^1$, where $R^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $R^1OR^2$, where $R^1$ and $R^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $R^1C(O)R^2$, where $R^1$ and $R^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

As used herein, the term "aminosulfonyl" refers to a group of formula —S(O)$_2$$NH_2$.

As used herein, the term "$C_n$-$C_m$ alkylaminosulfonyl" refers to a group of formula —S(O)$_2$NH(alkyl), wherein the alkyl group has n to m carbon atoms. In various aspects, the alkyl group has 1 to 6, 1 to 4, or 1 to 3 carbon atoms.

As used herein, the term "di($C_n$-$C_m$ alkyl)aminosulfonyl" refers to a group of formula —S(O)$_2$N(alkyl)$_2$, wherein each alkyl group independently has n to m carbon atoms. In various aspects, each alkyl group has, independently, 1 to 6, 1 to 4, or 1 to 3 carbon atoms.

As used herein, the term "aminosulfonylamino" refers to a group of formula —NHS(O)$_2$$NH_2$.

As used herein, the term "$C_n$-$C_m$ alkylaminosulfonylamino" refers to a group of formula —NHS(O)$_2$NH(alkyl), wherein the alkyl group has n to m carbon atoms. In various aspects, the alkyl group has 1 to 6, 1 to 4, or 1 to 3 carbon atoms.

As used herein, the term "di($C_n$-$C_m$ alkyl)aminosulfonylamino" refers to a group of formula —NHS(O)$_2$N(alkyl)$_2$, wherein each alkyl group independently has n to m carbon atoms. In various aspects, each alkyl group has, independently, 1 to 6, 1 to 4, or 1 to 3 carbon atoms.

As used herein, the term "aminocarbonylamino," employed alone or in combination with other terms, refers to a group of formula —NHC(O)$NH_2$.

As used herein, the term "$C_n$-$C_m$ alkylaminocarbonylamino" refers to a group of formula —NHC(O)NH(alkyl), wherein the alkyl group has n to m carbon atoms. In various aspects, the alkyl group has 1 to 6, 1 to 4, or 1 to 3 carbon atoms.

As used herein, the term "di($C_n$-$C_m$ alkyl)aminocarbonylamino" refers to a group of formula —NHC(O)N(alkyl)$_2$, wherein each alkyl group independently has n to m carbon atoms. In various aspects, each alkyl group has, independently, 1 to 6, 1 to 4, or 1 to 3 carbon atoms.

As used herein, the term "$C_n$-$C_m$ alkylcarbamyl" refers to a group of formula —C(O)—NH(alkyl), wherein the alkyl group has n to m carbon atoms. In various aspects, the alkyl group has 1 to 6, 1 to 4, or 1 to 3 carbon atoms.

As used herein, the term "thio" refers to a group of formula —SH.

As used herein, the term "$C_n$-$C_m$ alkylthio" refers to a group of formula —S-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylsulfonyl" refers to a group of formula —S(O)-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylsulfonyl" refers to a group of formula —S(O)$_2$-alkyl, wherein the alkyl group has n to m carbon atoms. In various aspects, the alkyl group has 1 to 6, 1 to 4, or 1 to 3 carbon atoms.

As used herein, the term "carbamyl" to a group of formula —C(O)NH$_2$.

As used herein, the term "carbonyl," employed alone or in combination with other terms, refers to a —C(=O)— group, which may also be written as C(O).

As used herein, the term "carboxy" refers to a group of formula —C(O)OH.

As used herein, "halogen" refers to F, Cl, Br, or I. The term "hydroxyl" as used herein is represented by the formula —OH.

The term "cyano" as used herein is represented by the formula —CN. The term "nitro" as used herein is represented by the formula —NO$_2$.

The term "phosphonyl" is used herein to refer to the phospho-oxo group represented by the formula —P(O)(OR$^1$)$_2$, where R$^1$ can be absent, hydrogen, an alkyl, alkenyl, alkynyl, aryl, heteroaryl, cycloalkyl, or cycloalkenyl.

The term "silyl" as used herein is represented by the formula —SiR$^1$R$^2$R$^3$, where R$^1$, R$^2$, and R$^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the sulfo-oxo group represented by the formula —S(O)$_2$R$^1$, where R$^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —S(O)$_2$NH—.

As used herein, "C$_n$-C$_m$ haloalkoxy" refers to a group of formula —O-haloalkyl having n to m carbon atoms. An example haloalkoxy group is OCF$_3$. In various aspects, the haloalkoxy group is fluorinated only. In various aspects, the alkyl group has 1 to 6, 1 to 4, or 1 to 3 carbon atoms.

As used herein, the term "C$_n$-C$_m$ haloalkyl," employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In various aspects, the haloalkyl group is fluorinated only. In various aspects, the alkyl group has 1 to 6, 1 to 4, or 1 to 3 carbon atoms.

As used herein, the term "amine base" refers to a mono-substituted amino group (i.e., primary amine base), di-substituted amino group (i.e., secondary amine base), or a tri-substituted amine group (i.e., tertiary amine base). Exemplary mono-substituted amine bases include methylamine, ethylamine, propylamine, butylamine, and the like. Example of di-substituted amine bases includes dimethylamine, diethylamine, dipropylamine, dibutylamine, pyrrolidine, piperidine, azepane, morpholine, and the like. In various aspects, the tertiary amine has the formula N(R')$_3$, wherein each R' is independently C$_1$-C$_6$ alkyl, 3-10 member cycloalkyl, 4-10 membered heterocycloalkyl, 1-10 membered heteroaryl, and 5-10 membered aryl, wherein the 3-10 member cycloalkyl, 4-10 membered heterocycloalkyl, 1-10 membered heteroaryl, and 5-10 membered aryl is optionally substituted by 1, 2, 3, 4, 5, or 6 Ci-6 alkyl groups. Exemplary tertiary amine bases include trimethylamine, triethylamine, tripropylamine, triisopropylamine, tributylamine, tri-tert-butylamine, N,N-dimethylethanamine, N-ethyl-N-methylpropan-2-amine, N-ethyl-N-isopropylpropan-2-amine, morpholine, N-methylmorpholine, and the like. In various aspects, the term "tertiary amine base" refers to a group of formula N(R)$_3$, wherein each R is independently a linear or branched C$_{1-6}$ alkyl group.

As used herein, "cycloalkyl" refers to non-aromatic cyclic hydrocarbons including cyclized alkyl and/or alkenyl groups. Cycloalkyl groups can include mono- or polycyclic (e.g., having 2, 3 or 4 fused rings) groups and spirocycles. Cycloalkyl groups can have 3, 4, 5, 6, 7, 8, 9, or 10 ring-forming carbons (C$_{3-10}$). Ring-forming carbon atoms of a cycloalkyl group can be optionally substituted by oxo or sulfido (e.g., C(O) or C(S)). Cycloalkyl groups also include cycloalkylidenes. Example of cycloalkyl groups includes cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, and the like. In various aspects, cycloalkyl is cyclopropyl, cyclobutyl, cyclopentyl, cyclohexyl, cyclopentyl, or adamantyl. In various aspects, the cycloalkyl has 6-10 ring-forming carbon atoms. In various aspects, cycloalkyl is cyclohexyl or adamantyl. Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom, including a ring-forming atom of the fused aromatic ring.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Example of heterocycloalkyl groups includes pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or sulfido (e.g., C(O), S(O), C(S), or S(O)$_2$, etc.). The heterocycloalkyl group can be attached through a ring-forming carbon atom or a ring-forming heteroatom. In various aspects, the heterocycloalkyl group contains 0 to 3 double bonds. In various aspects, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom, including a ring-forming atom of the fused aromatic ring. In various aspects, the heterocycloalkyl has 4-10, 4-7, or 4-6 ring atoms with 1 or 2 heteroatoms independently selected from nitrogen, oxygen, or sulfur and having one or more oxidized ring members.

The term "cycloalkenyl" as used herein is a non-aromatic carbon-based ring composed of at least three carbon atoms and containing at least one double bond, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups, and one or more non-aryl groups.

As used herein, the term "aryl," employed alone or in combination with other terms, refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In various aspects, aryl groups have from 6 to about 20 carbon atoms, from 6 to about 15 carbon atoms, or from 6 to about 10 carbon atoms. In various aspects, the aryl group is a substituted or unsubstituted phenyl.

As used herein, "heteroaryl" refers to a monocyclic or polycyclic aromatic heterocycle having at least one heteroatom ring member selected from sulfur, oxygen, phosphorus, and nitrogen. In various aspects, the heteroaryl ring has 1, 2, 3, or 4 heteroatom ring members independently selected from nitrogen, sulfur, and oxygen. In various aspects, any ring-forming N in a heteroaryl moiety can be an N-oxide. In various aspects, the heteroaryl has 5-10 ring atoms and 1, 2, 3 or 4 heteroatom ring members independently selected from nitrogen, sulfur, and oxygen. In various aspects, the heteroaryl has 5-6 ring atoms and 1 or 2 heteroatom ring members independently selected from nitrogen, sulfur, and oxygen. In various aspects, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl, and pyridazinyl.

The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within the second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Preparation of the compounds described herein can involve a reaction in the presence of an acid or a base. Example acids can be inorganic or organic acids and include but are not limited to, strong and weak acids. Example acids include, but are not limited to, hydrochloric acid, hydrobromic acid, sulfuric acid, phosphoric acid, p-toluenesulfonic acid, 4-nitrobenzoic acid, methanesulfonic acid, benzenesulfonic acid, trifluoroacetic acid, and nitric acid. Example weak acids include, but are not limited to, acetic acid, propionic acid, butanoic acid, benzoic acid, tartaric acid, pentanoic acid, hexanoic acid, heptanoic acid, octanoic acid, nonanoic acid, and decanoic acid.

Example bases include, without limitation, lithium hydroxide, sodium hydroxide, potassium hydroxide, lithium carbonate, sodium carbonate, potassium carbonate, sodium bicarbonate, and amine bases. Example strong bases include, but are not limited to, hydroxide, alkoxides, metal amides, metal hydrides, metal dialkylamides, and arylamines, wherein; alkoxides include lithium, sodium and potassium salts of methyl, ethyl and t-butyl oxides; metal amides include sodium amide, potassium amide, and lithium amide; metal hydrides include sodium hydride, potassium hydride, and lithium hydride; and metal dialkylamides include lithium, sodium, and potassium salts of methyl, ethyl, n-propyl, iso-propyl, n-butyl, t-butyl, trimethylsilyl, and cyclohexyl substituted amides (e.g., lithium N-isopropylcyclohexylamide).

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint and independently of the other endpoint. Unless stated otherwise, the term "about" means within 5% (e.g., within 2% or 1%) of the particular value modified by the term "about." As used herein, the term "composition" is intended to encompass a product comprising the specified ingredients in the specified amounts, as well as any product which results, directly or indirectly, from a combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight component Y, X and Y are present at a weight ratio of 2:5, and are present in such ratio regardless of whether additional components are contained in the mixture.

A weight percent (wt. %) of a component, unless specifically stated to the contrary, is based on the total weight of the formulation or composition in which the component is included.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein, the term "and/or" includes any and all combinations of one or more of the associated listed items.

It will be understood that, although the terms "first," "second," etc. may be used herein to describe various elements, components, regions, layers and/or sections.

These elements, components, regions, layers, and/or sections should not be limited by these terms. These terms are only used to distinguish one element, component, region, layer, or section from another element, component, region, layer, or section.

Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

As used herein, the term "substantially" means that the subsequently described event or circumstance completely occurs or that the subsequently described event or circumstance generally, typically, or approximately occurs.

Still further, the term "substantially" can in some aspects refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, component, composition, or other condition for which substantially is used to characterize or otherwise quantify an amount.

In other aspects, as used herein, the term "substantially free," when used in the context of a composition or component of a composition that is substantially absent, is intended to refer to an amount that is then about 1% by weight, e.g., less than about 0.5% by weight, less than about 0.1% by weight, less than about 0.05% by weight, or less than about 0.01% by weight of the stated material, based on the total weight of the composition.

In other aspects, as used herein, the term "substantially free," when used in the context of a surface substantially free of defects, for example, is intended to refer to a surface that has less than about 5% of defects, less than about 4.5% of defects, less than about 4% of defects, less than about 3.5% of defects, less than about 3% of defects, less than about 2.5% of defects, less than about 2% of defects, less than about 1.5% of defects, less than about 1% of defects, less than about 0.5% of defects, less than about 0.1% of defects, less than about 0.05% of defects, or less than about 0.01% of defects of the total surface.

While aspects of the present invention can be described and claimed in a particular statutory class, such as the system statutory class, this is for convenience only and one of ordinary skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

The present invention may be understood more readily by reference to the following detailed description of various aspects of the invention and the examples included therein and to the Figures and their previous and following description.

Reactive Polymer Composite

In some aspects, described herein is a composite comprising a reactive functionalized polymer having a main polymer chain with functionalization along the main polymer chain, wherein the functionalization comprises one or more functional groups that are configured to react with a metal electrode to form a polymeric metal salt and one, or more functional groups configured to electrochemically decompose.

In still further aspects, the disclosure is directed to a reactive polymer composite comprising a reactive functionalized polymer having a main polymer chain with functionalization along the main polymer chain, wherein the functionalization comprises one or more functional groups that are configured to react with a metal electrode chemically by physical contact to form a polymeric metal salt and one, or more functional groups configured to electrochemically decompose by electrochemical charging/discharging. In certain aspects, and as shown in FIG. 1C, the reactive polymer composite can chemically react with a metal electrode, such as, for example, and without limitation, Li electrode, once it is physically attached to Li. In such aspects, a passive layer can be formed. In still further aspects, the formed passive layer can block the electrolyte penetration and its contact with Li by attaching the reactive polymer composite to Li metal. In still further aspects, during Li deposition, for example, the attached reactive polymer composite can further electrochemically decompose and generate a stable SEI layer, which is completely different from the one formed by the electrolyte without the presence of reactive polymer composite.

It is understood that as referred herein, the functional groups present in the composite are capable of reacting with the metal electrode and forming one or more polymeric salts comprising the metal as a cation. It is further understood as referred herein, the one or more functional groups configured to electrochemically decompose include the groups that can partially decompose or fully decompose under application of current and/or voltage. It is further understood that the groups upon an electrochemical decomposition can also form a compound with the metal cation.

In still further aspects, the disclosed herein reactive polymer composite can chemically and electrochemically react with the metal electrode to form a solid-electrolyte-interphase (SEI). In certain exemplary aspects and as disclosed herein, the reactive polymer composite comprises the functionalized polymer having functional groups that readily react with the metal electrode to form a polymeric metal salt, e.g., a metal halide salt such as, for example, and without limitation, a lithium fluoride, and others, in solid-electrolyte interphase. In still further aspects, the disclosed herein reactive polymer composite can behave as an SEI precursor.

In certain aspects, the functional groups described herein are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, SO$_2$F group, NH—SO$_2$—F, N(R$^1$)—SF$_3$ group, SO$_2$—N(F)—SO$_2$—R$^2$ group, substituted or unsubstituted fluoropyridinium triflate; wherein L is independently selected from null, C$_1$-C$_{10}$ alkyl, C$_1$—C$_{10}$ alkoxy, C$_6$-C$_{14}$ aryl, C$_1$-C$_{14}$ heteroaryl, C$_6$-C$_{14}$ aryloxy, imidazole, —NH—, pyridine, and wherein L is optionally substituted with C$_1$-C$_{10}$ alkyl, C$_1$-C$_{10}$ alkoxy, C$_2$-C$_{10}$ alkenyl, C$_2$-C$_{10}$ alkynyl, C$_6$-C$_{14}$ aryl, C$_1$-C$_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein R$^1$ and R$^2$, each independent of the other, selected from hydrogen, C$_1$-C$_{10}$ alkyl, C$_1$-C$_{10}$ alkoxy, C$_6$-C$_{14}$ aryl, C$_1$-C$_{14}$ heteroaryl, C$_6$-C$_{14}$ aryloxy, imidazole, amine, pyridine, and wherein each of R$^1$ and R$^2$ independent of the other, is optionally substituted with C$_1$-C$_{10}$ alkyl, C$_1$-C$_{10}$ alkoxy, C$_2$-C$_{10}$ alkenyl, C$_2$-C$_{10}$ alkynyl, C$_6$-C$_{14}$ aryl, C$_1$-C$_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

In still further exemplary and unlimiting aspects, the one or more functional groups can comprise sulfonyl halides (sulfonyl fluorides, sulfonyl chlorides, sulfonyl iodides), lithium sulfonates, (diethylamino)sulfur trifluoride, N-fluorobenzenesulfonimide, 2,6-dichloro-1-fluoropyridinium trifluoromethanesulfonate, cyclic ethers, cyclic carbonates, linear ethers, and combinations thereof. In still further exemplary aspects, the electrochemically decomposable organic groups can comprise ethylene oxide (EO), dioxolane (DOL), cyclic ethylene carbonate (CEC), and vinyl carbonate (VC), or any combination thereof.

In certain aspects, the main polymer chain can comprise an aliphatic backbone, a polyaromatic backbone, a polycyclic backbone, a polysaccharide backbone, or any combination thereof. In yet some exemplary aspects, the aliphatic backbone can include but is not limited to, a polyethylene backbone.

In still further aspects, wherein the reactive functionalized polymer comprises one or more monomeric units selected from:

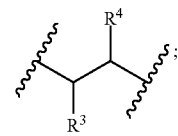

wherein
R$^3$ is independently selected at each occurrence from an epoxide group; a cyclic acetal group; a cyclic carbonate group; and R$^4$ is hydrogen; or R$^3$ and R$^4$ are brought together with the carbons to which they are attached to form a cyclic carbonate group.

In still further aspects, the functionalized polymer can comprise one or more of

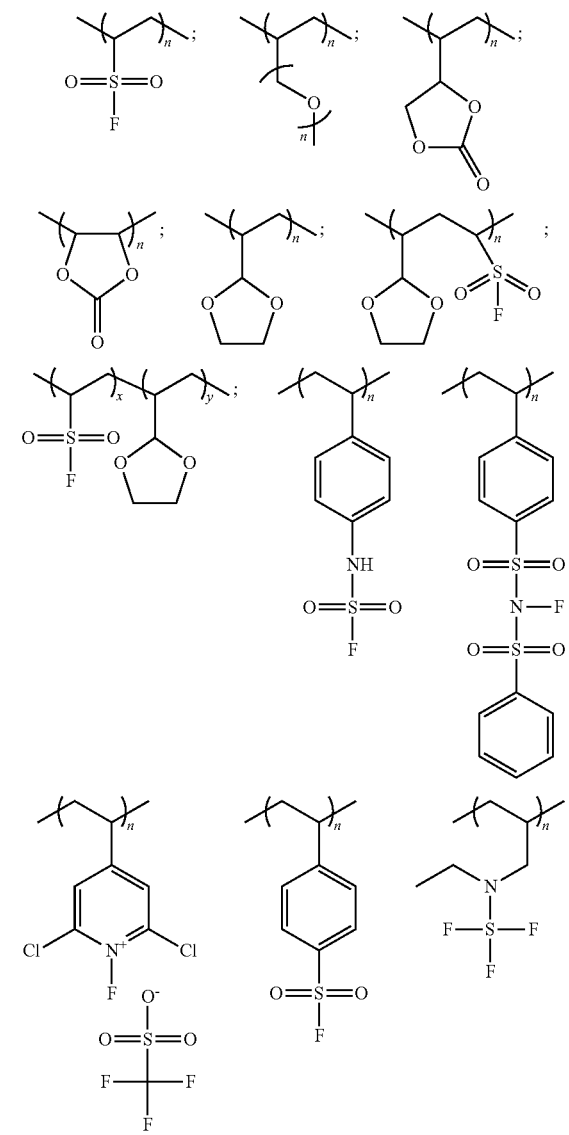

-continued

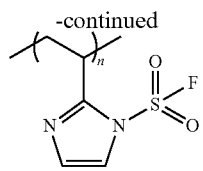

wherein n is an integer number from 1 to 100, and wherein x and y each, independently, is an integer number from 1 to 100 and present in a ration from 1:10 to 10:1.

In still further aspects, the n value can be an integer from 1 to 100, including any exemplary integer values falling between these two foregoing values. In yet further aspects, the x and y value each, independently, can be an integer from 1 to 100, including any exemplary integer values falling between these two foregoing values. In yet further aspects, the x and y can be present in a ration from 1:10 to 10:1, including exemplary values of about 1:9, 1:8, 1:7, 1:6, 1:5, 1:4, 1:3, 1:2, 1:1, 2:1, 3:1, 4:1, 5:1, 6:1, 7:1, 8:1, and 9:1. It is further understood that x and y can be present in any ration that falls between any two foregoing values.

In still further aspects, the reactive functionalized polymer is a product of the polymerization between various monomeric units, as described herein.

In still further aspects, the reactive functionalized polymer present in the reactive polymer composite is a block co-polymer. In still further aspects, the reactive functionalized polymer present in the reactive polymer composite can comprise linear and/or branched polymers.

Also disclosed herein are aspects, wherein the reactive polymer composite further comprises a filler from greater than 0 to about 60 wt %, including exemplary values of greater than about 2%, about 5%, about 10%, about 15%, about 20%, about 25%, about 30%, about 35%, about 40%, about 45%, about 50%, and about 55%. It is still further understood that the filler can be present in any amount between any two foregoing values. In still further aspects, and as described herein, the filler can comprise graphene oxide, reduced graphene oxide, borophene, molybdenite, silicon oxide, metal oxide, metal halides, or any combination thereof. In yet further aspects, the filler comprises graphene oxide (GO). In still further aspects, the graphene oxide (GO) can be present as nanosheets.

In still further aspects, the reactive polymer composites disclosed herein are configured to react with the metal electrodes comprising, for example, and without limitation lithium, sodium, zinc, or any alloys thereof. In yet further aspects, the metal is lithium. In still further aspects, the metal is sodium. In yet still further aspects, the metal is zinc.

In yet further aspects, the reactive polymer composite is lamellar.

Electrodes

Also disclosed herein is an electrode comprising: a) an active electrode material comprising a metal; b) reactive polymer composite comprising a reactive functionalized polymer having a main polymer chain with functionalization along the main polymer chain, wherein the functionalization comprises one or more functional groups that are configured to react with a metal electrode to form a polymeric metal salt and one or more functional groups configured to electrochemically decompose; and c) a solid-electrolyte interphase layer, wherein the solid-electrolyte interphase layer comprises the polymeric metal salt.

It is understood that the solid-electrolyte interphase layer is a product of the reaction between the reactive polymer composite and the metal electrode. In still further aspects, any of the mentioned above, polymer composite can be utilized in the electrodes.

In certain aspects, and as previously disclosed, the composite can further comprise a filler from greater than 0 to about 60 wt %, including exemplary values of greater than about 2%, about 5%, about 10%, about 15%, about 20%, about 25%, about 30%, about 35%, about 40%, about 45%, about 50%, and about 55%. It is still further understood that the filler can be present in any amount between any two foregoing values. In still further aspects, and as described herein, the filler can comprise graphene oxide, reduced graphene oxide, borophene, molybdenite, silicon oxide, metal oxide, metal halides, or any combination thereof. In yet further aspects, the filler comprises graphene oxide (GO). In still further aspects, the graphene oxide (GO) can be present as nanosheets.

In yet further aspects, the composite present in the disclosed electrode can comprise the main polymer chain comprising an aliphatic backbone, a polyaromatic backbone, a polycyclic backbone, a polysaccharide backbone, or any combination thereof. In still further aspects, the functional groups described herein can be linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH-SO_2-F$, $N(R^1)-SF_3$ group, $SO_2-N(F)-SO_2-R^2$ group, substituted or unsubstituted fluoropyridinium triflate; wherein L is independently selected from null, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, —NH—, pyridine, and wherein L is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein $R^1$ and $R^2$, each independent of the other, selected from hydrogen, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, amine, pyridine, and wherein each of $R^1$ and $R^2$ independent of the other, is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

In yet further aspects, the electrode described herein comprises the reactive polymer composite, wherein the reactive functionalized polymer comprises one or more monomeric units selected from:

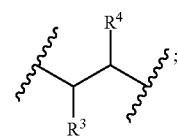

wherein
$R^3$ is independently selected at each occurrence from an epoxide group; a cyclic acetal group; a cyclic carbonate group; and $R^4$ is hydrogen; or $R^3$ and $R^4$ are brought together with the carbons to which they are attached to form a cyclic carbonate group.

In some exemplary and unlimiting aspects, the functionalize reactive polymer can comprise one or more of

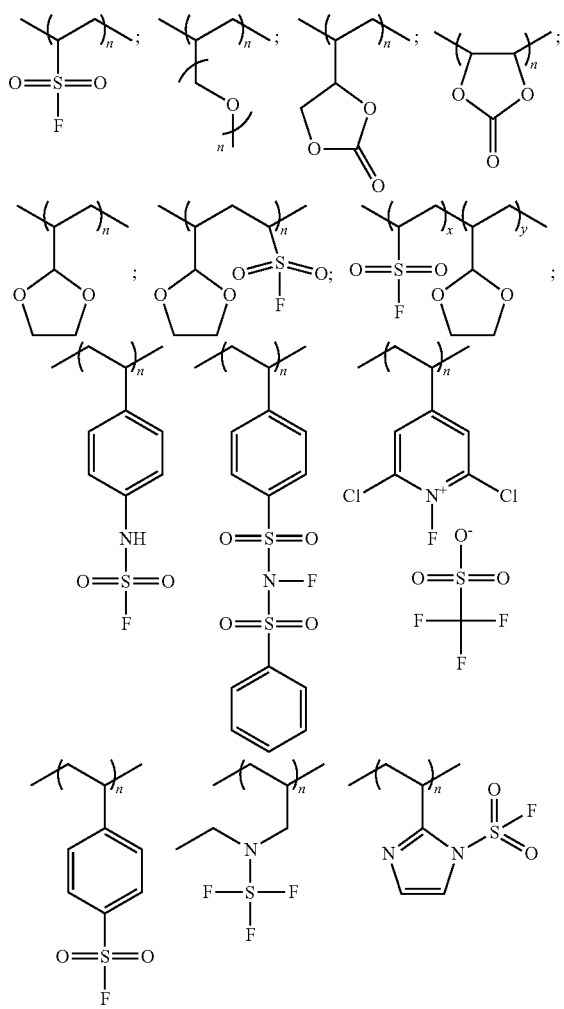

wherein n is an integer number from 1 to 100, and wherein x and y each, independently, is an integer number from 1 to 100 and present in a ration from 1:10 to 10:1. In still further aspects, the n value can be an integer from 1 to 100, including any exemplary integer values falling between these two foregoing values. In yet further aspects, the x and y value each, independently, can be an integer from 1 to 100, including any exemplary integer values falling between these two foregoing values. In yet further aspects, the x and y can be present in a ration from 1:10 to 10:1, including exemplary values of about 1:9, 1:8, 1:7, 1:6, 1:5, 1:4, 1:3, 1:2, 1:1, 2:1, 3:1, 4:1; 5:1; 6:1; 7:1; 8:1, and 9:1. It is further understood that x and y can be present in any ration that falls between any two foregoing values.

In still further aspects, the composite can be lamellar. In still further aspects, the composite can have a thickness from about 500 nm to about 10 microns, including exemplary values of about 600 nm, about 700 nm, about 800 nm, about 900 nm, about 1 micron, about 2 microns, about 3 microns, about 4 microns, about 5 microns, about 6 microns, about 7 microns, about 8 microns, and about 9 microns. It is further understood that the composite can have any thickness between any two foregoing values.

In yet further aspects, the active electrode material can comprise any metal that is electrochemically active. In certain aspects, the active electrode material can comprise lithium, sodium, zinc, or any alloys thereof. In still further aspects, the active electrode material can comprise lithium. In still further aspects, the active electrode material can comprise sodium. In yet further aspects, the active electrode material can comprise zinc.

In still further aspects, the solid-electrolyte interphase layer that is a reaction product between the active electrode material and the reactive polymer composite can comprise one or more metal salts. It is understood that the type of the metal salts depends on a type of the active electrode material and the functional groups present in the reactive polymer composite. In certain exemplary and unlimiting aspects, when the active electrode material is, for example, lithium, the salts present in the SEI are lithium salts. In yet further exemplary and unlimiting aspects, when the reactive polymer composite comprises functional groups, such as for example, fluoride terminated groups, that are configured to react, for example, and without limitation with lithium, the salt can comprise LiF. It is understood that these are only exemplary aspects, and any other metal salts can be formed.

In still further aspects, the solid-electrolyte interphase layer can also comprise the filler. It is further understood that the filler present in the solid-electrolyte interphase layer is the same filler present in the reactive polymer composite. In yet further aspects, the solid-electrolyte interphase layer is homogeneous.

In still further aspects, the solid-electrolyte interphase layer can have a thickness from about 50 nm to about 200 nm, including exemplary values of about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, and about 190 nm. It is further understood that the SEI layer can have any thickness between any two foregoing values.

In still further aspects and as disclosed herein, the electrode is configured to maintain substantially defect-free morphology for about 600 charge/discharge cycles in an electrolyte solution when present. In yet other exemplary aspects, the electrode is configured to maintain substantially defect-free morphology for about 100 charge/discharge cycles, about 200 charge/discharge cycles, about 300 charge/discharge cycles, about 400 charge/discharge cycles, about 500 charge/discharge cycles, about 600 charge/discharge cycles, about 700 charge/discharge cycles, about 800 charge/discharge cycles, about 900 charge/discharge cycles, about 1,000 charge/discharge cycles, about 1,500, or even about 2,000 charge/discharge cycles in an electrolyte solution when present.

In still further aspects, the solid-electrolyte interphase layer exhibits great mechanical properties. In certain aspects, the SEI can exhibit modulus from about 400 to about 1,000 MPa, including exemplary values of about 400, about 500, about 600, about 700, about 800, and about 900 MPa.

In still further aspects, the solid-electrolyte interphase layer is substantially stable at a temperature from about −10° C. to about 50° C., including exemplary aspects of about −5° C., about 0° C., about 5° C., about 10° C., about 15° C., about 20° C., about 25° C., about 30° C., about 35° C., about 40° C., and about 45° C. It is understood that in some exemplary aspects, the substantially stable solid-electrolyte interphase layer is configured to maintain electrochemical performance of the active electrode material without substantially any defects formed on the surface of the active electrode material for at least about 100 charge/discharge cycles, at least about 200 charge/discharge cycles, at least about 300 charge/discharge cycles, at least about 400 charge/discharge cycles, at least about 500 charge/discharge cycles, at least about 600 charge/discharge cycles, at least about 700 charge/discharge cycles, at least about 800 charge/discharge cycles, at least about 900 charge/discharge cycles, at least about 1,000 charge/discharge cycles, at least about 1,500, or even at least about 2,000 charge/discharge cycles when it is inserted in the electrolyte solution.

In still further aspects, and as disclosed below, the electrode can further comprise a 3-D host material. In such exemplary aspects, an elective electrode material can be deposit by any known in the art methods in any desired amount on the 3-D host. In still further aspects, the 3 D-host can comprise, for example, a carbon-based material, a silicon-based material, a copper-based material, stainless steel-based materials, or a nickel-based material, or any combination thereof.

It is understood that a stable solid-electrolyte interphase layer can be achieved by controlling the structure and reactivity of the reactive polymer composite (RPC). As shown in FIGS. 2-5, a variety of organic, inorganic, and two dimensional (2D) compounds, was tested to evaluate the structure and reactivity of the reactive polymer composite. In certain exemplary and unlimiting aspects, when the active metal electrode comprises, for example, Li, the reactive polymer composite comprising a poly(vinyl sulfonyl fluoride-ran-2-vinyl-1,3-dioxolane) P(SF-DOL) polymer and an exemplary graphene oxide (GO) nanosheets as a filler material can provide for the desired stabilization for Li metal electrode (FIGS. 6-9).

Figure 11:
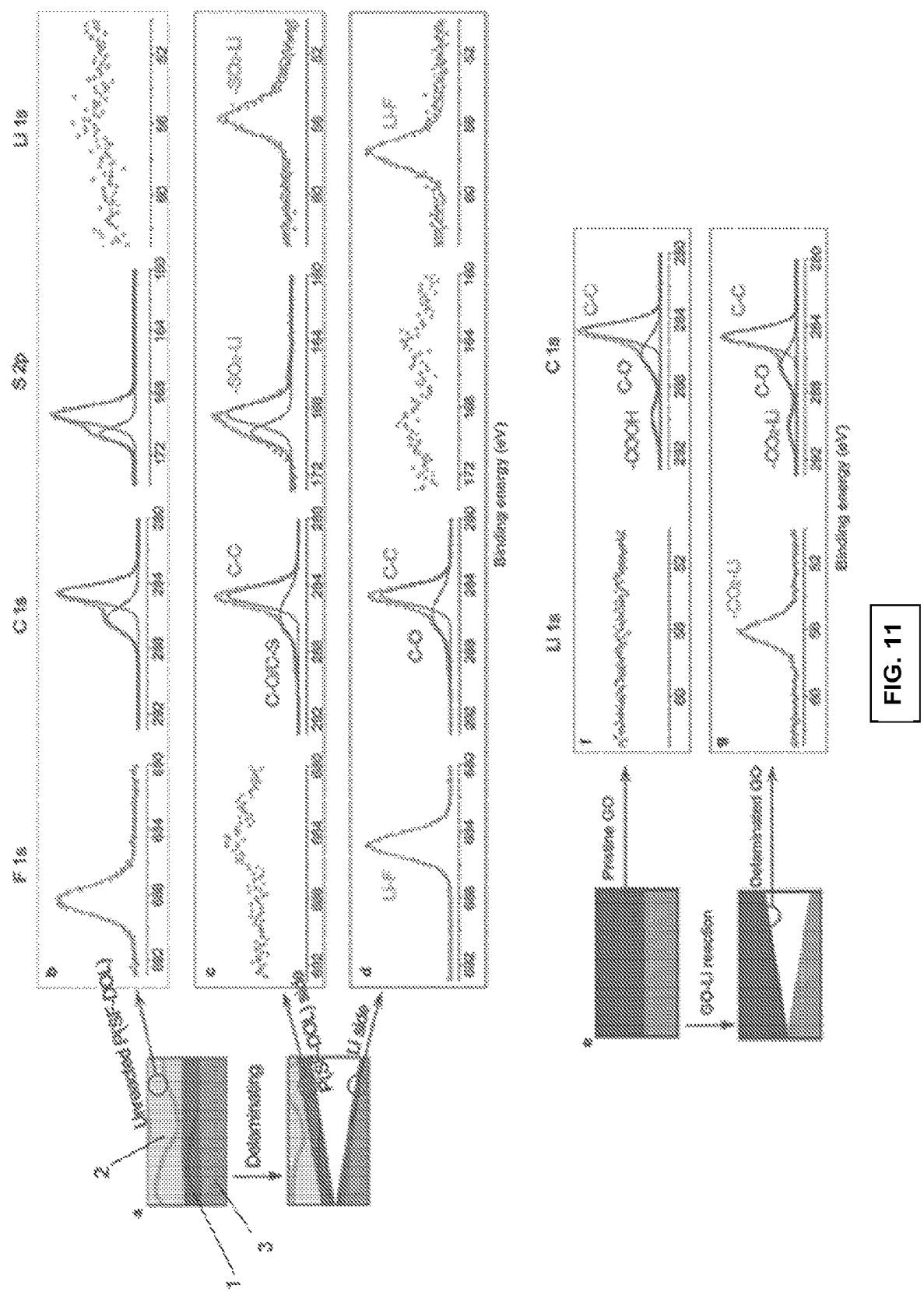
FIGS. 11A-11G depict an exemplary structure of the surface passivating layer formed in the two-step SEI formation.
Figure 12:
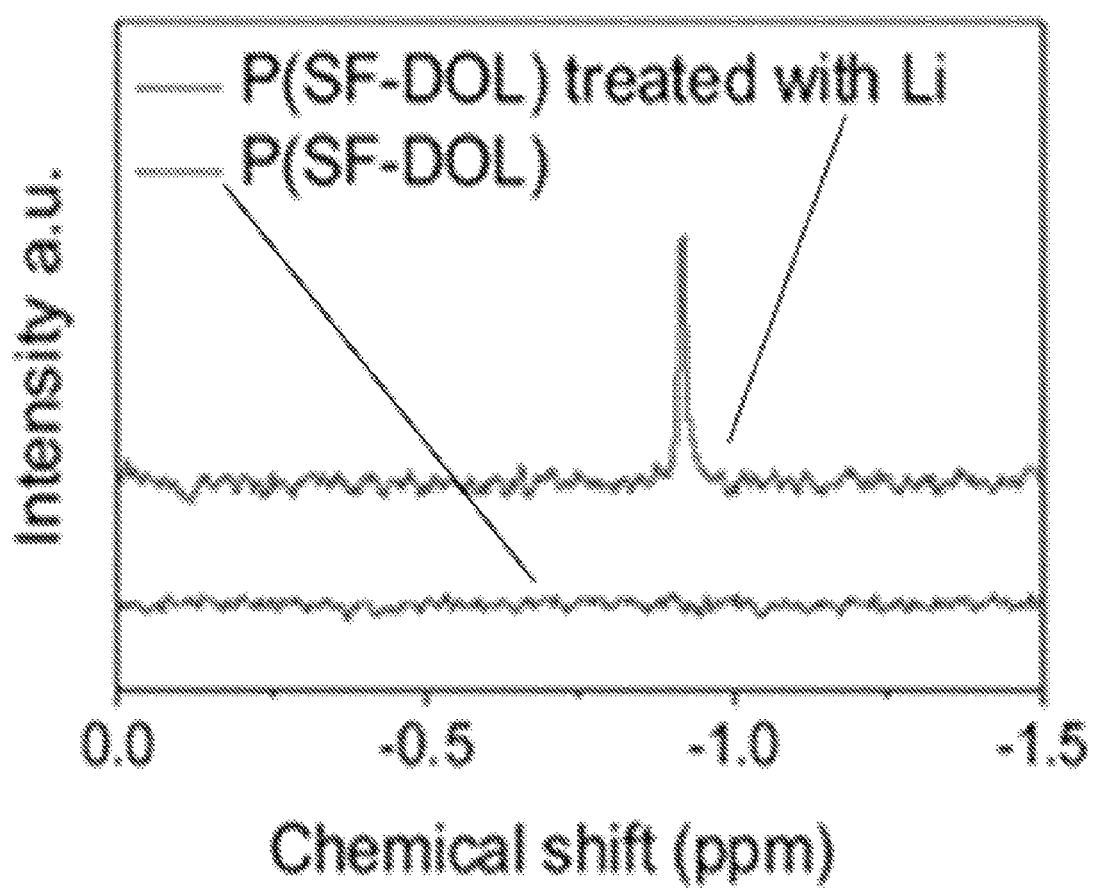
FIG. 12 shows a $^7$Li NMR spectrum of the products of the chemical reaction between P(SF-DOL) and Li.
Figure 13:
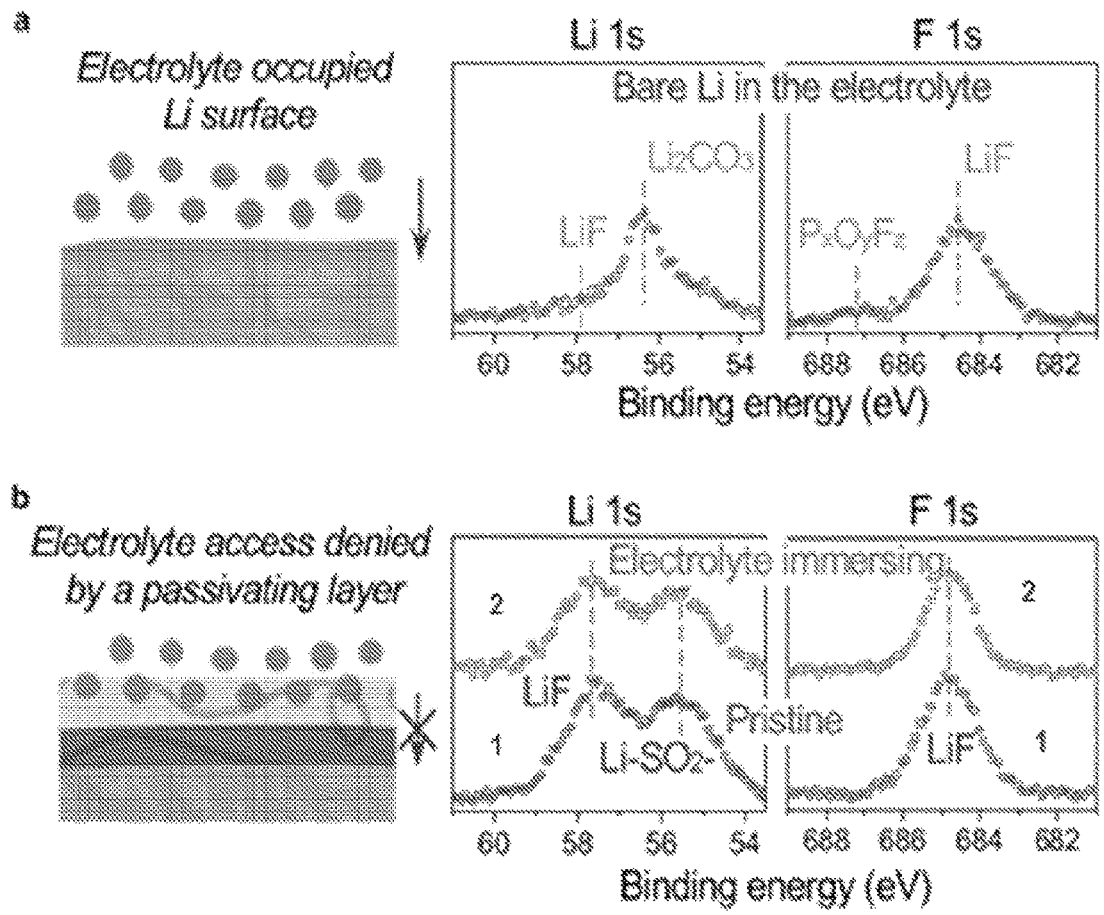
FIGS. 13A-13B show XPS spectra acquired on a bare Li surface immersed in the electrolyte (FIG. 13A) and RPC-stabilized Li surfaces before (blue curves (1)) and after (red curves (2)) immersed in the electrolyte (FIG. 13B). A passivating layer formed by RPC can block the electrolyte access to the Li surface.
Figures 14A, 14B:
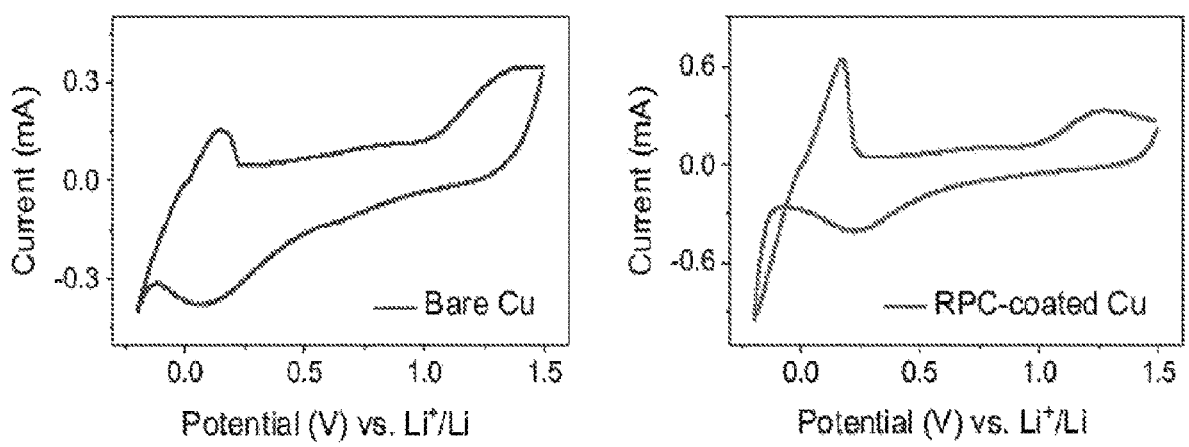
FIGS. 14A-14B show a cyclic voltammetry test of Cu electrodes with and without the RPC coating. The RPC reductively decomposes irreversibly at low potentials. The decomposition peak shift between bare Cu (FIG. 14A) and RPC-coated Cu (FIG. 14B) in a carbonate electrolyte samples implies the formation of a chemically different SEI from the electrolyte-derived one.

In such an exemplary and unlimiting aspect, the RPC-derived SEI can be formed by a two-step reaction on the exemplary Li surface. In such aspects, the RPC layer, attached to the Li surface, can occupy surface sites via a chemical reaction between Li and sulfonyl fluoride, a fluorinating group. As shown in FIGS. 11-12, in such exemplary aspects, both LiF and —$SO_2$—Li salts were found at the interface, and the COOH groups in the GO were converted to —$CO_2$—Li. The formed layer (surface passivating layer as shown in FIG. 11B), containing polymers, nanoscale salt particles, and GO nanosheets, can be sufficiently dense, and therefore, block electrolyte access to the Li surface (FIG. 13). The attached RPC can react at the interface to form the nanoscale SEI components, as disclosed herein. This reaction results in an interface that is electrochemically different from that of a conventional electrolyte-derived SEI. In such aspects, these results were evidenced by peak shifting in cyclic voltammetry, as shown in FIG. 14. In still further aspects, the unreacted RPC layer on the top of the SEI can continue to serve as a reservoir to maintain the SEI upon cycling.

Figure 10:
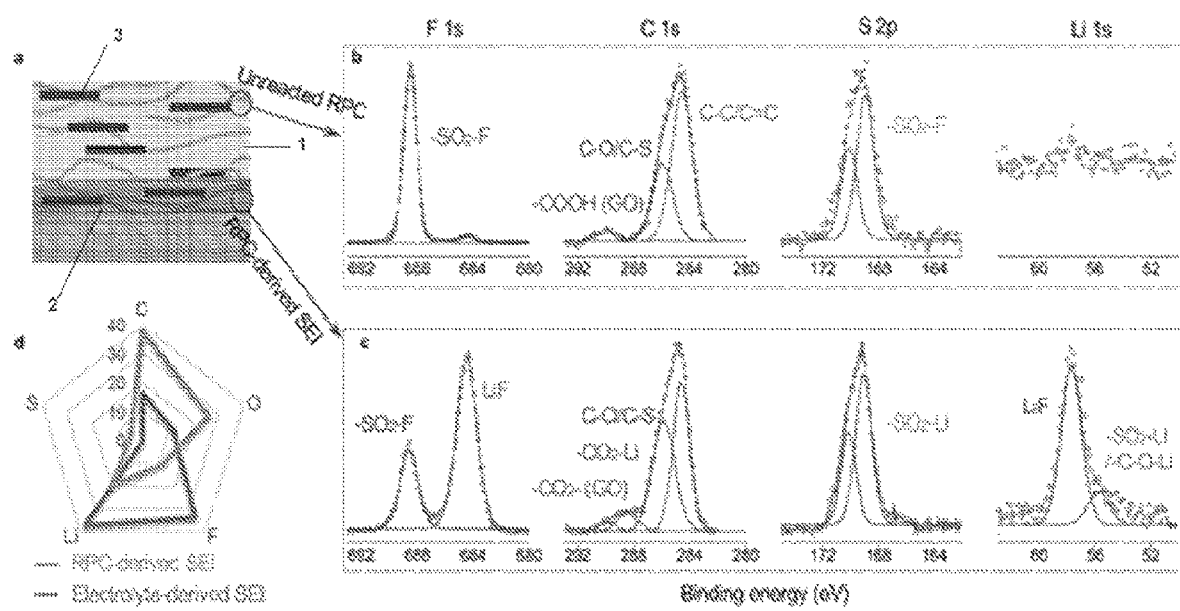
FIGS. 10A-10D depict a schematic of SEI chemistry ruled by the RPC in one aspect.

In still further aspects, to identify the chemistry at the interface, high-resolution XPS, Fourier transform infrared (FT-IR) spectroscopy, and elemental concentration analyses can be used. For example, FIG. 10A shows the results of some of the exemplary analyses on the cycled Li after 30 cycles. As schematically illustrated in FIG. 10A, the top surface of the electrode can be covered by the unreacted RPC, and the SEI can be positioned between this unreacted RPC and Li metal. FIG. 10B shows high-resolution XPS spectra of the unreacted RPC. —$SO_2$—F groups (688.3, 169.4, and 170.6 eV in the F 1s and S 2p spectra, respectively), C—O—C/C—S bonds (286.2 eV in the C 1s spectrum), and —$CO_2$— groups from GO (289.8 eV in the C 1s spectrum) were observed. These peaks are consistent with those of the pristine RPC (FIG. 5D), indicating that the chemical structure of the unreacted RPC remains unaltered.

In still further exemplary aspects, a highly polymeric SEI was detected on the interface (FIG. 10C). A detailed peak interpretation is as follows: peaks at 688.5 and 684.5 eV in the F 1s spectrum were attributed to —$SO_2$—F and LiF, respectively; peaks at 289.9, 288.4, 285.9, and 284.6 eV in the C 1s spectrum were found to belong to —$CO_2$— from GO, —$CO_2$—Li from reduced GO and the carbonate electrolyte, C—O and C—S bonds (overlapped) from reduced DOL and —$SO_2$— groups, and C—C bonds from the polymer backbone, respectively; split peaks at 170.2 and 169.0 eV in the S 2p spectrum were assigned to overlapped —$SO_2$—F and —$SO_2$—Li groups[41]; peaks at 57.6 and 55.6 eV in the Li 1s spectrum were assigned to Li—F and —$SO_2$—Li/—C—O—Li, respectively. In such exemplary aspects, the RPC-derived SEI can contain a polymer integrating side groups of —$SO_2$—Li and —C—O—Li, LiF nanoparticles, and GO nanosheets.

Figure 16:
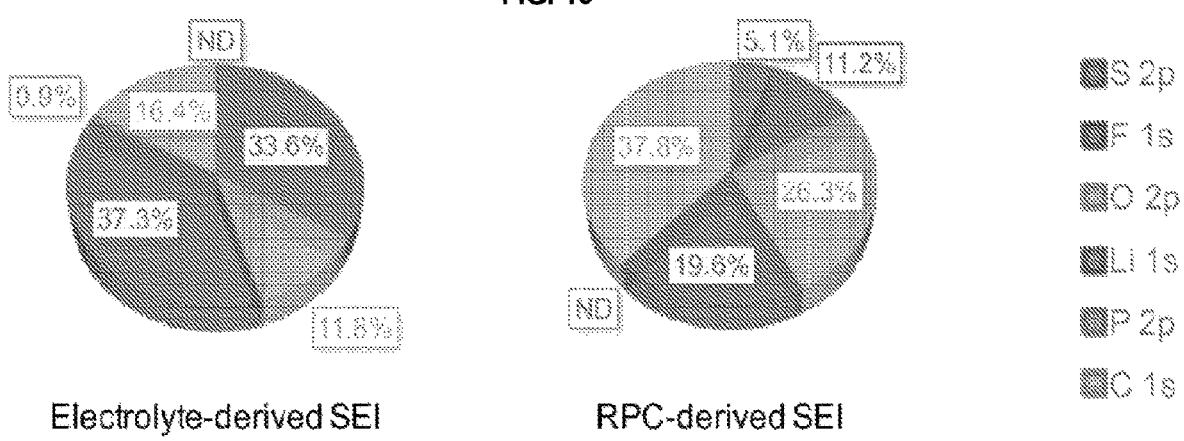
FIG. 16 depicts elemental concentrations of S, F, O, Li, P, and C in the electrolyte-derived SEI and RPC-derived SEI.
Figure 17:
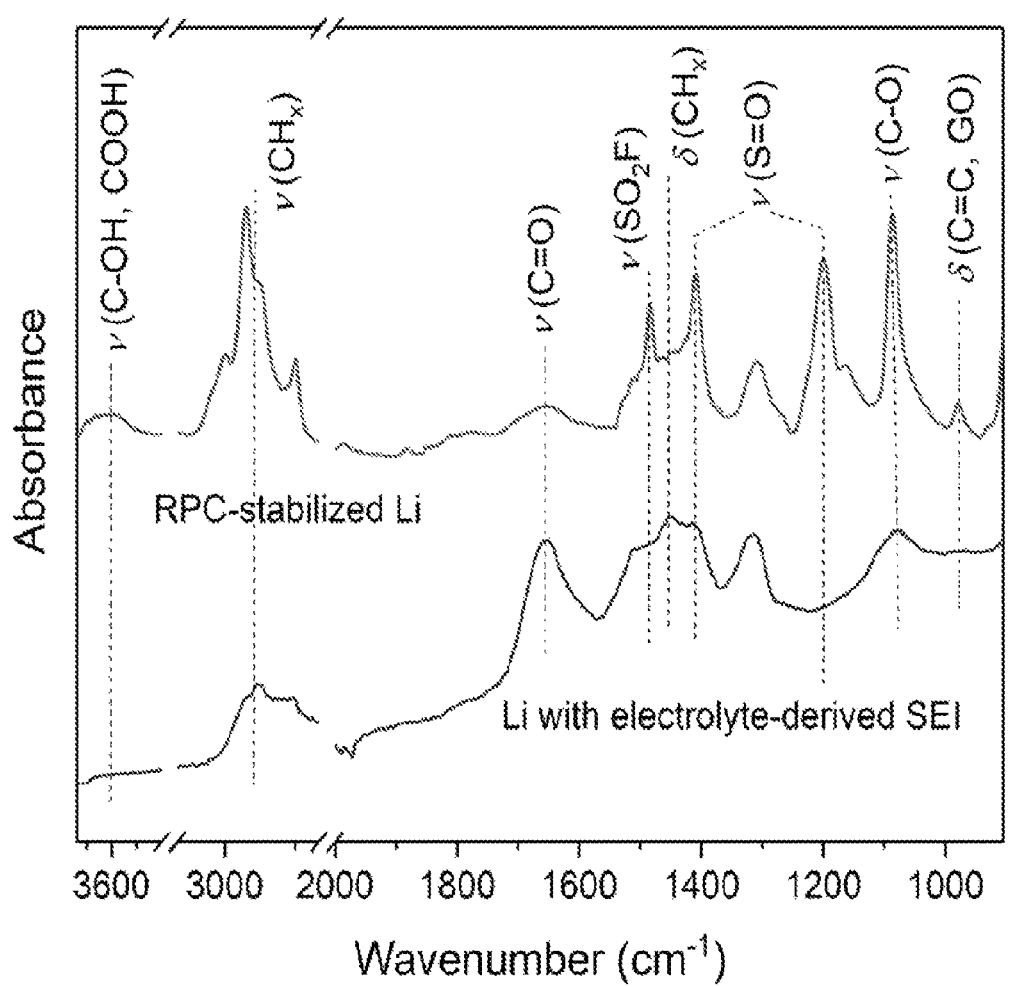
FIG. 17 depicts the FT-IR spectra of the cycled bare Li (black (1)) and RPC-stabilized Li (red (2)) anodes.

It was found that in such aspects, the reactive polymer composite derived SEI is distinct from that of a conventional electrolyte-derived SEI, which consists primarily of inorganic Li salts such as $Li_2CO_3$, $Li_xPO_yF_z$, and $Li_2O$ (FIG. 15) and is predominantly inorganic. XPS elemental concentration analysis was found to further support this finding. The RPC-derived SEI has a high content of C (37.8%) and O (26.3%), and low content of Li (19.6%) and F (11.2%) (FIG. 10D and FIG. 16). This is in clear contrast with the electrolyte-derived SEI, which has high concentrations of Li (37.3%) and F (33.6%) (FIG. 10D). A similar conclusion can be reached from the FT-IR data (FIG. 17).

Figures 18A, 18B, 18C, 18D, 18E, 18F, 18G, 18H, 18I, 18J, 18K, 18L:
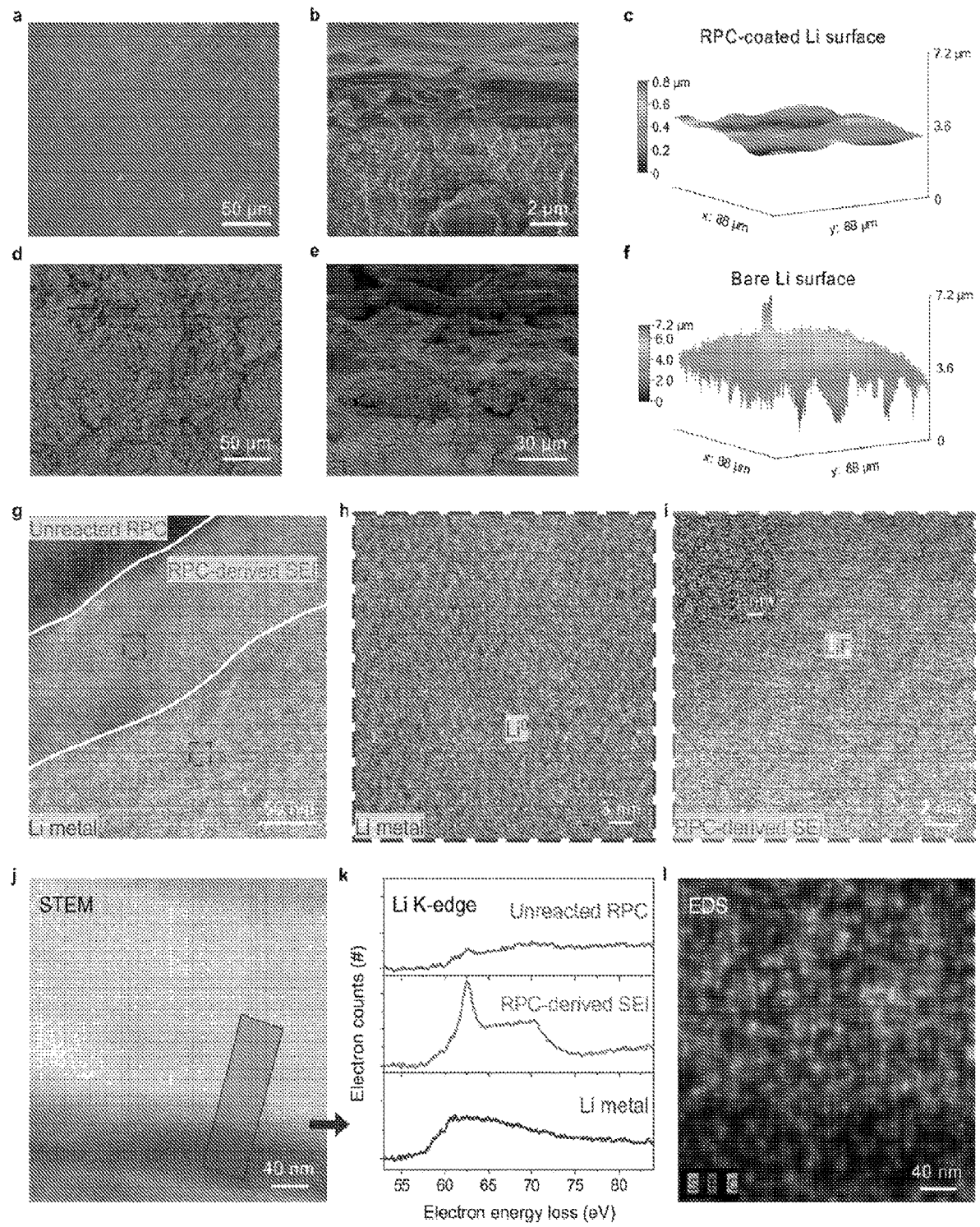
FIG. 18A-18L depict an exemplary polymer-inorganic composite structure of the RPC-derived SEI.
Figure 19:
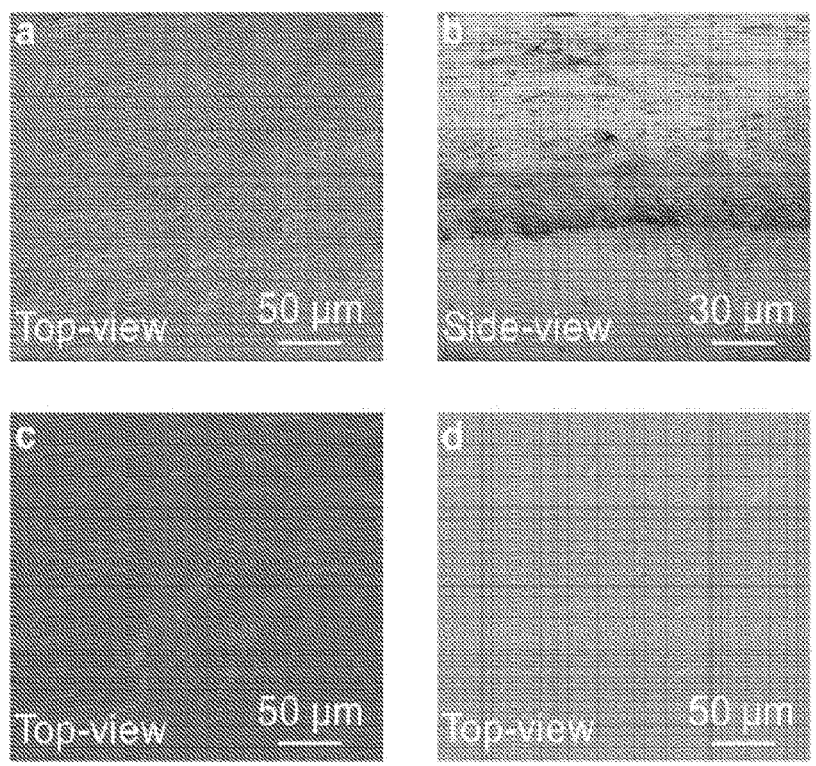
FIGS. 19A-19D show SEM images of the cycled RPC-stabilized Li.
Figure 21:
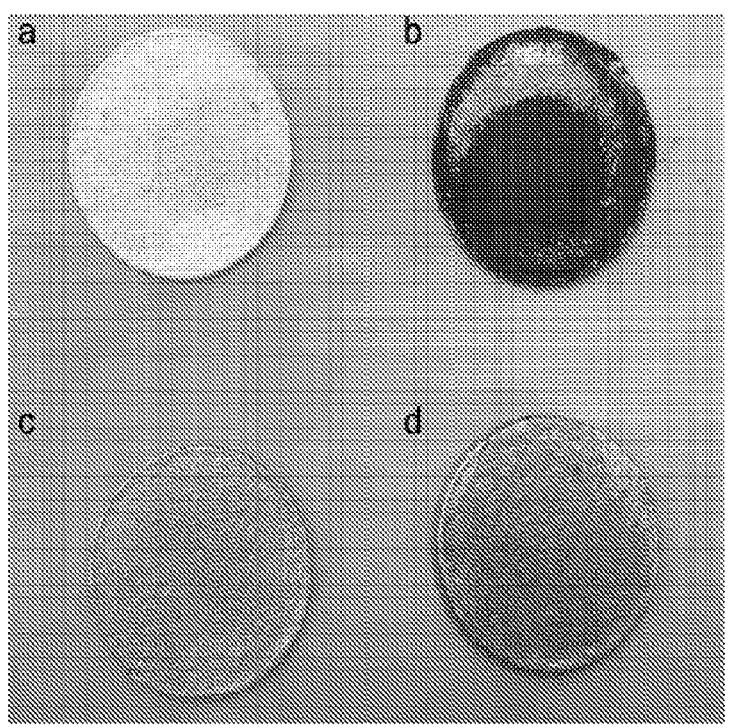
FIGS. 21A-21D depict optical photographs of the RPC-stabilized Li before and after cycling.
Figure 22:
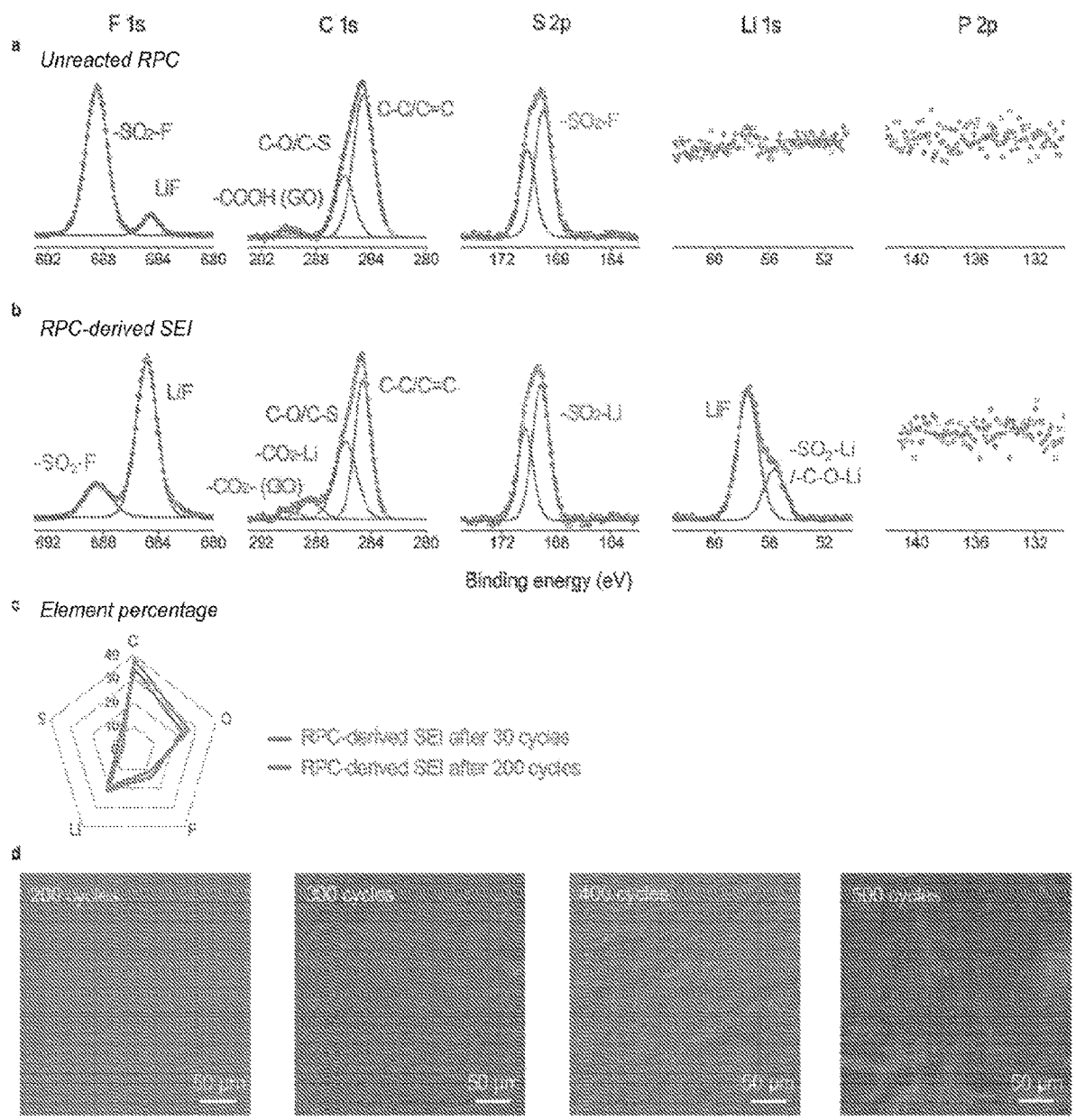
FIGS. 22A-22D depict the chemical and physical evolution of the RPC-stabilized Li during long cycling.

In still further aspects, the morphology and nanostructure of SEI can also be examined by any known in the art methods. For example, the RPC-stabilized Li electrode after 30 cycles was found to have a flat surface morphology, as observed in top- and side-view scanning electron microscopy (SEM) images (FIGS. 18A-18B and FIG. 19 and FIG. 20). It was found by use of the optical profilometry, that the Li surface as substantially defect-free with small height differences up to 0.8 µm (FIG. 18C). In still further aspects, the Li surface is referred to as substantially defect-free, when the height difference is less than about 2 µm, less than about 1.7 µm, less than about 1.5 µm, less than about 1.2 µm, less than about 1 µm, less than about 0.8 µm, less than about 0.5 µm, or less than about 0.2 µm. In contrast, the surface of cycled bare Li is very rough (FIGS. 18D-18E), with height differences up to 7.2 µm (FIG. 18F). Photographs of Li electrodes have shown that the surface of the RPC-stabilized Li remains shiny, whereas the bare Li surface turns black (FIG. 21). The morphology and structure of RPC-stabilized Li were found to be durable even after extensive cycling, as evidenced by SEM and XPS (FIG. 22).

Figure 23:
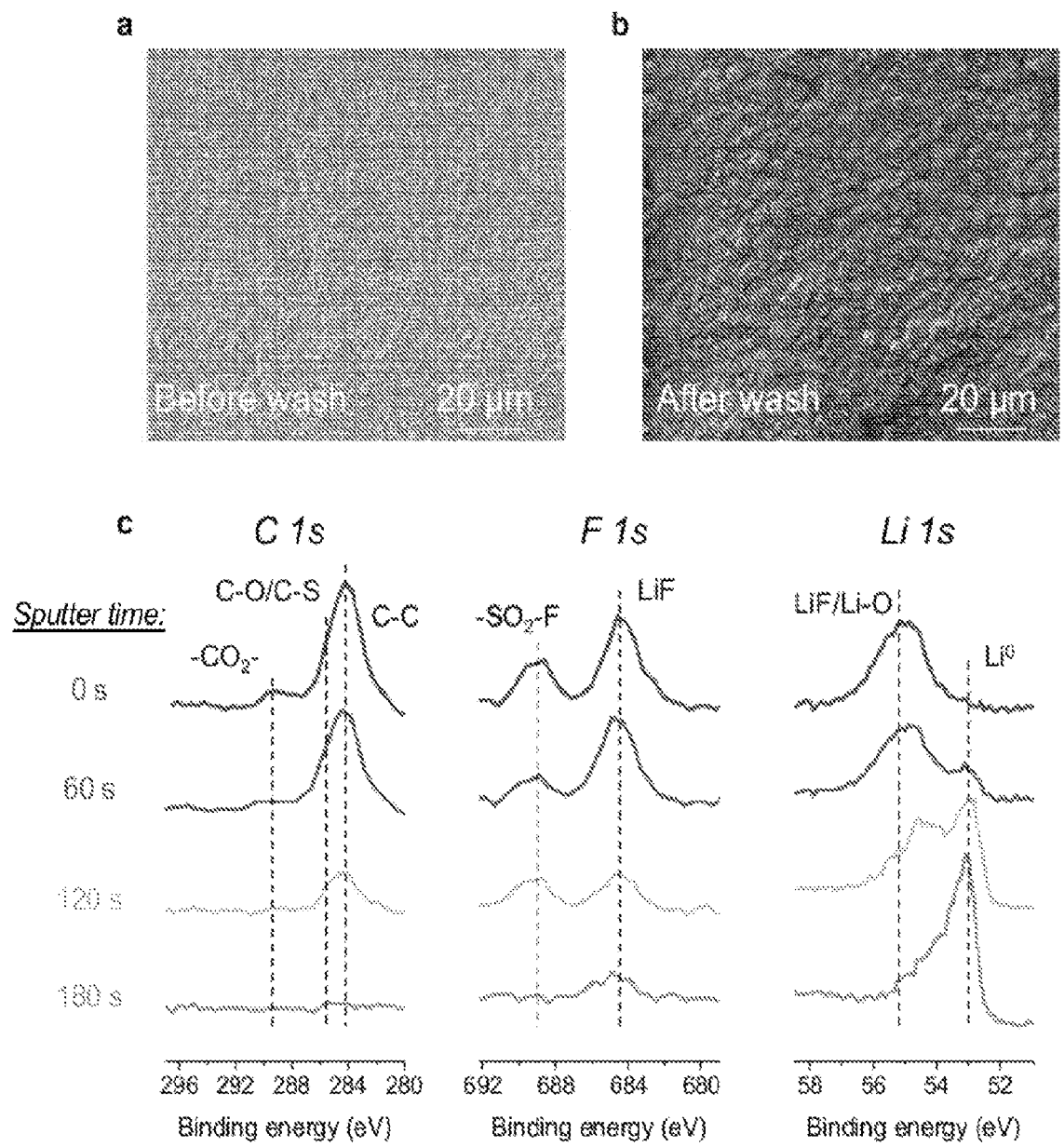
FIGS. 23A-23C depict observation of Li deposition morphology underneath the unreacted RPC layer.

In still further aspects, it was found that after removing the unreacted RPC layer, the deposited Li during the deposition cycle showed a dendrite-free morphology (FIG. 23). It is understood that in aspects disclosed herein, the uniformity of Li deposition with the RPC layer present is improved when compared to the Li deposition when SEI is derived from the electrolyte.

Figure 24:
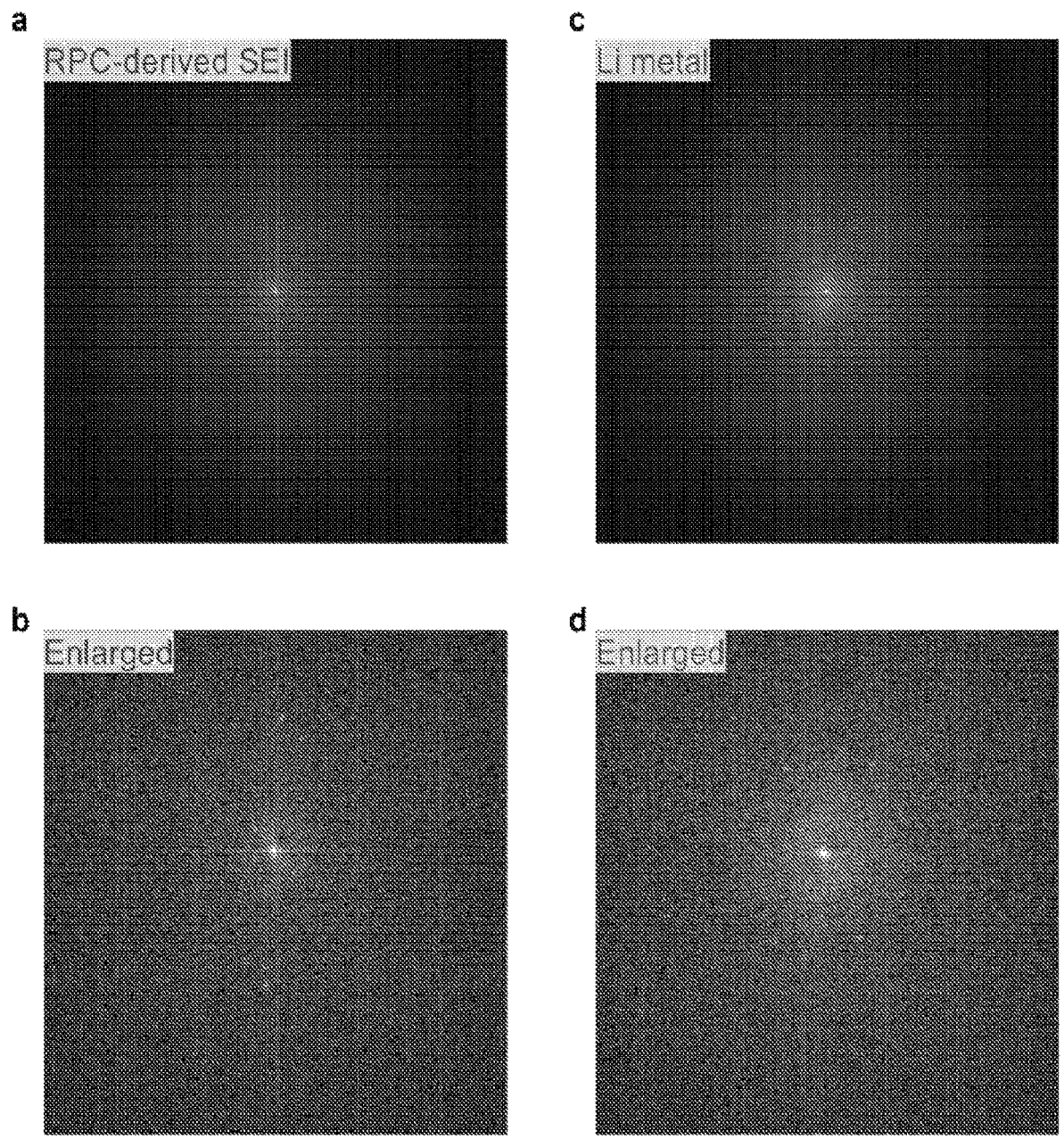
FIGS. 24A-24D depict FFT images of the RPC-derived SEI (left) and Li (right) regions taken from the interface of the RPC-stabilized Li.
Figure 25:
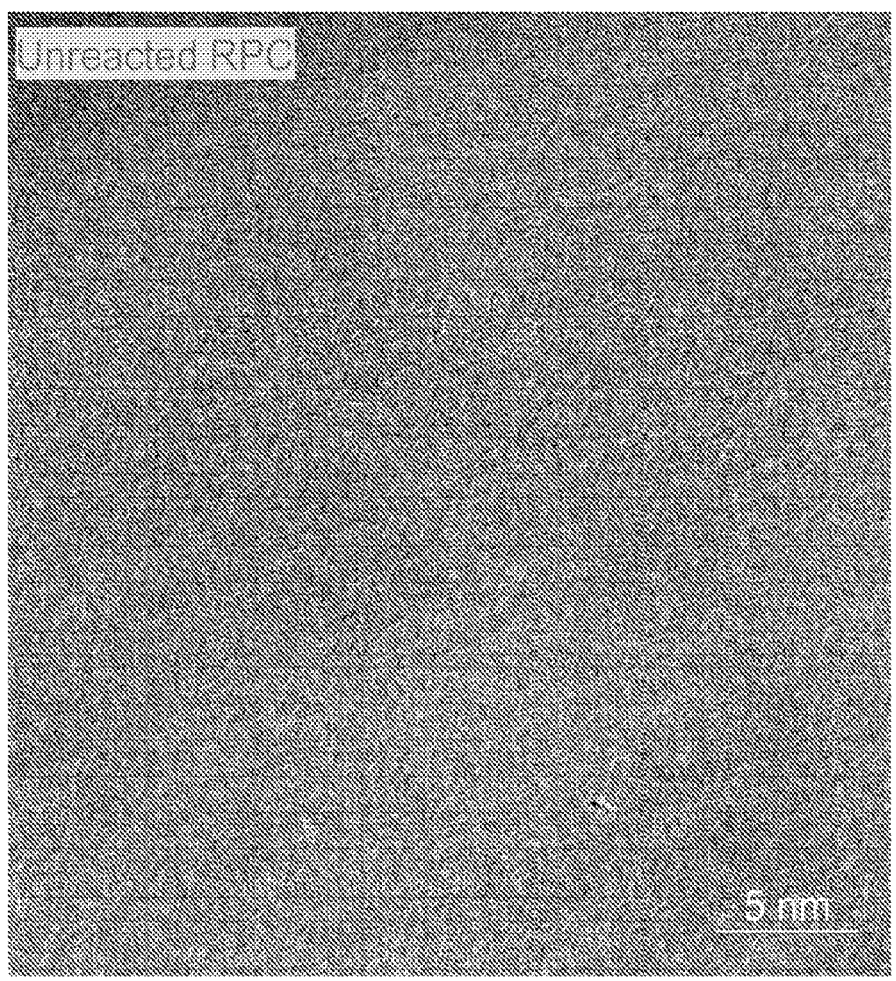
FIG. 25 depicts a high-resolution TEM image of the unreacted RPC region taken from the interface of the RPC-stabilized Li.
Figure 26:
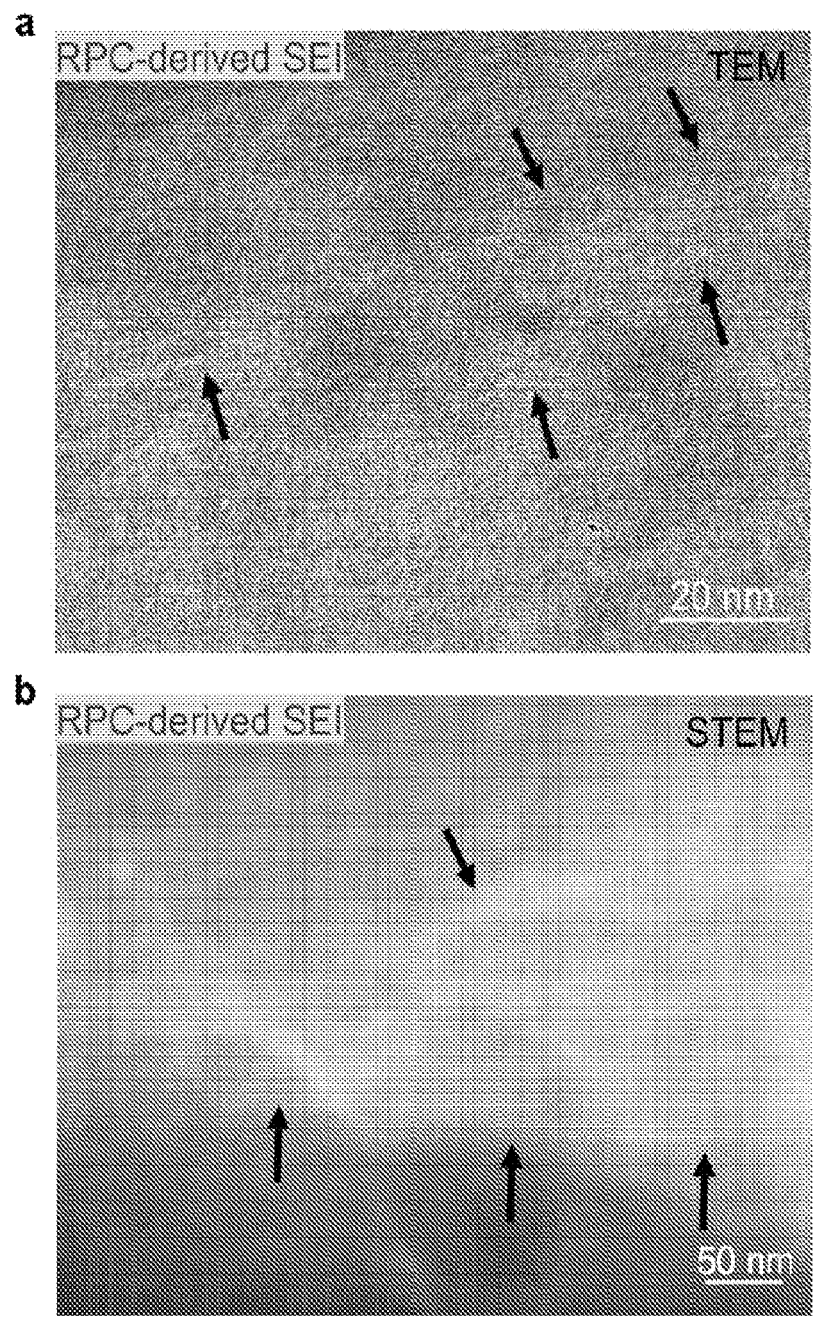
FIGS. 26A-26B depict TEM (FIG. 26A) and STEM images (FIG. 26B) of the RPC-derived SEI regions taken from the interface of the RPC-stabilized Li.

In still further aspects, the nanostructure of the RPC-derived SEI using cryo-TEM was examined. FIG. 18G shows a TEM image of such an exemplary interface. In such exemplary aspects, three layers displaying different contrast were observed. The layers can be recognized as the unreacted RPC, RPC-derived SEI, and Li (from top to bottom in FIG. 18G), respectively. In such exemplary and unlimiting aspects, the SEI found to have a thickness of about 90-120 nm and be disposed of between the unreacted RPC and Li layers. The high-resolution images were used to study the specific nanostructure of these three layers. In the Li layer (FIG. 18H, the squared region in purple), the {110} Li plane with a lattice spacing of 0.25 nm was observed, which is consistent with deposited Li. The lattice spacing was further confirmed in a corresponding fast Fourier transform (FFT) image (FIGS. 24C-24D). In the RPC-derived SEI layer (FIG. 18I, the squared region in orange), an amorphous layer containing embedded nanocrystals was observed. The lattice spacings of these nanocrystals were found to be 0.20 and 0.23 nm, corresponding to the {200} and {111} LiF planes, respectively (FIGS. 24A-24B). The majority of the SEI was found to be amorphous and could be identified as polymeric Li salts. Another RPC component, the GO nanosheets, has shown a wavy morphology in both the unreacted RPC and the SEI layers (FIG. 25 and FIG. 26).

In still further aspects, encouragingly, unlike a conventional electrolyte-derived SEI, which shows multiple-layered or porous nanostructures, the RPC-derived SEI found to be homogeneous and dense. Without wishing to be bound by any theory, it was hypothesized that this is one of the reasons for the improved SEI stability and effective suppression of dendritic Li growth. In still further aspects, the characteristic components derived from electrolyte decomposition, such as $Li_2CO_3$ crystals, were not found in the TEM image (FIG. 18I) of the RPC-derived SEI. In still further exemplary aspects, this has been found to be consistent with the result of XPS studies that the concentration of the electrolyte-derived —$CO_2$—Li (the peak at 289.1 eV in the C 1s spectrum) was very limited.

Figure 27:
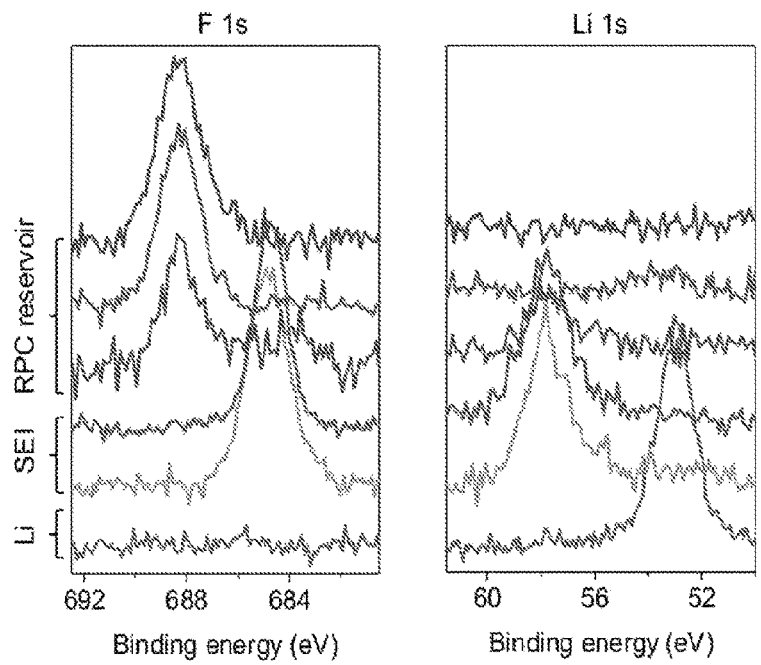
FIG. 27 depicts an XPS depth profiling of the cycled RPC-stabilized Li.

In still further aspects, the interfacial chemical compositions can be examined by any methods known in the art, for example, by using electron energy loss spectroscopy (EELS) and energy-dispersive X-ray spectroscopy (EDS). FIG. 18J depicts an exemplary scanning transmission electron microscopy (STEM) image of the cycled RPC-stabilized Li. In such exemplary aspects, a region containing the unreacted RPC, SEI, and Li layers was identified, and the composition was analyzed by pixel-by-pixel (FIG. 18K). The Li K-edge spectrum taken from the bottom purple area has shown a broad peak centered at 63 eV, corresponding to Li metal. The peak shape in the red area spectrum can be attributed to LiF, indicating that this area belongs to the SEI. A very low Li intensity in the green top region was observed, and thus it was identified as the unreacted RPC layer. Without wishing to be bound by any theory, it was hypothesized that the presence of the weak Li signal could probably be caused by beam-induced diffusion of Li. In the EDS image based on the STEM image, d the three different layers (FIG. 18L) were also identified. The top layer has found to contain S, F, and C, and therefore, was identified as the unreacted RPC. The middle layer has shown to contain S and F, and therefore, was identified as the SEI. The bottom layer has shown very weak C, F, and S signals, which could be attributed to Li. In yet further exemplary aspects, the XPS depth profiling further confirmed the three-layer structure (FIG. 27). Based on these exemplary results, it is understood that the RPC-derived SEI comprises polymeric Li salts, embedded nanoparticles of LiF, and GO nanosheets. In yet further aspects, the RPC-derived SEI exhibits excellent homogeneity and density.

Figure 28:
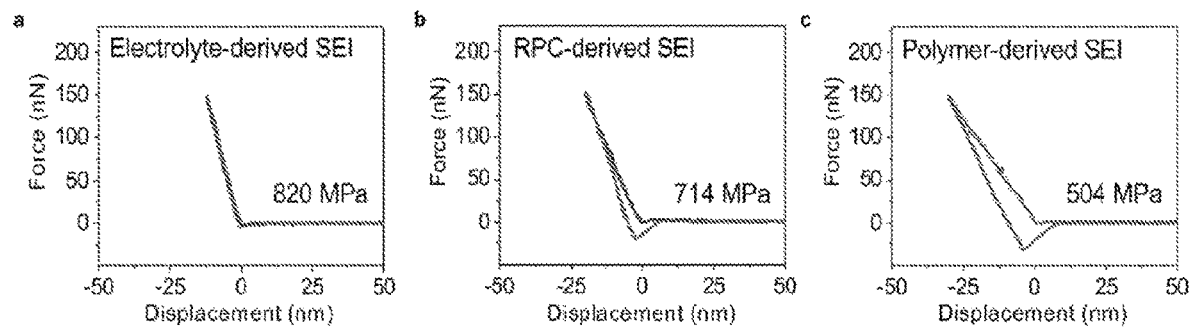
FIGS. 28A-28C depict force-displacement plots of the electrolyte-derived SEI (FIG. 28A), RPC-derived SEI (FIG. 28B), and polymer-derived SEI (FIG. 28C).
Figure 29:
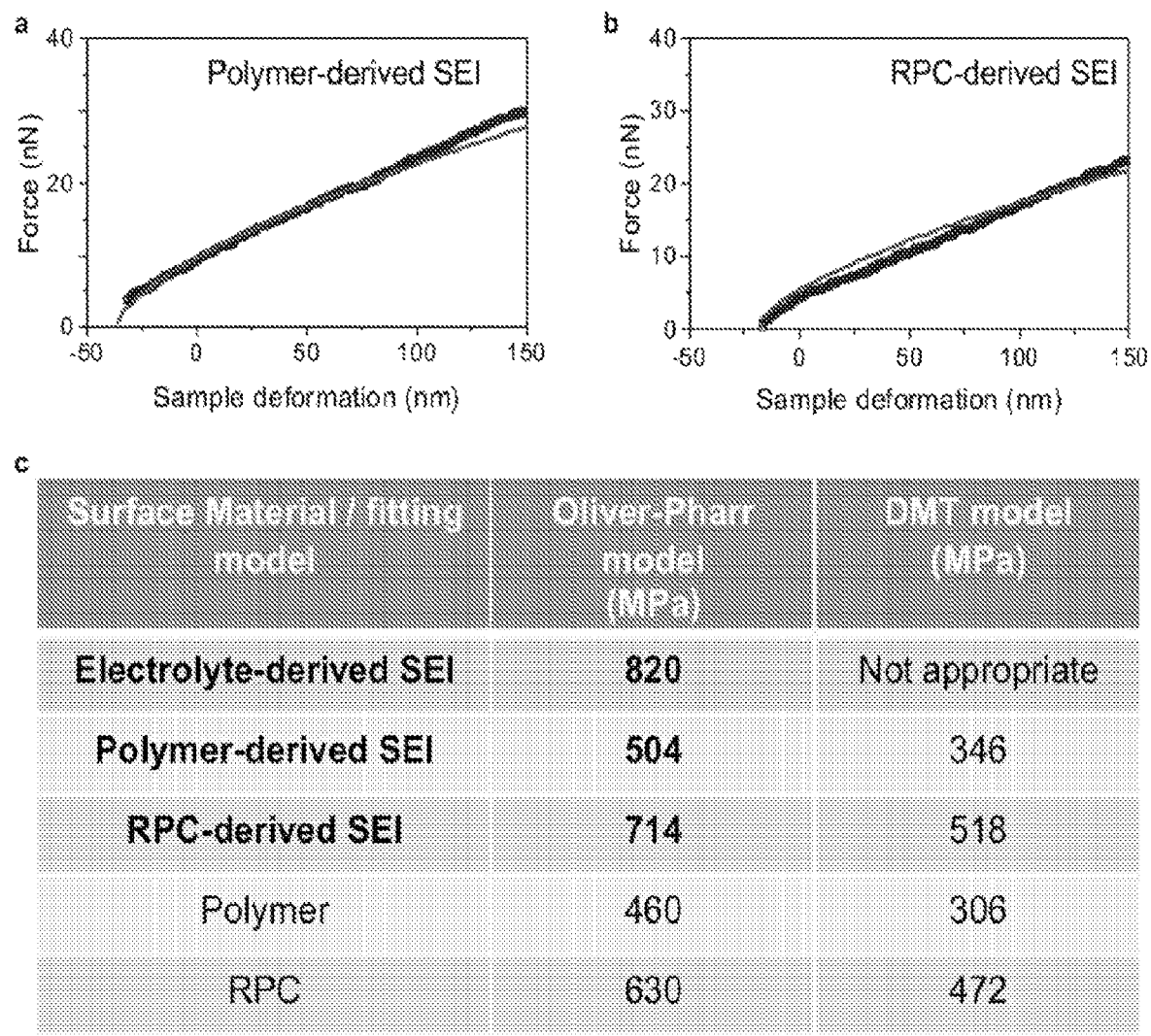
FIGS. 29A-29C depict a fitting based on Oliver-Pharr and DMT contact models.
Figure 30:
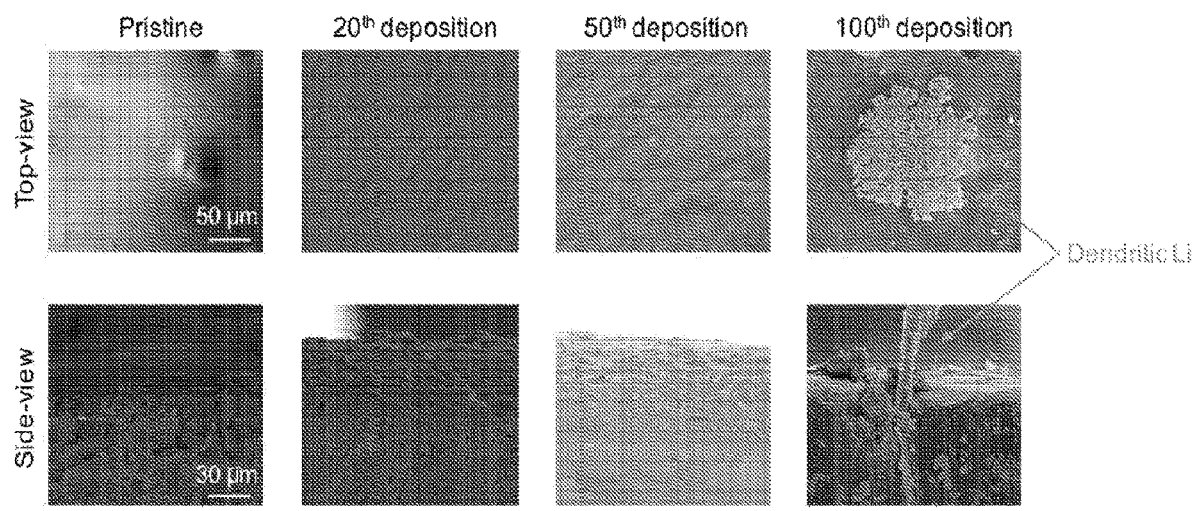
FIG. 30 depicts SEM images of the cycled Li with P(SF-DOL) after 50 cycles in a carbonate electrolyte.
Figure 31:
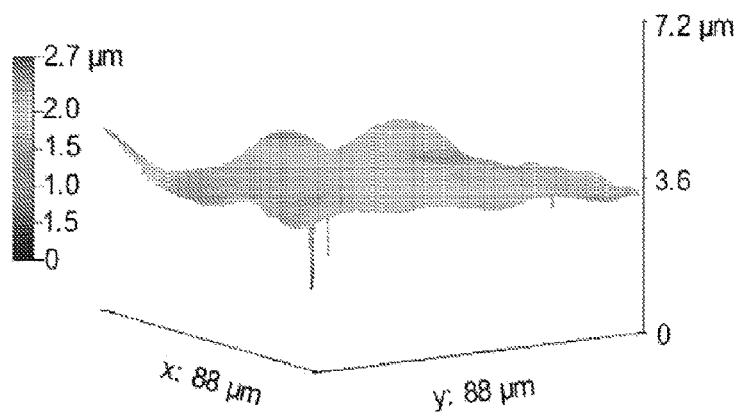
FIG. 31 depicts a three-dimensional optical profilometry image of the surface of the cycled Li with P(SF-DOL).

In still further aspects, the mechanical strength of the RPC-derived SEI layer can be measured using AFM indentation (FIG. 28 and FIG. 29). Interestingly, it was found that the presence of GO nanosheets in the SEI can enable obtaining both good modulus and flexibility, which are normally mutually exclusive. The improved mechanical strength ensures that the SEI has good tolerance to the interfacial fluctuations that occur during Li deposition. (FIG. 30 and FIG. 31).

Figure 32:
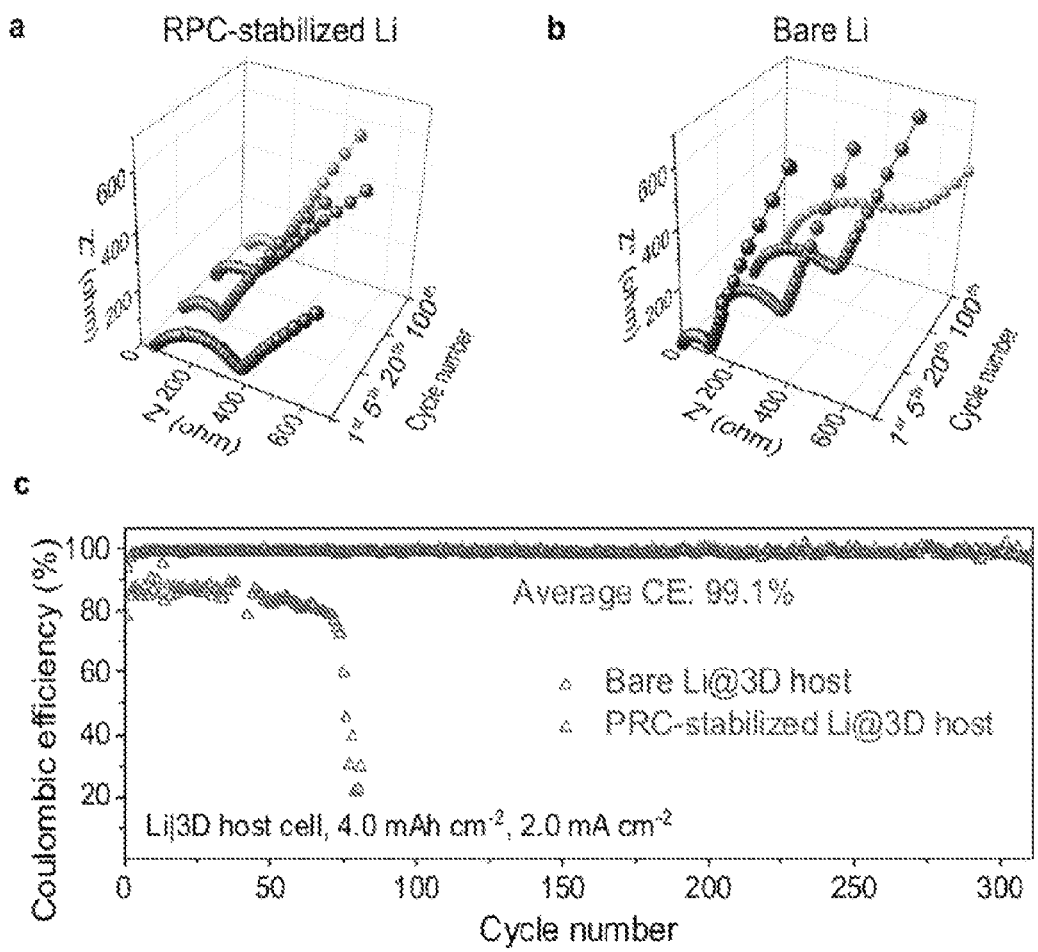
FIGS. 32A-32C depict the interfacial stability of RPC-stabilized Li anodes.

In still further aspects, the interfacial stability of exemplary Li anodes upon cycling can also be examined by any known in the art methods. In some aspects, a plating/stripping test for Li anodes with and without the RPC can be used. In such exemplary aspects, it was found that the RPC-stabilized Li can display stable resistance (FIG. 32A and FIG. 33) and voltage profiles (FIG. 34 and FIG. 35), while those of bare Li can increase dramatically (FIG. 32B and FIG. 34). The use of the RPC with an exemplary and unlimiting thickness of about 3 μm can provide for a moderate Li deposition overpotential (FIG. 36).

In still further aspects, the efficiency of Li deposition at an exemplary Li deposition amount of about 4.0 mAh $cm^{-2}$ can also be measured in a Li|3D host cell, wherein the 3D host comprises any one of mentioned above hosts. In still further aspects, the deposition amount can be about 0.5 mAh $cm^{-2}$, about 1 mAh $cm^{-2}$, about 2 mAh $cm^{-2}$, about 3 mAh $cm^{-2}$, about 4 mAh $cm^{-2}$, about 5 mAh $cm^{-2}$, about 6 mAh $cm^{-2}$, about 7 mAh $cm^{-2}$, about 8 mAh $cm^{-2}$, about 9 mAh $cm^{-2}$, about 10 mAh $cm^{-2}$, or even about 15 mAh $cm^{-2}$.

Figure 37:
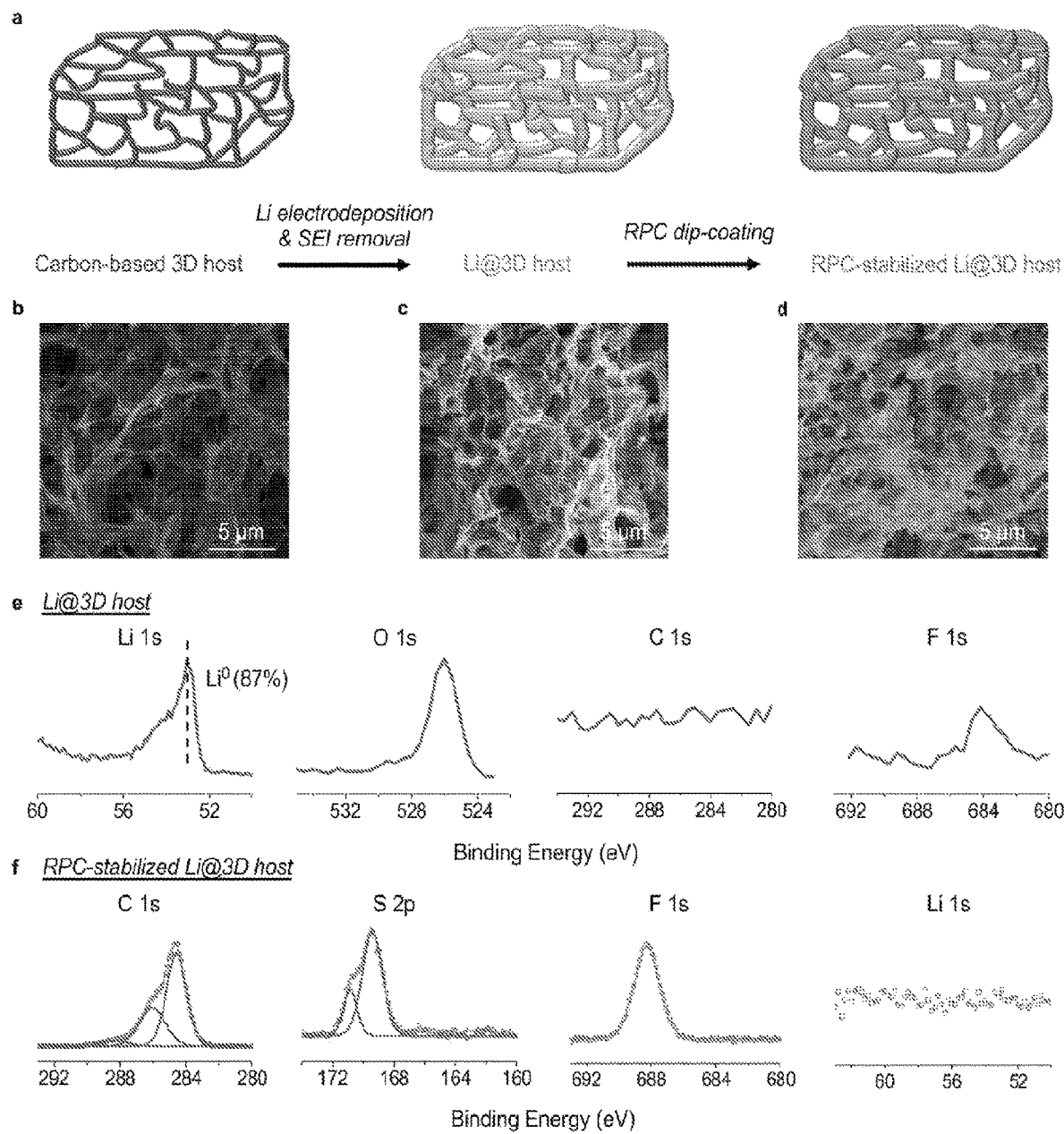
FIGS. 37A-37F depict the preparation of RPC-stabilized Li@3D host electrodes.

Without wishing to be bound by any theory, it was assumed that the use of 3D hosts can reduce interfacial fluctuations during Li deposition (FIG. 37). In some exemplary aspects, the average efficiency of about 99.1% can be achieved in 300 cycles at a current density of 2.0 mA $cm^{-2}$ (FIG. 32C). In still further aspects, an average efficiency of about 90%, about 95%, about 99%, about 99.1%, about 99.2%, about 99.3%, about 99.4%, about 99.5%, about 99.6%, about 99.7%, about 99.8%, about 99.9%, or even about 99.999% can be achieved in 300 cycles at a current density of 2.0 mA $cm^{-2}$. In still further aspects, the similar efficiency as disclosed above can be achieved in 400 cycles, 500 cycles, 600 cycles, 700 cycles, 800 cycles, 900 cycles, or even 1,000 cycles at the current density of 2.0 mA $cm^{-2}$. It is further understood that the current density, as shown herein, is exemplary and unlimiting and can be from about 0.1 mA $cm^{-2}$ to about 10 mA $cm^{-2}$, including exemplary values of about 0.5 mA $cm^{-2}$, about 1 mA $cm^{-2}$, about 1.5 mA $cm^{-2}$, about 2 mA $cm^{-2}$, about 2.5 mA $cm^{-2}$, about 3 mA $cm^{-2}$, about 3.5 mA $cm^{-2}$, about 4 mA $cm^{-2}$, about 4.5 mA $cm^{-2}$, about 5 mA $cm^{-2}$, about 5.5 mA $cm^{-2}$, about 6 mA $cm^{-2}$, about 6.5 mA $cm^{-2}$, about 7 mA $cm^{-2}$, about 7.5 mA $cm^{-2}$, about 8 mA $cm^{-2}$, about 8.5 mA $cm^{-2}$, about 9 mA $cm^{-2}$, and about 9.5 mA $cm^{-2}$ and provide a similar to the disclose above efficiency for 100 to 1,000 cycles, including exemplary values of 200 cycles, 300 cycles, 400 cycles, 500 cycles, 600 cycles, 700 cycles, 800 cycles, and 900 cycles.

Figure 38:
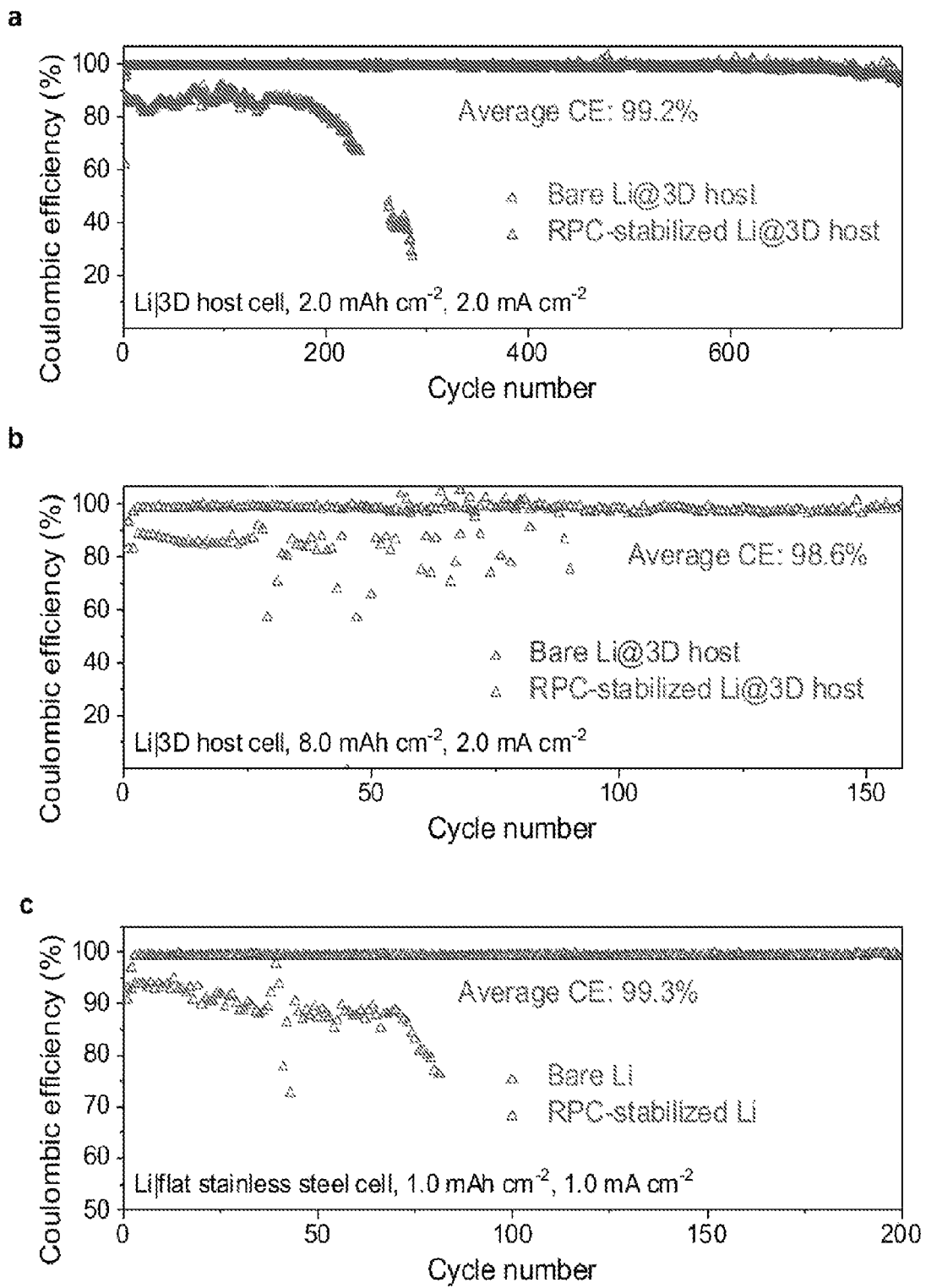
FIGS. 38A-38C depict the efficiencies of Li plating and stripping in the 3D host at a deposition amount of 2.0 (FIG. 38A) and 8.0 mAh cm$^{-2}$ (FIG. 38B) respectively.
Figure 39:
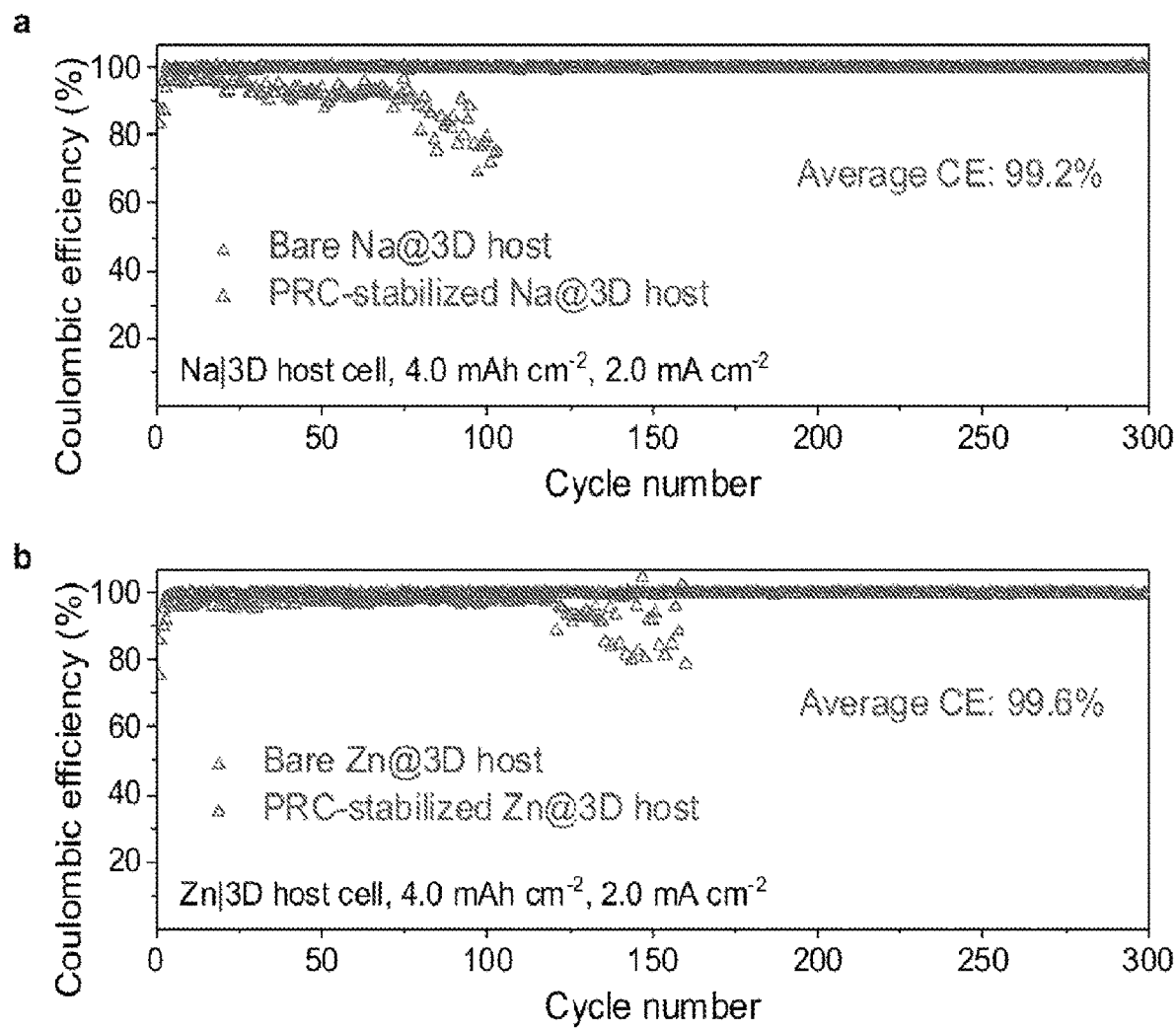
FIGS. 39A-39B depict the efficiencies of plating/stripping of Na (FIG. 39A) and Zn (FIG. 38B), respectively, at a deposition amount of 4.0 mAh cm$^{-2}$.

In still further exemplary aspects, it was found that even when the deposition amount is increased to 8.0 mAh $cm^{-2}$, Li deposition can remain stable and exhibit a high average efficiency of 98.6% (FIGS. 38A-38B). In still further exemplary aspects, the average efficiency of 99.3% can be attained when flat stainless steel foils are used as the current collector (FIG. 38C). It is further understood that the aspects described herein where the active electrode material comprises Li are only exemplary, and the RPCs can be used to form stable SEI layers for sodium (Na) and zinc (Zn) battery anodes. In such exemplary aspects, high efficiencies and extended lifespans can also be obtained for both Na and Zn deposition in metal|3D host cells, respectively (FIG. 39).

Batteries

Still further disclosed herein is a battery comprising: a) an anode material comprising: i) an active electrode material comprising a metal; ii) a reactive polymer composite comprising a reactive functionalized polymer having a main polymer chain with functionalization along the main polymer chain, wherein the functionalization comprises one or more functional groups that are configured to react with a metal electrode to form a polymeric metal salt and one or more functional groups configured to electrochemically decompose; and iii) a solid-electrolyte interphase layer, wherein the solid-electrolyte interphase layer comprises the polymeric metal salt; and b) an electrolyte; and c) a cathode, and wherein the battery exhibits substantially stable cycling for at least 600 cycles.

In still further aspects, the active electrode material present in the disclosed battery can comprise any described herein active electrode materials. It is further understood that the reactive polymer composition present in the anode material can comprise any of the disclosed above RPCs. It is also understood that the solid-electrolyte interphase layer (SEI layer) can comprise any of the disclosed above SEI layers.

In still further aspects, the anode material can comprise lithium, sodium, zinc, or any alloys thereof as the active electrode material.

In still further aspects, the battery can comprise any electrolyte conventionally used in lithium, sodium, zinc, or alloy thereof batteries. In certain aspects, the electrolyte can comprise a liquid Li-ion conducting electrolyte, a solid Li-ion conducting electrolyte, or a combination thereof. In yet further exemplary and unlimiting aspects, the electrolyte can include lithium salts such as lithium hexafluorophosphate, lithium bis(fluorosulfonyl)imide, lithium bis(trifluoromethanesulfonyl)imide, lithium tetrafluoroborate, lithium bis(oxalato)borate in non-aqueous solvents including carbonated solvents (such as ethylene carbonate, ethyl methyl carbonate, diethyl carbonate, etc.), and/or ether-based solvents (such as 1,2-dimethoxyethane, dioxolane, fluorinated ethers (e.g., 1,1,2,2-Tetrafluoroethyl-2,2,3,3-tetrafluoropropyl ether, and the like), and additives such as vinylene carbonate, fluoroethylene carbonate, lithium nitrate, or any combination thereof.

In still further aspects, the disclosed battery can exhibit an electrolyte-to-capacity ratio of less than about 15 $\mu L\ mAh^{1}$, less than about 14 $\mu L\ mAh^{-1}$, less than about 13 $\mu L\ mAh^{-1}$, less than about 12 $\mu L\ mAh^{-1}$, less than about 11 $\mu L\ mAh^{-1}$, less than about 10 $\mu L\ mAh^{1}$, less than about 9 $\mu L\ mAh^{1}$, less than about 8 $\mu L\ mAh^{-1}$, less than about 7 $\mu L\ mAh^{1}$, less than about 6 $\mu L\ mAh^{1}$, or even less than about 5 $\mu L\ mAh^{1}$.

In still further aspects, the battery can comprise a cathode electrode. In such aspects, the cathode electrode can comprise any cathode active materials known in the art. In certain, exemplary and unlimiting aspects, the cathode active materials can comprise Li metal oxides such as $LiMO_2$ (M=Ni, Co, Mn, and other transition metal), $LiMPO_4$ (M=Fe, Mn, Co, and other transition metal), metal oxide, a sulfur-based cathode, and the like.

In yet further aspects, the battery can exhibit a coulombic efficiency for a metal deposition greater than about 90%, greater than about 91%, greater than about 92, greater than about 93%, greater than about 94%, greater than about 95%, greater than about 96%, greater than about 97%, greater than about 98%, greater than about 99%, greater than about 99.5%, or even greater than about 99.9%, when measured at a predetermined current density. In still further aspects, the predetermined current density can be any current density useful for the specific application. In some exemplary and unlimiting aspects, the predetermined current density can be from about 0.1 mAh $cm^{-2}$ to about 10 mAh $cm^{-2}$, including exemplary values of about 0.2 mAh $cm^{-2}$, about 0.5 mAh $cm^{-2}$, about 1 mAh $cm^{-2}$, about 2 mAh $cm^{-2}$, about 3 mAh $cm^{-2}$, about 4 mAh $cm^{-2}$, about 5 mAh $cm^{-2}$, about 6 mAh $cm^{-2}$, about 7 mAh $cm^{-2}$, about 8 mAh $cm^{-2}$, and about 9 mAh $cm^{-2}$.

In yet further aspects, the battery disclosed herein can exhibit electrolyte retention of at least about 70%, at least about 75%, at least about 80%, at least about 85%, at least about 90%, at least about 95%, at least about 99%, or at least about 99.5% after at least 100 cycles. It is further understood that the similar to disclosed above retention can be obtained after at least 150 cycles, 200 cycles, 250 cycles, 300 cycles, 350 cycles, 400 cycles, 450 cycles, 500 cycles, 550 cycles, 600 cycles, 650 cycles, 700 cycles, 750 cycles, 800 cycles, 850 cycles, 900 cycles, or 950 cycles.

Figure 40:
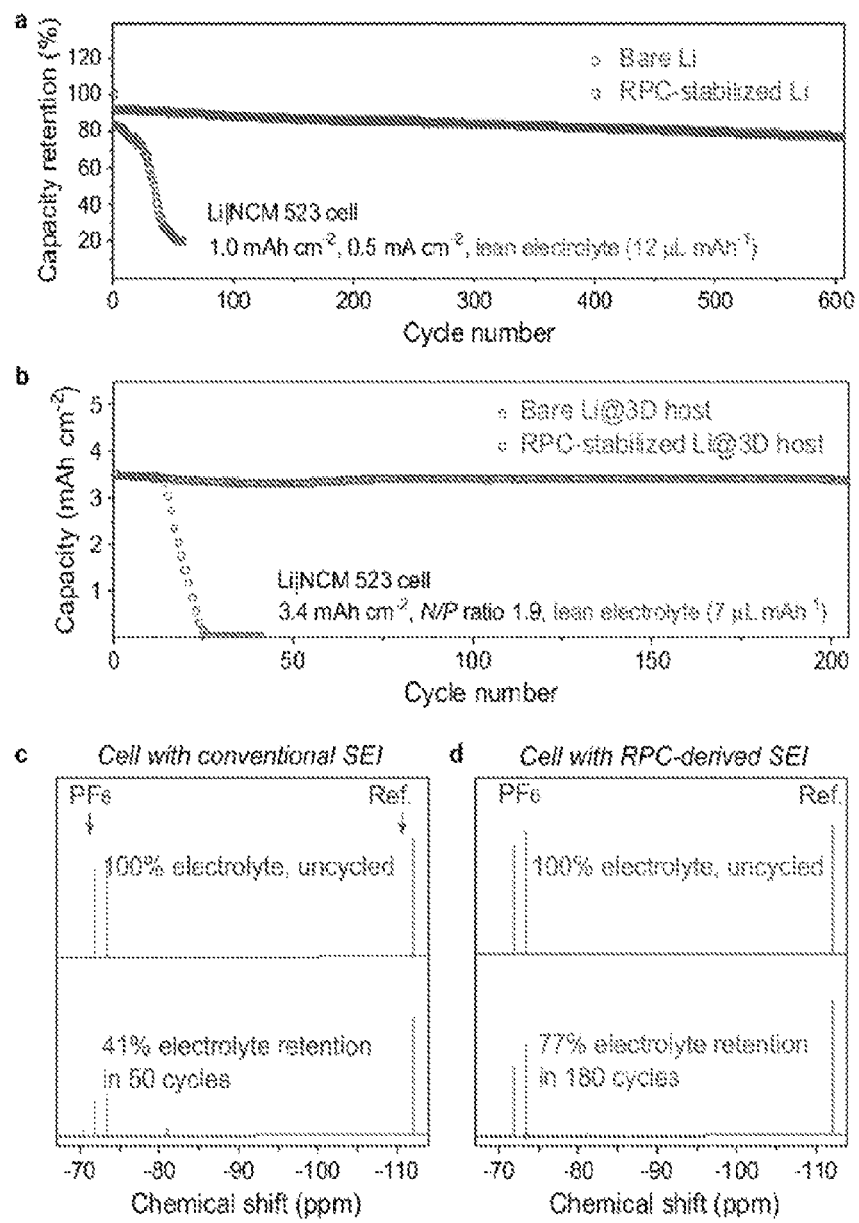
FIGS. 40A-40D depict an electrochemical performance of Li|NCM 523 batteries under lean electrolyte conditions.
Figure 41:
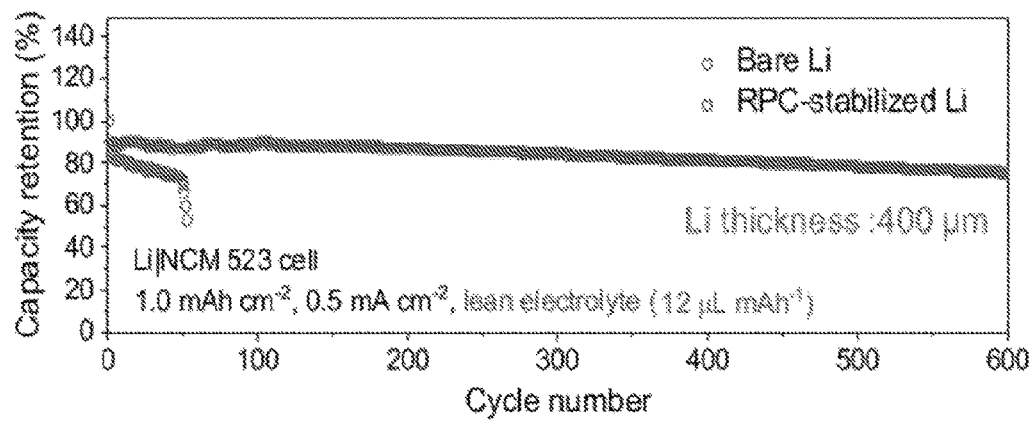
FIG. 41 depicts a cycling performance of the Li|NCM 523 cells in the lean electrolytes (1 M LiPF$_6$ in EC/EMC with 2% LiBOB). The electrolyte-to-capacity ratio is 12 μL mAh$^{-1}$. The Li thickness is 400 μm.
Figure 42:
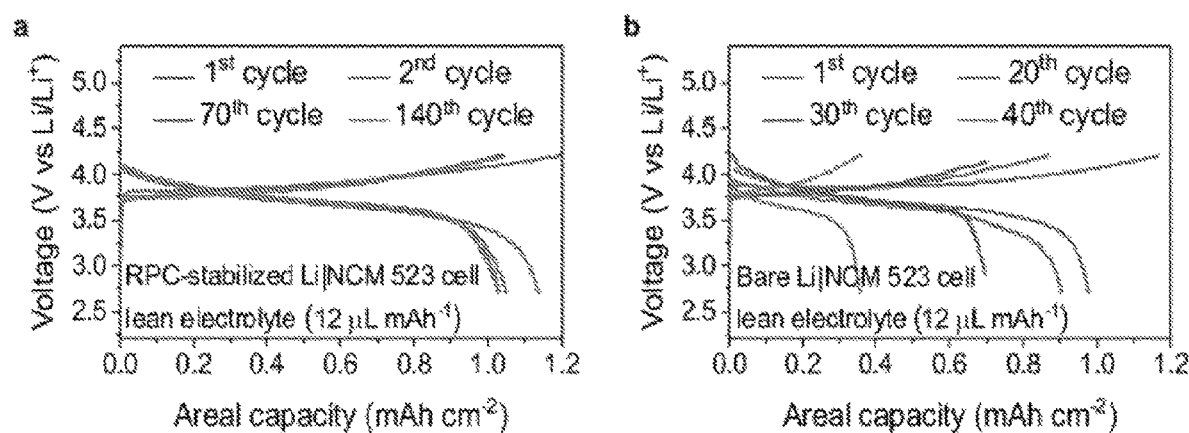
FIGS. 42A-42B depict voltage profiles of the Li|NCM 523 cell under lean electrolyte conditions.

In some aspects, the SEI stability has been demonstrated by cycling Li metal batteries under lean electrolyte conditions. NCM 523 (nickel-cobalt-manganese, having a composition of 5 parts nickel, 2 parts cobalt, and 3 parts manganese) was used as the cathode material and pre-delithiated to pair with Li anodes. The cell was run under lean electrolyte (12 $\mu L\ mAh^{-1}$) and excess Li (400 $\mu m$ Li foil) conditions. In such an exemplary aspect, the cell having the RPC-derived SEI demonstrated capacity retention of 77.1% in 600 cycles (FIG. 41). It was shown that even when less Li was used as the anode (120 $\mu m$ Li foil), the cells have surprisingly shown similar lifespans (FIG. 40A and FIG. 42). In contrast, the capacity of a control cell faded rapidly after 40 cycles. These results verify that the stable interface and restrained electrolyte loss decisively determine the cycling stability of Li metal batteries under lean electrolyte conditions.

Figure 43:
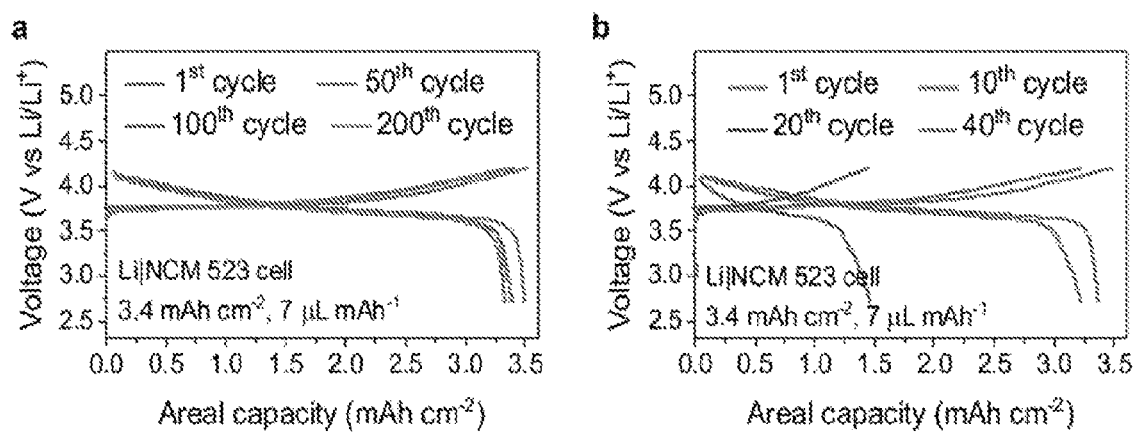
FIGS. 43A-43B depict voltage profiles of the Li|NCM 523 cell incorporating RPC-stabilized Li@3D host anodes under lean electrolyte conditions.
Figure 44:
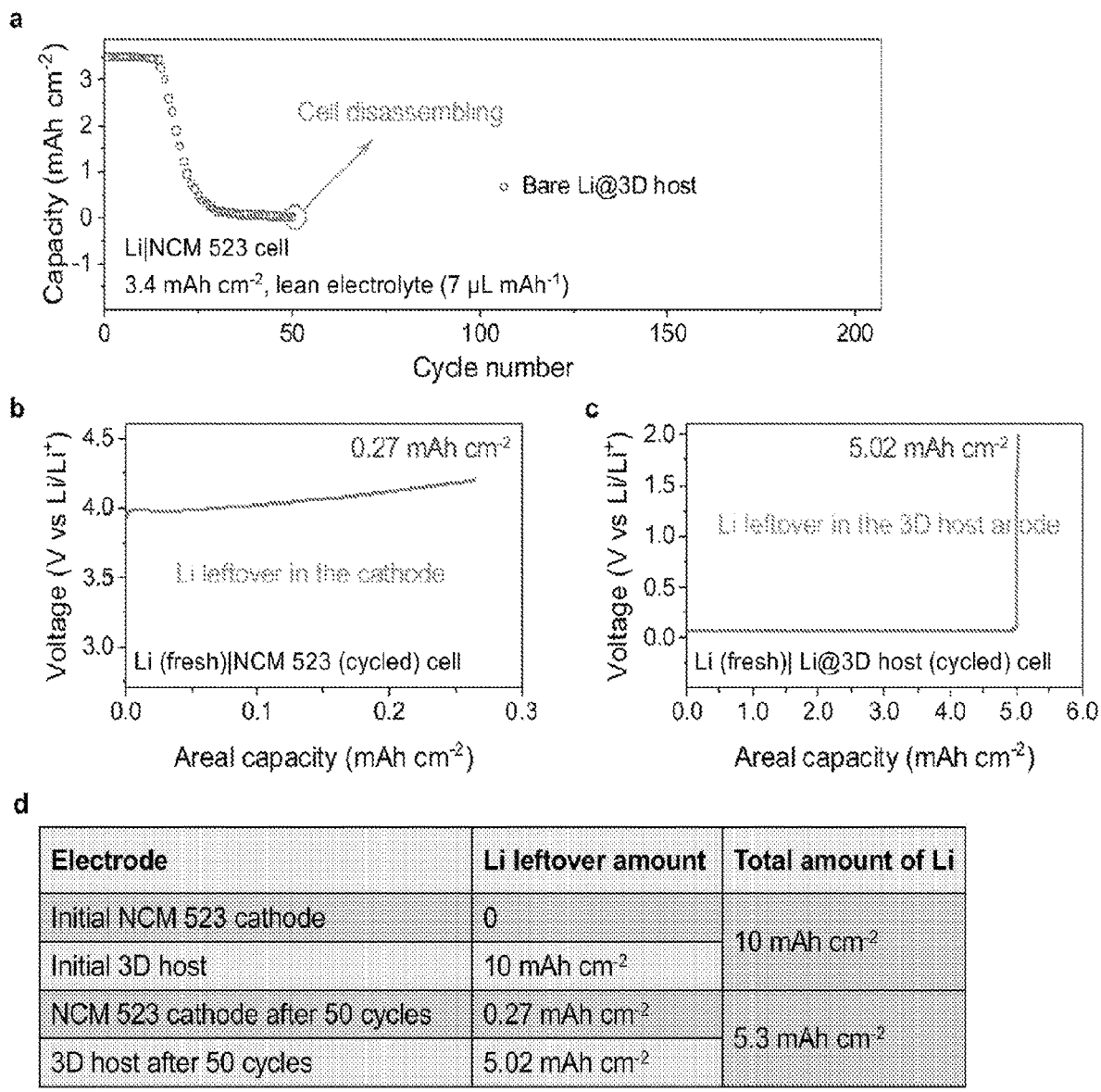
FIGS. 44A-44D depict the Li|NCM 523 cell incorporating conventional SEI after 50 cycles, which is used for electrolyte retention studies.
Figure 45:
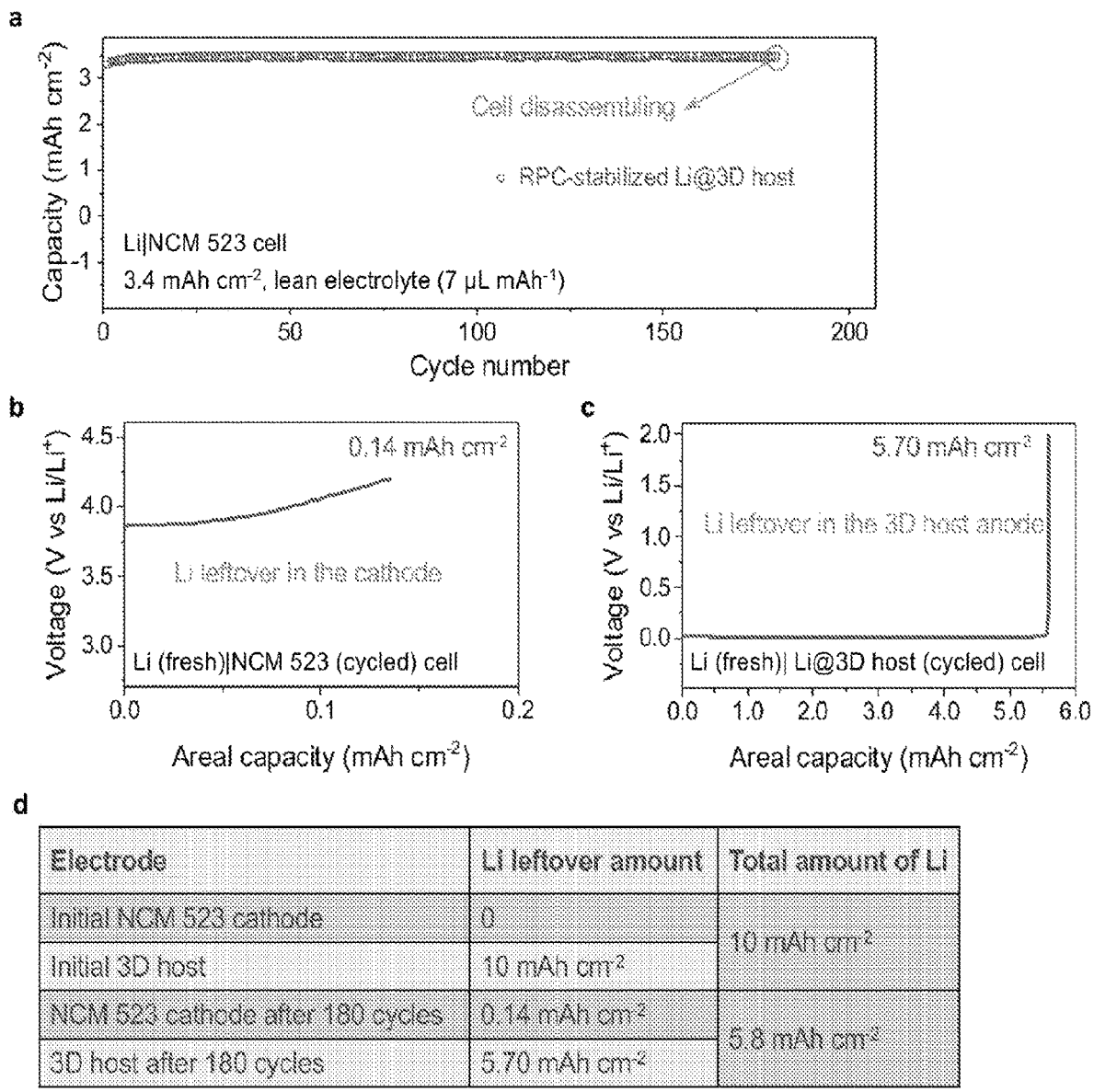
FIGS. 45A-45D depict the Li|NCM 523 cell incorporating RPC-derived SEI after 180 cycles, which is used for electrolyte retention studies.
Figure 46:
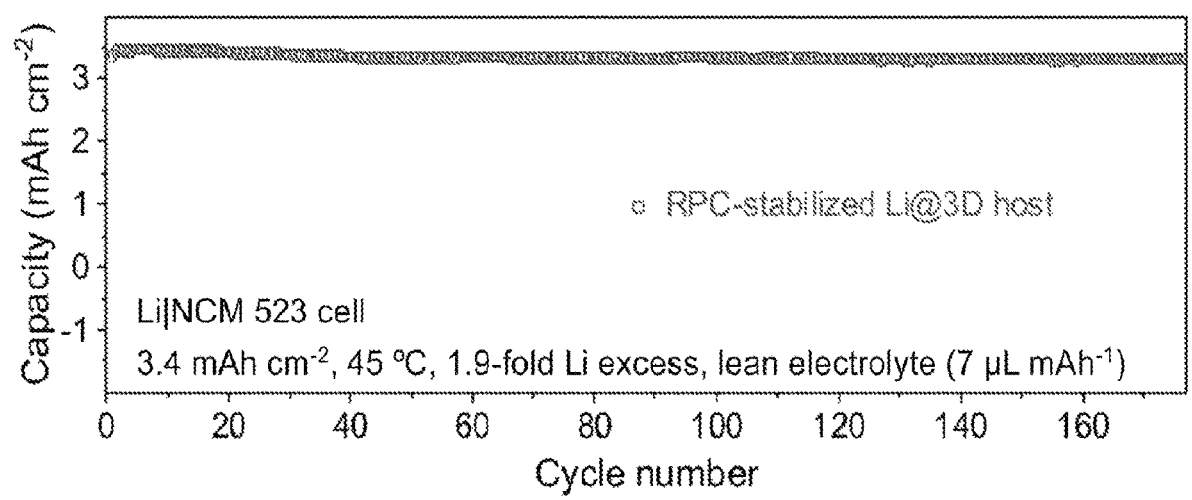
FIG. 46 shows a cycling performance of Li|NCM 523 cells under elevated temperature (45° C.). An FEC-free electrolyte (1 M LiPF$_6$ in EC/EMC with 2% LiBOB) was used.

In still further aspects, a lower electrolyte-to capacity ratio was also tested. The electrolyte-to-capacity ratio was reduced to 7 $\mu L$ mAh-1; 1.9-fold excess of Li in a 3D host was used as an electrode material, and the cell capacity was elevated to 3.4 mAh $cm^{-2}$. The Li|NCM 523 cell incorporating the RPC-derived SEI displayed capacity retention of 90.7% (FIG. 40B) and stable voltage profiles after 200 cycles (FIG. 43), whereas the capacity of the control cell has a cliff-style drop after only 14 cycles, resulting from the severe electrolyte decomposition (FIG. 40B). Changes in the amount of electrolyte remaining upon cycling were monitored by tracking the quantity of hexafluorophosphate ($PF_6$) anions in the cell using $^{19}F$ qNMR since F signals come exclusively from the $LiPF_6$ salt in the conventional electrolyte. The amount of electrolyte before cycling was normalized to 100% by comparing the peak area of PFs anions (−71.8 and −73.3 ppm in $^{19}F$ NMR spectra) with a known amount of an internal reference (fluorobenzene, −113.2 ppm in the $^{19}F$ NMR spectra). In the control cell, the electrolyte amount decreased to 41% after 50 cycles (FIG. 40C), and the cell could not be cycled. When fresh electrolyte was added, it was found that 53% of the Li was still retained in the cell (FIG. 44). In the cell incorporating the RPC-derived SEI, electrolyte retention of 77% was recorded after 180 cycles (FIG. 40D), with 57% of the Li being still present (FIG. 45). Based on these exemplary results, it can be concluded that the polymer-inorganic structure of the RPC-derived SEI confers good stability and effective suppression of electrolyte decomposition, which enables stable cycling of the Li metal batteries under lean electrolyte conditions. As shown in Table 1, the use of the disclosed herein composites and electrode materials in the secondary batteries can reduce the excessive usage of electrolyte in the Li metal batteries. It was further shown that the RPC-derived SEI can be stable at an elevated temperature of 45° C., enabling stable cycling of Li|NCM 523 cells (FIG. 46).

TABLE 1

Summary of the state-of-art Li-metal battery performance (updated January 2019).

| Strategy | Cell Design | Cathode Capacity | Cyclability | Electrolyte | Electrolyte Amount | Li Metal Thickness | Reference |
|---|---|---|---|---|---|---|---|
| 1. Artificial protective layer | Li\|LFP cell | 0.5 mAh cm$^{-2}$ | 85% CR after 150 cycles | 1M LiPF$_6$ in EC/DEC (1:1 vol) | 230 µL mAh$^{-1}$ | n/a | Nature Commun. 6, 10101 (2015) |
| 2. Li host | Li\|LCO cell | 0.35 mAh cm$^{-2}$ | ~86% CR after 100 cycles | 1M LiPF$_6$ in EC/DEC (1:1 vol) + 2% VC | n/a | 27.25 µm (10.9 mAh cm$^{-2}$) | Nanotechnol. Nat. 11, 626 (2016) |
| 3. Artificial protective layer | Li\|LTO cell | 0.5 mAh cm$^{-2}$ | ~80% CR after 1500 cycles | 1M LiFSl in DOL/DME (1:1 vol) | 80 µL mAh$^{-1}$ | 200 µm | Nat. Energy 2, 17119 (2017) |
| 4. Electrolyte engineering | Li\|NCM 442 cell | 1.5 mAh cm$^{-2}$ | ~93% CR after 168 cycles | 0.6M LiTFSl + 0.4M LiBOB in EC/EMC (4:6 vol) + 0.05M LiPF$_6$ | 67 µL mAh$^{-1}$ | 120 µm | Nat. Energy 2, 17012 (2017) |
| 5. Li host | Li\|LFP cell | 1.25 mAh cm$^{-2}$ | 76% CR after 1000 cycles | 1M LiFSl in DOL/DME (1:1 vol) + 1% LiNO$_3$ | 61.5 µL mAh$^{-1}$ | 6.6 µm (1.3 mAh cm$^{-2}$) | J. Am. Chem. Soc. 139, 5916 (2017) |
| 6. Artificial protective layer | Li\|NCA cell | 3.0 mAh cm$^{-2}$ | 96% CR after 400 cycles | 1M LiPF$_6$ in EC/DMC (1:1 vol) + 10% FEC + 1% VC | 66.7 µL mAh$^{-1}$ | n/a | Joule 1, 394, (2017) |
| 7. Artificial protective layer | Li\|NCM 523 cell | 1.0 mAh cm$^{-2}$ | 90% CR after 400 cycles | 1M LiPF$_6$ in EC/EMC (3:7 vol) + 10% FEC | 60 µL mAh$^{-1}$ | 400 µm | J. Am. Chem. Soc. 139, 15288 (2017) |
| 8. Li host | Li\|LCO cell | 0.63 mAh cm$^{-2}$ | 85% CR after 140 cycles | 1M LiPF$_6$ in EC/DEC (1:1 vol) + 10% FEC + 2% VC | n/a | 300 µm (60 mAh cm$^{-2}$) | Sci. Adv. 3, e10701301 (2017) |
| 9. Electrolyte engineering | Li\|NCM 111 cell | 2.0 mAh cm$^{-2}$ | 80% CR after 700 cycles | 1.2 m LiFSl/DMC-BTFE (1:2 mol) | ~100 µL mAh$^{-1}$ | 450 µm | Adv. Mater. 1706102 (2018) |
| 10. Electrolyte engineering | Li\|LFP cell | 1.0 mAh cm$^{-2}$ | 80.8% CR after 1000 cycles | 1M LiPF$_6$ and 1.1 wt % LiNO$_3$ in FEC/DMC/DME | 25 µL mAh$^{-1}$ | 500 µm | Angew. Chemie Int. Ed. 57, 5301 (2018) |
| 11. Electrolyte engineering | Li\|NCM 111 cell | 1.0 mAh cm$^{-2}$ | ~80% CR after 250 cycles | 1M LiPF$_6$ in EC/DEC electrolyte with sustained released LiNO$_3$ | 80 µL mAh$^{-1}$ | 50 µm | Nature Commun. 9, 3656 (2018) |
| 12. Electrolyte engineering | Li\|NCM 111 cell | 1.7 mAh cm$^{-2}$ | ~80% CR after 500 cycles | 2M LiTFSl + 2M LiDFOB in DME | 41 µL mAh$^{-1}$ | 250 µm | Nat. Energy 3, 739 (2018) |
| 13. Electrolyte engineering This work | Li\|NCM 811 cell | ~2.0 mAh cm$^{-2}$ | >90% CR after 120 cycles | 1M LiPF$_6$ FEC/FEMC/HFE | 50 µL mAh$^{-1}$ | 10 µm (2 mAh cm$^{-2}$) | Nature nanotechnology 13, 715 (2018) |
|  | Li\|NCM 523 cell | 1.0 mAh cm$^{-2}$ | 77.3% CR after 600 cycles | 1M LiPF$_6$ in EC/EMC (3:7 vol) + 10% FEC + 2% LiBOB | 12 µL mAh$^{-1}$ | 120 µm |  |
|  |  | 3.4 mAh cm$^{-2}$ | 90.7% CR after 200 cycles | 1M LiPF$_6$ in EC/EMC (3:7 vol) + 2% LiBOB (no FEC) | 7 µL mAh$^{-1}$ | 33 µm (6.6 mAh cm$^{-2}$) |  |

Methods

Further described herein In still further aspects, disclosed herein is a method comprising: disposing a reactive polymer composite on an active electrode material, wherein the reactive polymer composite comprises a reactive functionalized polymer having a main polymer chain with functionalization along the main polymer chain, wherein the functionalization comprises one or more functional groups that are configured to react with a metal electrode to form a polymeric metal salt and one, or more functional groups configured to electrochemically decompose; and wherein the active electrode material comprises a metal; and forming an electrode comprising a solid-electrolyte interphase layer comprising the polymeric metal salt.

It is understood that any of the disclosed herein reactive polymer composites can be utilized. In still further aspects, the disclosed herein reactive polymer composite can be formed by any known in the art methods. In some exemplary and unlimiting aspects, the RCPs can be formed by a free radical polymerization. In such aspects, the polymerization conditions include conditions effective to form a desired reactive polymer composite. In certain aspects, it is understood that various functional groups can be attached to the main polymer chain randomly. Yet, in other aspects, the reactive polymer composite can be synthesized under conditions effective to form a polymer having functional groups bonded to the main polymer chain in the desired order. In still further aspects, the methods disclosed herein can produce block polymers. While in other aspects, the methods disclosed herein can produce branched polymers.

In still further aspects, the methods disclosed herein are conducted in an inert atmosphere. In certain aspects, the methods are conducted in a glove box environment to avoid any contact with the ambient atmosphere.

Still further disclosed herein is the method, as described in any one of the preceding aspects, wherein the main polymer chain comprises an aliphatic backbone, a polyaromatic backbone, a polycyclic backbone, a polysaccharide backbone, or any combination thereof. Still further disclosed herein is the method, wherein the one or more the functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH-SO_2-F$, $N(R^1)-SF_3$ group, $SO_2-N(F)-SO_2-R^2$ group, substituted or unsubstituted fluoropyridinium triflate; wherein L is independently selected from null, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, —NH—, pyridine, and wherein L is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein $R^1$ and $R^2$, each independent of the other, selected from hydrogen, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, amine, pyridine, and wherein each of $R^1$ and $R^2$ independent of the other, is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

Still further and as disclosed herein, the reactive polymer composites can comprise filler in an amount greater than 0 wt % to about 60 wt %. In such exemplary aspects, the filler can comprise graphene oxide, reduced graphene oxide, borophene, molybdenite, silicon oxide, metal oxide, metal halides, or any combination thereof.

In still further aspects, the reactive functionalized polymers used in the disclosed methods can comprise one or more monomeric units selected from:

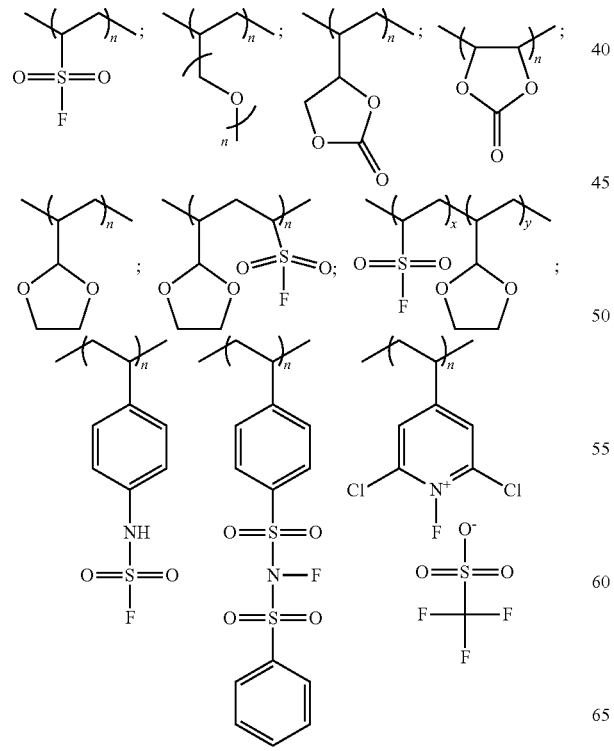

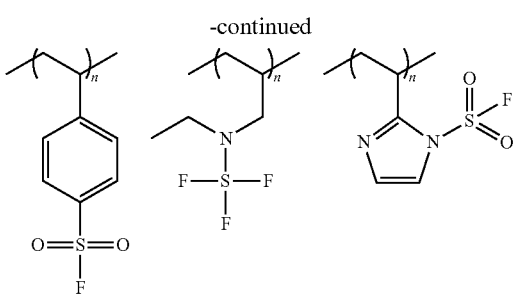

wherein $R^3$ is independently selected at each occurrence from an epoxide group; a cyclic acetal group; a cyclic carbonate group; and $R^4$ is hydrogen; or $R^3$ and $R^4$ are brought together with the carbons to which they are attached to form a cyclic carbonate group.

In yet other aspects, the polymer can also comprise one or more of:

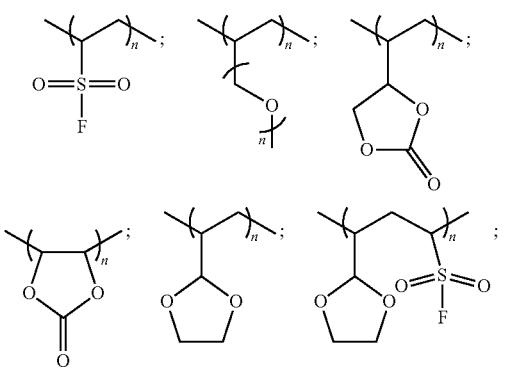

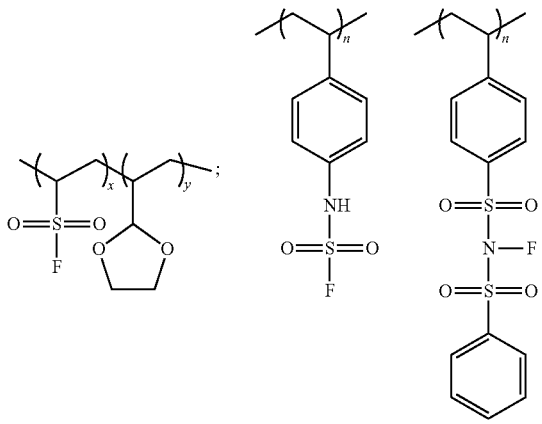

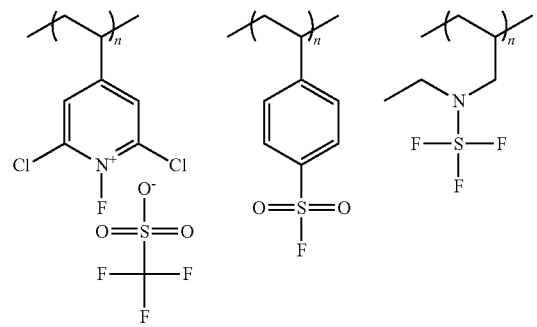

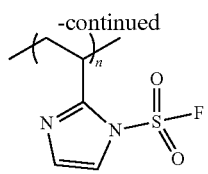

wherein n is an integer number from 1 to 100, and wherein x and y each, independently, is an integer number from 1 to 100 and present in a ration from 1:10 to 10:1.

In certain aspects, also disclosed is a method comprising a) providing the electrode, as described in any one of the preceding aspects, wherein the electrode is an anode; b) an electrolyte; and c) a cathode to form a battery exhibiting substantially stable cycling for at least 600 cycles. In yet further aspects, disclosed is the method, wherein the battery exhibits an electrolyte-to-capacity ratio of less than about 15 $\mu L \, mAh^{-1}$. While yet in other aspects, disclosed herein is the method, as described in any one of the preceding aspects, wherein the battery exhibits a coulombic efficiency for a metal deposition greater than about 95% as measured at a predetermined current density. Still disclosed herein is the method, as described in any one of the preceding aspects, wherein the predetermined current density is from about 0.1 mAh $cm^{-2}$ to about 10 mAh $cm^{-2}$. Yet further disclosed herein is the method, as described in any one of the preceding aspects, wherein the battery exhibits electrolyte retention of at least 70% after at least 100 cycles.

By way of non-limiting illustration, examples of certain aspects of the present disclosure are given below.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for.

Unless indicated otherwise, parts are parts by weight, temperature is degrees c. or is at ambient temperature, and pressure is at or near atmospheric.

Example 1

Materials

All reagents and solvents were purchased from Sigma-Aldrich and Alfa Aesar and used without further purification unless otherwise stated. The $LiNi_{0.5}Co_{0.2}Mn_{0.3}O_2$ cathode material was supplied by Umicore. Battery-grade lithium hexafluorophosphate ($LiPF_6$), fluoroethylene carbonate (FEC), ethylene carbonate (EC), and ethyl methyl carbonate (EMC) were purchased from BASF as used as exemplary electrolytes. Lithium bis(oxolato)borate (LiBOB) was purchased from Top New Energy Company. Li chips with a thickness of 400 and 120 μm were purchased from MTI.

General Methods of Preparation

Freshly synthesized P(SF-DOL) was added to GO sheets dispersed in anhydrous tetrahydrofuran (THF). The solution was sonicated at 60° C. for 4 h under an argon atmosphere. Li chips were washed with anhydrous hexane three times and dried in a vacuum chamber before use. The solution was coated onto the surface of Li, and the sample was dried in a vacuum chamber for 6 hours. To prepare RPC-stabilized Li@3D host electrodes, a certain amount of Li was deposited onto the surface of the host (1 $cm^{-2}$) and then vigorously washed the electrode with EMC and hexane many times to remove the SEI layer on it. After the electrode was dried, it was immersed into a concentrated RPC solution for 8 hours and then dried the electrode in a vacuum chamber. The Na and Zn electrodes were prepared in the same way. All coating procedures were conducted in an argon-filled glovebox.

Characterization

XPS experiments were carried out on a PHI VersaProbe II Scanning XPS Microprobe. Air- and moisture-sensitive samples were loaded in a glovebox and transferred into the instrument through a vacuum transfer vessel. A 20 eV Argon ion beam was employed for the XPS depth profiling experiment. $^1H$, $^7Li$, and $^{19}F$ NMR experiments were conducted on a Bruker AV-3-HD-500 instrument. $^1H$ NMR spectra were calibrated by using residual solvent peaks as the internal reference, and $^7Li$ NMR spectra were obtained without internal references. Gel permeation chromatography (GPC) tests were conducted on a Hewlett-Packard HP 1100 instrument with a Hewlett-Packard 1047A refractive index detector using two Phenomenex Phenogel linear 10 columns. THF was used for eluting the samples, and elution times were calibrated with a polystyrene standard. CV and electrochemical impedance spectroscopy measurements were carried out on a Nuvant EZStat Pro instrument with a three-electrode system. In CV experiments, bare Cu and RPC-coated Cu foils were employed as a working electrode; respectively, Li foil was used as counter and reference electrodes.

Electrochemical impedance spectroscopy measurements for stainless steel|Li cells were conducted between 0.1 and 100000 Hz with a voltage amplitude of 10 mV. The cells were cycled with 1, 5, 50, and 100 cycles with a Li plating/stripping amount of 1.0 mAh $cm^{-2}$. SEM images were captured on a Nova NanoSEM 630 instrument. Profilometry optical images were acquired on a Zygo Nexview 3d Optical Profilometer. The indentation behaviors were tested through an AFM equipped with a Digital Instruments Multimode scanning probe microscope and an environmentally controlled system. Contact angle measurement was performed on aramé-hart Model 295 with an environment control glovebox.

Compositional Analysis of the Surface Passivating Layers and SEI Layers

To prepare samples for XPS experiments, the cleaned Li chip was contacted with a P(SF-DOL) film (~20 μm) under a pressure of 10 MPa for 12 h. After separating the Li and the polymer films, an XPS test was immediately conducted on the contact surfaces on the polymer and Li sides, respectively. To prepare the samples for $^7Li$ NMR experiments, 1.0 g of finely divided Li chips was added into a THF solution of 0.1 g polymer. After stirring the mixture for 8 hours, the solid Li was filtered. The liquid solution was dropped into anhydrous hexane, and a white precipitate appeared, which was the polymeric product from the reaction between the polymer and Li. The precipitate was then dissolved in deuterated dimethyl sulfoxide (DMSO-d6) for $^7Li$ NMR experiments. A blank THE solution without P(SF-DOL) was used as a control sample, prepared by the same method. All these procedures were performed in an argon-filled glovebox. The cycled RPC-stabilized and bare Li electrodes were washed with EMC three times, and then dried in a vacuum chamber for XPS and IR tests. The samples for Na and Zn electrodes were prepared in the same way. All these procedures were conducted in an argon-filled glovebox.

Cryo-TEM Experiment

Cross-sectional TEM samples of the cycled RPC-stabilized Li were prepared on an FEI Helios Nanolab 660 Dual Beam focused ion beam (FIB) using the 'in situ lift-out' technique. A thin section was extracted from the electrode and attached to a TEM grid using an initial ion beam voltage of 30 kV. The sample was then further thinned using successively lower ion beam voltages until 2 kV, at which point the final thickness was approximately 100 nm. The sample was then quickly transferred to the cryo-TEM holder and inserted into the microscope to minimize exposure to air. TEM and STEM images were captured on a dual spherical aberration-corrected FEI Titan$^2$ G2 60-300 STEM at an accelerating voltage of 200 kV. EDS maps were collected in STEM mode using Bruker Super-X quad X-ray detectors, which, when combined with a high brightness X-field emission gun source, produce sufficient quality elemental maps within 5 minutes at a beam current of approximately 0.1 nA. The convergence semi-angle used for STEM imaging was 28.9 mrad. EELS spectral imaging was done using a Gatan GIF Quantum ERS 966 system. The EELS data were acquired using an exposure time of 0.1 second and a dispersion of 0.05 eV/channel with a pixel size of 10 nm.

AFM Indentation Experiment

The indentation experiments of the pristine RPC and RPC without GO samples were conducted on the surfaces of the corresponding films (~3 μm), respectively. The indentation experiments of the SEI layers were performed on the cycled Li electrodes after washing with EMC. The thin films (~100 nm) of RPC and P(SF-DOL) were coated on the Li, respectively. The silicon AFM probe was cleaned with UV/ozone to remove residual chemicals before each test. The Sader method was used to estimate the spring constant of the cantilever. The normal deflection changes of the cantilever during compression and decompression of the SEI surface with the AFM tip were monitored. The cantilever bending was subtracted from the total moving distance of the piezo to obtain only the sample deformation.

The elastic modulus of the RPC-derived SEI was investigated from AFM indentation tests. The Oliver-Pharr model can be used when the surface energy is neglected; here, the stiffness is calculated from the unloading curve. The Poisson ratio of the surfaces was roughly estimated at 0.4, which can be found in some studies. Alternatively, the Derjaguin-Muller-Toporov (DMT) contact mechanical model can also be employed to determine the elastic modulus of surfaces taking into account surface energy. The DMT equation is derived, as given below.

To simplify the fitting equation, the contact radius a and normal load F are expressed as the following non-dimensional relationship:

$$\frac{a}{a_0} = \left(1 - \frac{F}{F_{adh}}\right)^{\frac{1}{3}} \quad (1)$$

where $a_0$ is the contact radius at zero load, and $F_{adh}$ is the "pull-off force" in the AFM force-distance curve. The pull-off force is given by the DMT theory as:

$$F_{adh} = 2\pi\gamma R \quad (2)$$

where γ is the interfacial energy, and R is the curvature radius of the contact asperity (AFM tip).

The relationship between sample deformation d and normal load F (which is obtained from the force-distance curve) can be obtained by substituting equation (1) into:

$$d = \frac{a^2}{R} \quad (3)$$

yielding the following equation for fitting:

$$d - d_{contact} = \frac{a_0^2}{R}\left(1 - \frac{F}{F_{adh}}\right)^{\frac{2}{3}} \quad (4)$$

where $d_{contact}$ represents the apparent displacement at which the tip first contacts the surface. From the fitting parameters, the reduced elastic modulus can be calculated by:

$$E_r = \frac{3RF_{adh}}{4a_0^3} \quad (5)$$

Electrochemical Testing

Electrochemical tests of cells were carried out on Landt battery testers using CR2016 coin cells under galvanostatic charging-discharging conditions at different currents. To prepare the samples for the current/voltage (CV) test, a thin RPC film (~200 nm) coated onto a Cu foil was used as the working electrode. Li chips were used as counter and reference electrodes. The scan rate was 10 mV s$^{-1}$, and the electrode area was ~2 cm$^{-2}$. Bare Cu foil was used as the working electrode for the control sample. 1 M LiPF$_6$ in EC/EMC/FEC (3:7:1, v/v/v) electrolyte was used for the symmetric Li cell test, CV experiment, and the preparation of the cycled RPC-stabilized Li and bare Li samples for characterization. An FEC-free electrolyte (1 M LiPF$_6$ in EC/EMC with 2% LiBOB) was used for measuring the efficiency of metal deposition and evaluating the cycling stability of Li-metal battery cells. To measure the efficiency, 4.0 mAh cm$^{-2}$ Li was pre-plated onto the carbon-based 3D host with a current density of 2.0 mA cm$^{-2}$ and calculated the efficiency by measuring the capacity of stripped Li.

NCM 523 cathodes were prepared by mixing NCM 523 powders, Super C carbon, and polyvinylidene fluoride binder at a mass ratio of 85:5:10 in N-methyl-2-pyrrolidone and coating the slurry onto Al foil. In the Li-metal cell test, the NCM 523 cathode was pre-delithiated by charging it to 4.2 V at a current density of 0.5 mA cm$^{-2}$ in a 1 M LiPF$_6$ in EC/EMC with 2% LiBOB electrolyte and paired it with Li anodes with the designed capacity. In this way, the capacity can be precisely controlled, and the gassing issue caused by NCM 523 cathode can be excluded.

Electrolyte and Li Retentions in Practical Li-Metal Cells

To prepare the samples for the $^{19}$F qNMR test, the electrolyte was extracted from the cycled cells with 0.3 mL EMC each for six times. The solution was then mixed with 0.2 mL DMSO-d6 solution of fluorobenzene (0.1 M) in an NMR tube. This procedure was followed to prepare uncycled electrolyte samples as well in order to reduce errors as much as possible. The electrolyte amount, corresponding to the peak area of $PF_6$ anions, was normalized to 100% by comparing it with the internal reference. Owing to the constant content of the internal reference in all samples, one can use it to quantitatively measure the electrolyte retention. To test the amount of active Li that was left in the cycled cells, a delithiation treatment to both the NCM 523 and the 3D host were conducted, respectively, using fresh cells, and recorded the capacities. Li retention is calculated based on the amounts of leftover Li after cycling and the initial Li used in the cell.

Example 2

An exemplary reactive polymeric composite comprising a poly(vinylsulfonyl-fluoride-ran-2-vinyl-1,3-dioxolane) polymer was prepared according to a Scheme 1

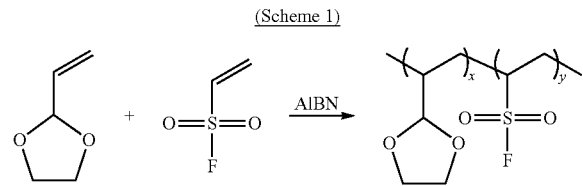

(Scheme 1)

Sulfonyl fluoride and dioxolane building blocks were bulk-polymerized via a free radical polymerization method catalyzed by a 2,2'-azobis(2-methylpropionitrile) (AIBN) initiator. Specifically, vinyl sulfonyl fluoride (1.1 g, 10 mmol), 2-vinyl-1,3-dioxolane (2.0 g, 20 mmol), and AIBN (31 mg, 0.19 mmol) were added into a glass vial, and the mixture without any solvent was heated at 67° C. for 48 h. All the procedures were performed in an argon-filled glovebox. The reaction mixture was dissolved in anhydrous dichloromethane (DCM), and the resulting solution was added to anhydrous hexane dropwise. The precipitate was washed with anhydrous hexane 6 times and dried in the vacuum chamber for use. Other functional group-containing polymers were prepared following the same procedure.

To produce organic Li salts as SEI components, electrochemically decomposable organic groups such as, for example, ethylene oxide (EO), dioxolane (DOL), cyclic ethylene carbonate (CEC), and vinyl carbonate (VC) were utilized. These groups were bonded to the polymer backbone by random copolymerization. It was shown that after the on-site decomposition step, the products preserve the original homogeneity of the polymer. The polymer and GO nanosheets, if present, can form an integrated composite structure due to to non-covalent interactions between them.

Figure 2:
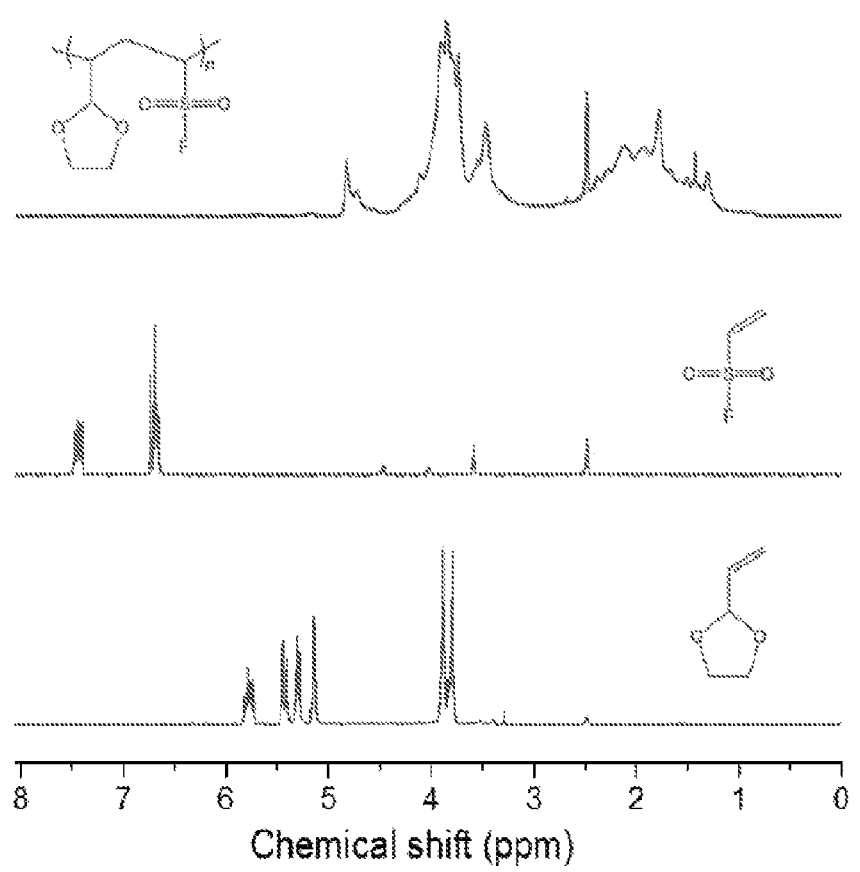
FIG. 2 depicts $^1$H NMR spectra of the P(SF-DOL) polymer as prepared in one aspect.

The structure of P(SF-DOL) was identified by $^1$H NMR and GPC measurements. FIG. 2 shows a $^1$H NMR image of the exemplary P(SF-DOL). The bottom spectrum (blue (1)) of 2-vinyl-1,3-dioxolane shows peaks at 5.85-5.68, 5.36-5.25, and 5.19-5.08 ppm, corresponding to the —CH═CH$_2$ bond. The middle spectrum (green (2)) of vinylene sulfonyl fluoride presents peaks at 7.50-7.38 and 6.80-6.62 ppm, attributed to the C═C bond. After the reaction (pink (3)), the peals belonging to C═C bonds disappeared, indicating successful polymerization. The molecular weight (Mw) of P(SF-DOL) based on the GPC calculation was 12,000 g mol$^{-1}$ with a polydispersity index (PDI) of 1.12.

The polyvinylidene sulfonyl fluoride (PVSF) polymer was synthesized using a vinylene sulfonyl fluoride monomer (Fujigaya, T. et al., *Chem. Mater.* 15, 1512-1517 (2003)). In the spectra of the PVSF polymer, as shown in FIG. 4A, C—S (285.5 eV in the C 1s spectrum), C—C (284.6 eV in the C 1s spectrum), and —SO$_2$—F (531.9 eV in the O 2p spectrum, 169.4 and 170.6 eV in the S 2p spectrum, and 688.3 eV in the F 1s spectrum) bonds were identified.

The polyethylene oxide (PEO) polymer was synthesized using a tetraethylene glycol methyl vinyl ether monomer. As shown in FIG. 4B, the high-resolution XPS spectra indicated the presence of C—C (284.6 eV in the C 1s spectrum) and C—O (286.2 eV in the C is spectrum and 532.3 eV in the O 2p spectrum) bonds.

The polyvinylethylene carbonate (PVEC) polymer was synthesized using a 4-vinyl-1,3-dioxolan-2-one monomer. As shown in FIG. 4C, the high-resolution XPS spectra indicated the presence of C—C (284.6 eV in the C 1s spectrum), C—O (286.4 eV in the C 1s spectrum, and 533.4 eV in the O 2p spectrum) bonds.

The polyvinylidene carbonate (PVC) polymer was synthesized using a vinylene carbonate monomer. As shown in FIG. 4D, the high-resolution XPS spectra indicated the presence of C—C (284.6 eV in the C 1s spectrum), C—O (287.6 eV in the C 1s spectrum, and 534.3 eV in the O 2p spectrum) bonds.

The polyvinyldioxolane (PVDOL) polymer was synthesized using a 2-vinyl-1,3-dioxolane monomer. As shown in FIG. 4E, the high-resolution XPS spectra indicated the presence of C—C (284.6 eV in the C is spectrum), C—O (286.3 eV in the C is spectrum, and 532.3 eV in the O 2p spectrum) bond.

The first poly(vinyl sulfonyl fluoride-ran-2-vinyl-1,3-dioxolane) (P(SF-DOL)') polymer was synthesized using vinylene sulfonyl fluoride and 2-vinyl-1,3-dioxolane monomers with a molar ratio of 1:4. In the spectra of the P(SF-DOL)' polymer (as shown in FIG. 5A) C—S/C—O (286.3 eV in the C 1s spectrum), C—C (284.6 eV in the C1 spectrum), and SO$_2$—F (688.3 eV in the F 1 s spectrum and 169.4 and 170.6 eV in the S 2p spectrum) bonds were identified.

The second poly(vinyl sulfonyl fluoride-ran-2-vinyl-1,3-dioxolane) (P(SF-DOL)) polymer was synthesized using vinylene sulfonyl fluoride and 2-vinyl-1,3-dioxolane monomers with a molar ratio of 1:2. In the spectra of the P(SF-DOL) polymer (as shown in FIG. 5B) C—S/C—O (286.3 eV in the C 1s spectrum), C—C (284.6 eV in the C1 spectrum), and SO$_2$—F (688.3 eV in the F 1 s spectrum and 169.4 and 170.6 eV in the S 2p spectrum) bonds were identified.

The third poly(vinyl sulfonyl fluoride-ran-2-vinyl-1,3-dioxolane) (P(SF-DOL)") polymer was synthesized using vinylene sulfonyl fluoride and 2-vinyl-1,3-dioxolane monomers with a molar ratio of 4:1. In the spectra of the P(SF-DOL)" polymer (as shown in FIG. 5C) C—S/C—O (286.3 eV in the C 1s spectrum), C—C (284.6 eV in the C1 spectrum), and SO$_2$—F (688.3 eV in the F 1 s spectrum and 169.4 and 170.6 eV in the S 2p spectrum) bonds were identified.

The poly(vinyl sulfonyl fluoride-ran-2-vinyl-1,3-dioxolane)-graphene oxide (P(SF-DOL)-GO) composite was prepared by adding a 20% single-sheet GO into the P(SF-DOL) polymer solution. In the high-resolution XPS spectra as shown in FIG. 5D, the bonds of C—C (284.6 eV in the C 1s spectrum), C—O/C—S (286.3 eV in the C 1s spectrum), —CO$_2$ (289.6 eV in the C 1s spectrum), and SO$_2$—F (688.3 eV in the F 1 s spectrum and 169.4 and 170.6 eV in the S 2p spectrum) were identified.

The second poly(vinyl sulfonyl fluoride-ran-2-vinyl-1,3-dioxolane)-graphene oxide composite (P(SF-DOL)-GO') was prepared by adding a 50% single-sheet GO into the P(SF-DOL) polymer solution. In the high-resolution XPS spectra FIG. 5E, the bonds of C—C (284.6 eV in the C 1s spectrum), C—O/C—S (286.3 eV in the C 1s spectrum), —CO$_2$ (289.7 eV in the C is spectrum), and SO$_2$—F (688.3 eV in the F 1 s spectrum and 169.4 and 170.6 eV in the S 2p spectrum) were identified.

Example 3

The synthesized polymers were evaluated by measuring the stability of Li plating/stripping cycles underneath the polymer film in a Li|Cu cell. Additionally, the Li deposition morphologies of polymer-coated Li electrodes in a symmetric Li cell were tested. It was shown that the SF-containing polymer (PVSF) could enable 200-cycle (FIG. 6A), dendrite-free (FIG. 7A) Li deposition. However, it was found that such deposition was not stable, as it was indicated by the fluctuating coloumbic efficiencies (CEs), and the presence of cracks on the polymer-coated surface.

It was also found that the ethylene oxide containing polymer (PEO) shows a relatively short cycle life, with the possible growth of Li dendrites. Further, it was found that use of DOL, EC, and VC-containing polymers as the reactive polymer composite (for example, PVDOL, PVEC, and PVC, respectively) can lead to stable Li deposition with limited fluctuations in the efficiency (FIG. 6B) and result in flat surface morphologies with minor defects (FIG. 7A-D). It was demonstrated that a substantially prolonged cycle life could be achieved with the use of PVDOL.

The polymers having sulfonyl (SF) and dioxolane (DOL) groups randomly attached to the backbone were synthesized. It was shown that these exemplary polymers provided for both improved extended cycle live (FIG. 6C) and improved Li deposition morphologies (FIG. 7F-H) when compared to the polymers containing only a single building block-containing polymers.

It was also shown that the ratio of SF and DOL groups could affect the properties of the polymer. With a 1:2 molar ratio of SF and DOL, poly(vinyl sulfonyl fluoride-ran-2-vinyl-1,3-dioxolane) (P(SF-DOL)), has shown the desired lifespan and Li deposition morphology.

Example 4

Figure 3:
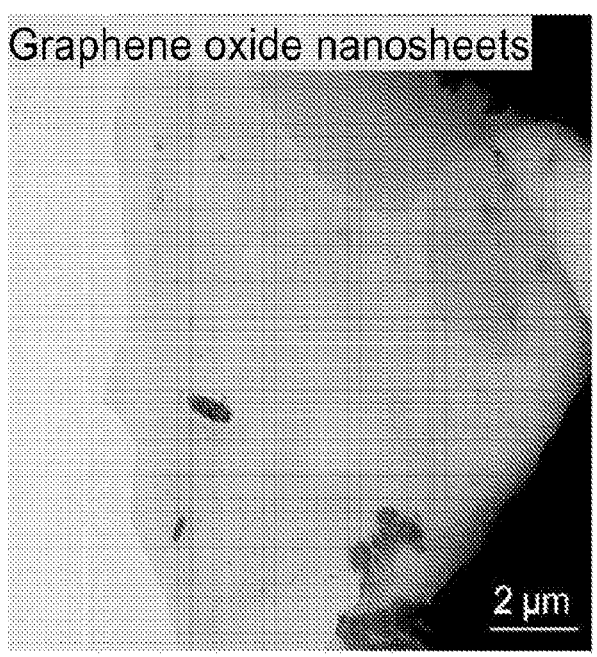
FIG. 3 depicts a TEM image of as-prepared single-sheet graphene oxide in one aspect.
Figure 4:
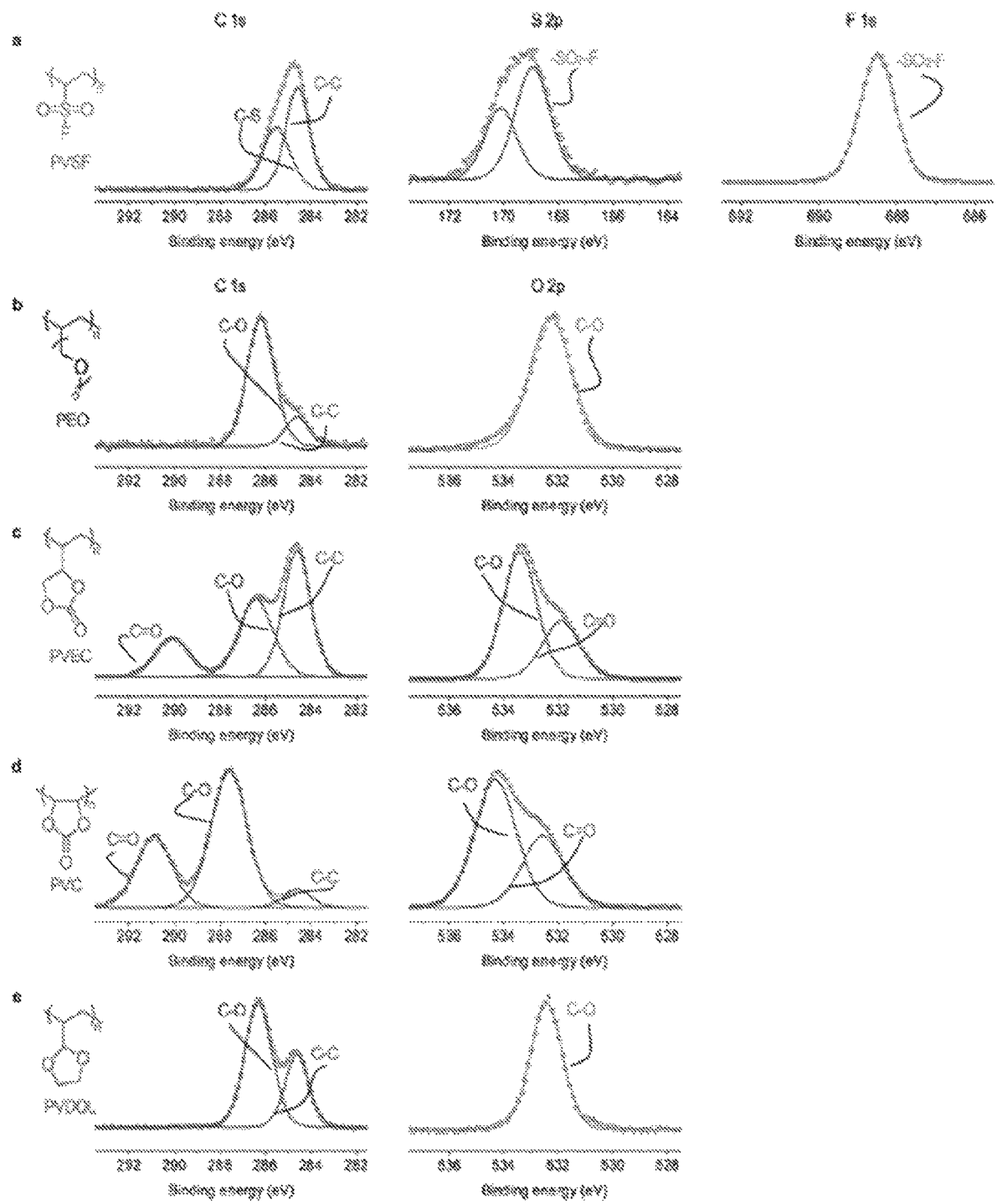
FIGS. 4A-4E depict high-resolution XPS spectra of single building block-containing polymers for the RPC design in one aspect.
Figure 5:
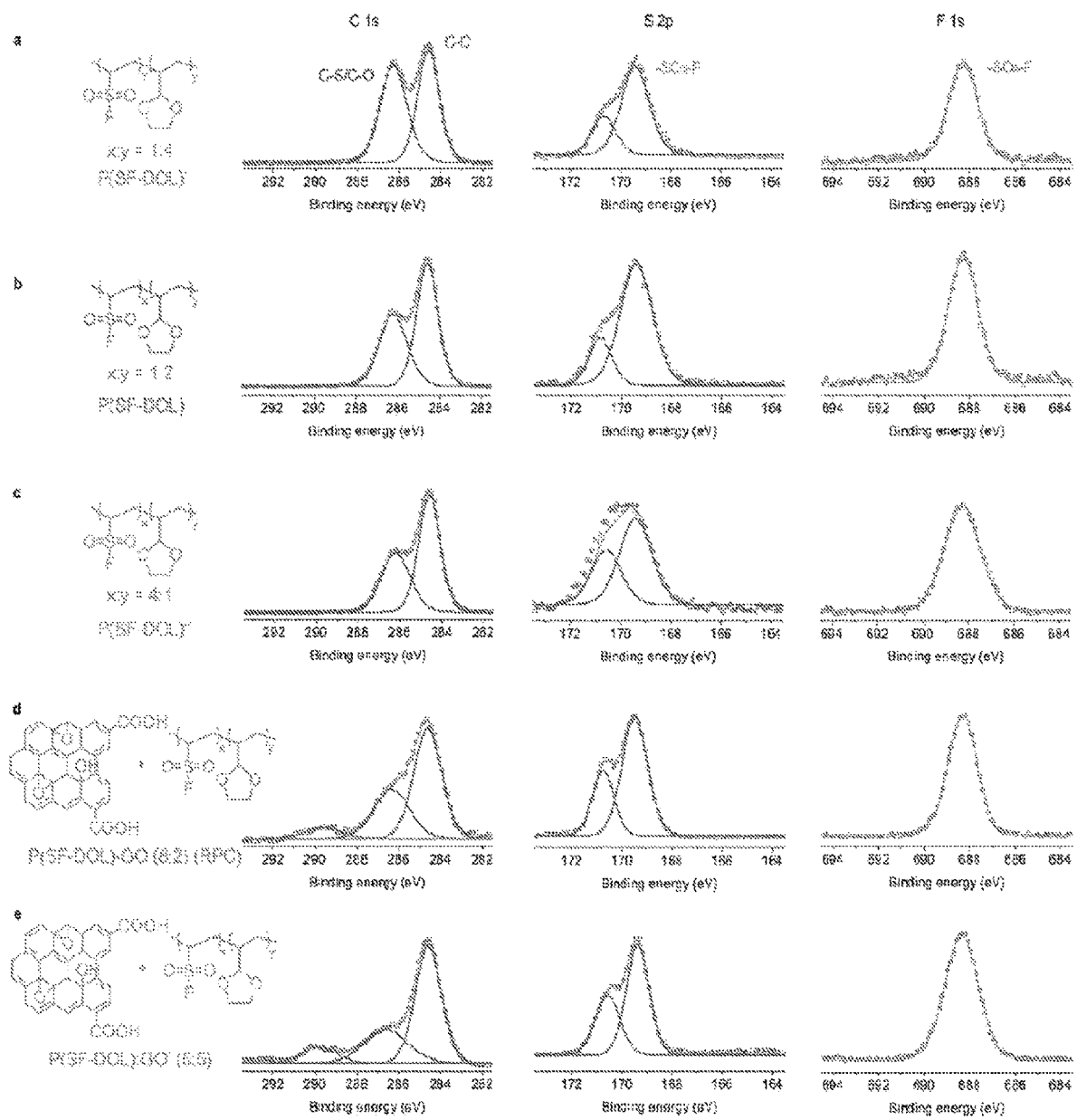
FIGS. 5A-5E depict high-resolution XPS spectra of multiple building blocks-containing polymers and polymeric composites for the RPC design in one aspect.
Figure 6:
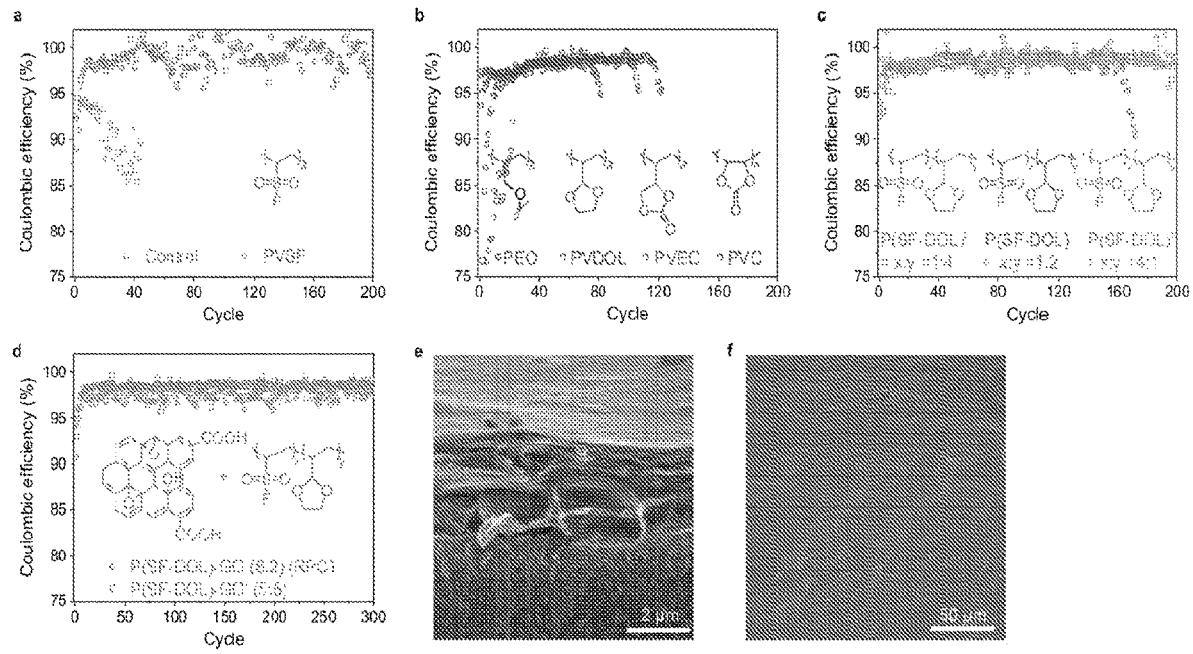
FIGS. 6A-6F depicts a bottom-up design of the reactive polymeric composite.
Figure 7:
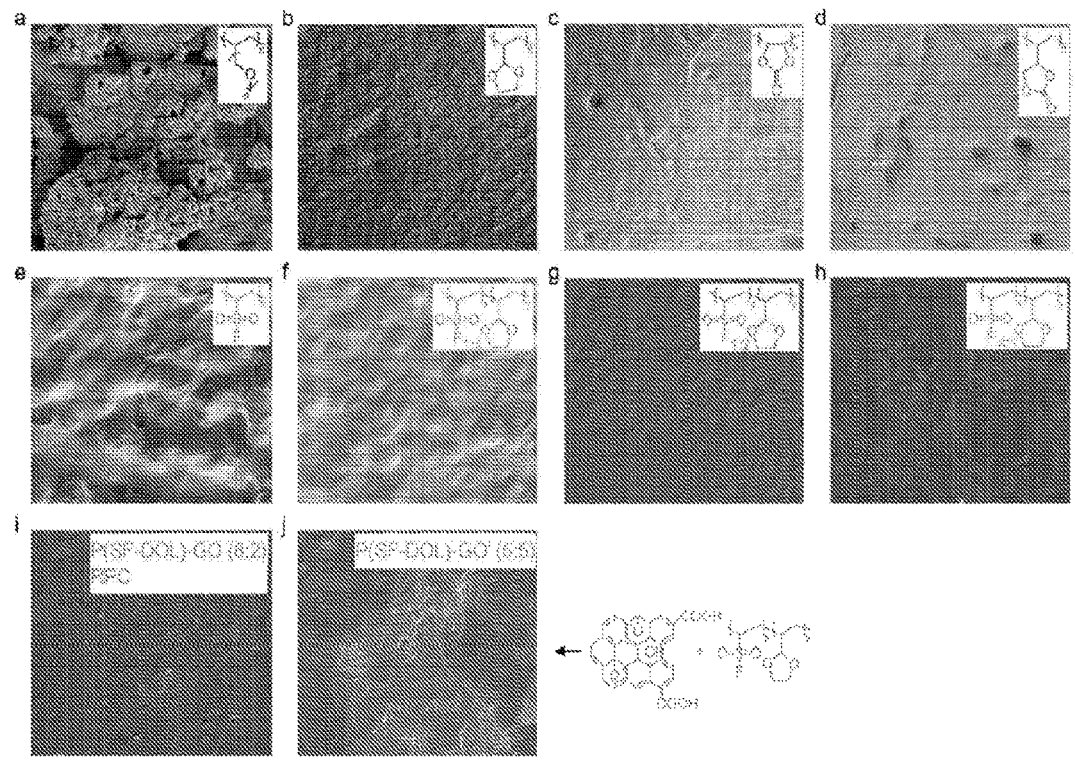
FIGS. 7A-7J depict surface morphologies of the cycled Li with RPC candidates in some exemplary aspects. All Li electrodes were prepared by cycling a Li|Li symmetric cell in a 1 M $LiPF_6$ in EC:EMC:FEC (3:7:1, v/v/v) electrolyte for 10 cycles. The Li plating/stripping amount is 1.0 mAh $cm^{-2}$.
Figure 8:
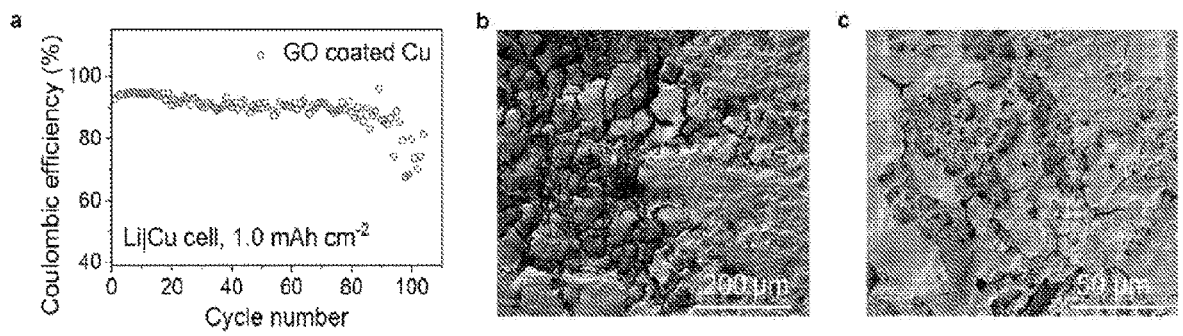
FIGS. 8A-8C depict the evaluation of the GO nanosheets layer as an RPC candidate.
Figure 9:
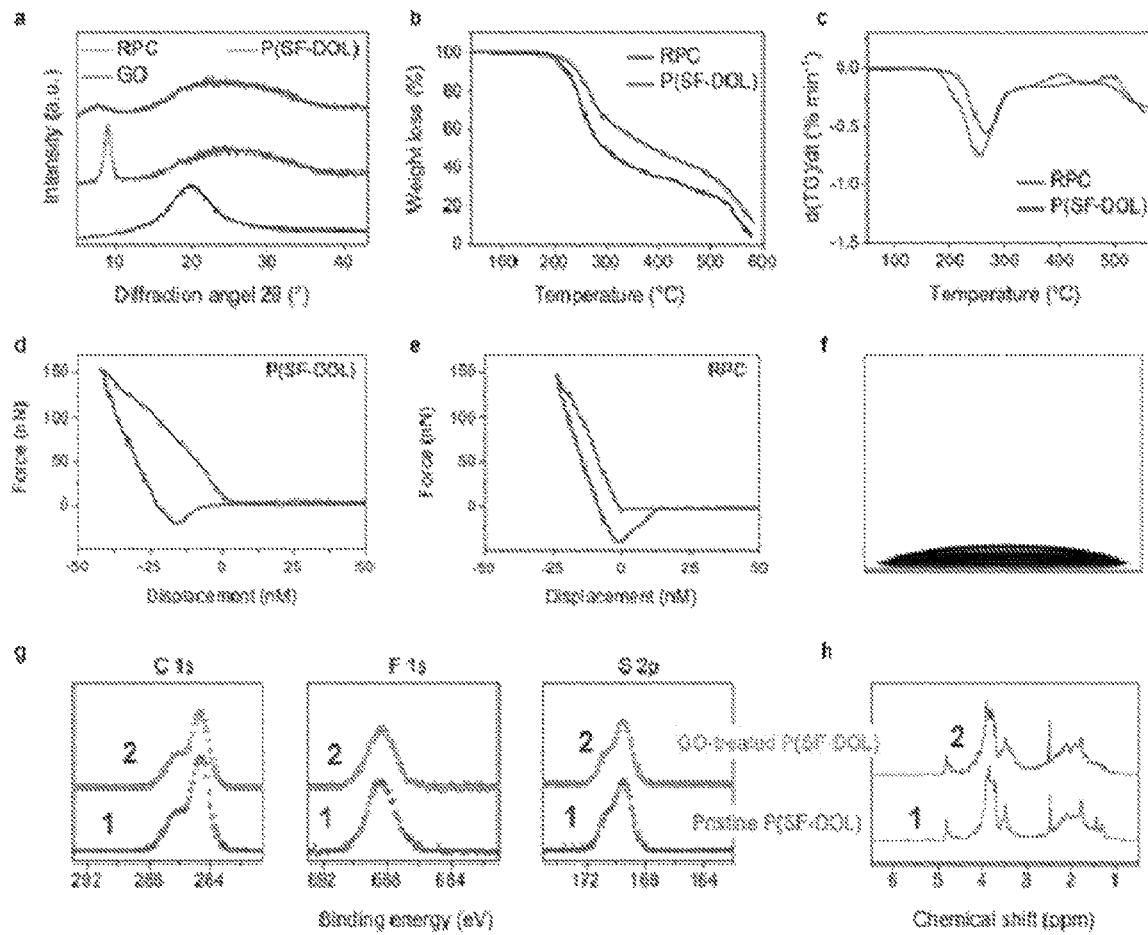
FIGS. 9A-9H depict the results of the characterization of the integrity of the RPC.

Unilamellar GO solutions were prepared following a modified Hummers method. Pre-oxidation was conducted to ensure the complete exfoliation of graphite powder. The graphite powder (3 g) was added to a mixture of concentrated H$_2$SO$_4$ (25 mL), K$_2$S$_2$O$_8$ (2.5 g), and P$_2$O$_5$ (2.5 g) at 80° C. The mixture was kept at the same temperature for 6 hours. The resulting mixture was then carefully diluted with 100 mL distilled water, filtered and washed, followed by drying at 60° C. overnight. The pre-oxidized graphite powder was slowly added to cold (0° C.) concentrated H$_2$SO$_4$ (120 mL). KMnO$_4$ (12 g) was added afterward, while the temperature of the mixture was kept below 10° C. with an ice bath. The mixture was stirred at 35° C. for 4 hours. Distilled water (100 mL) was added, and the mixture was stirred at 45° C. for 2 more hours. To terminate the reaction, distilled water (300 mL) and H$_2$O$_2$ (6 mL) were added within 15 minutes, resulting in a bright yellow solution. The mixture was filtered and washed with a 1:10 HCl solution to remove additional ions. The GO solution was diluted and subjected to dialysis for one week. Exfoliated GO was prepared by diluting the GO solution to 1 mg mL$^{-1}$ and sonicating for 15 minutes. The aqueous solvent of the GO solution was replaced with dimethylformamide (DMF) by the following method: 90 mL DMF was added to 10 mL of the as-prepared GO solution (1 mg mL$^{-1}$). The solution was sonicated and afterward was concentrated to ~10 mL on a rotary evaporator. This process was repeated 6 times in order to remove water. Anhydrous sodium sulfate was added to the solution, which was then filtered after 15 min. 90 mL anhydrous toluene was then added to the solution, and the solution was concentrated on a rotary evaporator. After repeating this process 6 times, the solution was concentrated to ~2 mg mL$^{-1}$ on a rotary evaporator. The morphology of the as-prepared single-sheet GO solution dispersed in anhydrous DMF is shown in FIG. 3.

An effect of GO on the Li performance was tested by mixing GO with the P(SF-DOL). It was shown that an addition of 20% GO nanosheets into P(SF-DOL) can result in the formation of a uniform and integrated composite. Without wishing to be bound by any theory, it was assumed that this could be achieved due to the strong non-covalent interactions between P(SF-DOL) and GO (FIG. 9A). It was also found that this composite displays a layered morphology on the Li surface, as captured by SEM images shown in FIGS. 6E, 6F. It was demonstrated that using a mixture of P(SF-DOL) and GO, a 300-cycle (FIG. 6D) dendrite-free (FIG. 7I) Li deposition behavior, could be obtained. However, it was also shown that the efficiency and morphology of the Li cell did not improve upon the addition of the excessive amount of GO (50%) (FIG. 6D and FIG. 7J).

Further, GO alone as an RPC candidate, was used as a control. A 3 μm GO nanosheets layer was coated on the surface of Li. As shown in FIG. 8A, the GO coating enabled a 100-cycle life of Li|Cu cell and low efficiency. It was shown that while the dendrite growth was suppressed, the GO coating layer could not maintain good integrity after 30 cycles (FIGS. 8B-8C). Without wishing to be bound by any theory, it was hypothesized that it is due to insufficient functions of the GO coating layer, which can neither form a dense layer nor regulate the SEI chemistry.

Based on the results obtained in the previous examples, the P(SF-DOL)-GO composite was used as an RPC for further studies. It is noted that the efficiencies measured in the Li|Cu cells, as shown herein, are not the true efficiency of Li deposition because the SF groups can react with Cu as well. It is further noted that this measurement, as shown herein, was only used for the evaluation of the RPC structure. It is understood that the side reactions between P(SF-DOL) polymer and Cu could affect its use in "anode-free" systems in which Cu is used as the current collector. To incorporate this approach into the anode-free technology, new current collector materials need to be used, which are more chemically stable against sulfonyl fluoride groups. To solve this issue, the use of 3D carbon hosts (FIG. 32C and FIGS. 38A-38B) and flat stainless steel foils (FIG. 38C) as current collectors was proposed to test the efficiency of Li deposition as discussed below.

Example 5

The composites of P(SF-DOL) and GO nanosheets were further characterized. FIG. 9A shows the X-ray diffraction (XRD) patterns of the RPC, P(SF-DOL), and GO nanosheets. In the curve of GO nanosheets, the sharp peak at 9.1° was assigned to the GO nanosheet. After forming the composite with P(SF-DOL), it was shown that the peak shifts to 7.8°. Without wishing to be bound by any theory, it was hypothesized that the shift is due to the non-covalent interactions between the carboxyl and hydroxide groups of the GO and cyclic ether and sulfonyl groups of P(SF-DOL). FIGS. 9B-9C display the thermogravimetric analysis (TGA) curves of the RPC and P(SF-DOL). Compared to P(SF-DOL), the RPC shows increased initial decomposition temperature and the highest decomposition rate temperature. Again, without wishing to be bound by any theory, it was assumed that the improved thermostability is also caused by the non-covalent interactions between the P(SF-DOL) and GO nanosheets. Furthermore, the RPC film has shown a higher modulus than that of P(SF-DOL), which was measured by AFM indentation (FIGS. 9D-9E). It was shown that the composite of P(SF-DOL) polymer and GO has good affinity to organic electrolyte molecules such as ethylene carbonate (EC), ethyl methyl carbonate (EMC), and fluoroethylene carbonate (FEC), as indicated by a contact angle of ~2° between RPC-coated Li and 1 M $LiPF_6$ in EC/EMC electrolyte (FIG. 9F).

Without wishing to be bound by any theory, it was assumed that the covalent interactions between the polymer and GO can be excluded, because the polymer structure has been maintained before and after being mixing with the GO, as it was identified by XPS and $^1H$ and $^{19}F$ NMR analyses. FIG. 9G shows high-resolution C 1s, F 1s, and S 2p XPS spectra in which consistent positions of peaks were found, including C—C (284.6 eV in the C 1s spectra), C—S/C—O (286.3 eV in the C 1s spectra), and —$SO_2$—F (169.4 and 170.6 eV in the S 2p spectra and 688.4 eV in the F 1s spectra). Further, it was shown that the $^1H$ NMR (FIG. 9H) and $^{19}F$ NMR (FIG. 9I) spectra of the P(SF-DOL) polymer before (blue curves) and after (red curves) being mixed with GO nanosheets were unchanged (FIGS. 9H-9I). These substantially identical XPS and NMR spectra have suggested that no covalent bond-forming reaction takes place between the polymer and GO nanosheets.

Example 6

The chemical and electrochemical processes associated with the Li surface passivation and RPC decomposition steps were further investigated. To study the chemical reaction occurring at the Li surface, a P(SF-DOL) film was physically pressed into a clean Li chip. The delaminated interface (both the P(SF-DOL) and Li chip sides) after the reaction was characterized by a high-resolution XPS (FIG. 11A). A clear change in the chemical structure at the interface from the structure of the unreacted P(SF-DOL) was observed (FIG. 11B). The XPS has shown that —$SO_2$—F (peaks 169.4 and 170.6 eV in the S 2p spectrum and 688.3 in the F 1s spectrum) bonds on the P(SF-DOL) side (FIG. 11C), were converted into —$SO_2$—Li (peaks 168.3 and 169.5 eV in the S 2p spectrum and 55.6 eV in the Li is spectrum. Compared with the spectra of pristine P(SF-DOL), as shown in FIG. 5B, no noticeable change in the C 1s spectrum was found, indicating retention of the polymer backbone.

However, the presence of LiF was indicated on the Li side (FIG. 11D), as it was evidenced by peaks at 684.8 in the F 1s spectrum and 57.6 eV in the Li 1S spectrum. The unreacted P(SF-DOL) (FIG. 11A) has been found to remain intact, as verified by the presence of the same peaks as in the spectra of pristine P(SF-DOL) (FIG. 5B).

Example 7

To investigate the chemical reactions between the GO and Li, a GO film was physically attached to a freshly cleaned Li chip. The delaminated surface of the GO film (FIG. 11E) was characterized by a high-resolution XPS. The $CO_2$—Li groups (peaks at 56.1 eV in the Li 1s spectrum and 289.9 eV in the C 1s spectrum) were found on the delaminated surface of the GO film (FIG. 11F). These signals were not observed in the spectra of the pristine GO film (FIG. 11G).

The $^7Li$ NMR experiments were conducted to monitor the bulk reaction between P(SF-DOL) and Li. A single peak with a chemical shift of −0.92 ppm was observed in the $^7Li$ NMR spectrum of the reaction solution (FIG. 12), which can be assigned to —$SO_2$—Li. Based on the results presented herein, the formation of a surface passivating layer at the Li/RPC interface comprising a polymer having —$CHO_2$ $(CH_2)_2$—) and —$SO_2$—Li side groups, GO nanosheets, and LiF was identified.

As shown in FIG. 13A, when an electrolyte contacts Li metal, the electrolyte molecules generate LiF (684.8 and 57.6 eV in the F 1s and Li 1s spectra, respectively), $Li_2CO_3$ (56.2 eV in the Li 1s spectrum), etc., on the fresh Li surface. On the surface of RPC-coated Li, the signals of LiF and —$SO_2$—Li (55.6 in the Li 1s spectrum) groups were observed. No change in the peaks was observed before (blue curves) and after (red curves) the contact with an electrolyte, indicating no electrolyte access to the Li surface (FIG. 13B). Without wishing to be bound by any theory, it was hypothesized that the presence of a highly reactive group is needed in this surface passivation process since insufficient reactivity can lead to partial surface coverage.

Example 8

As shown in FIG. 14, when a bare Cu was used as the working electrode, a peak associated with electrolyte-derived SEI formation was detected at 0.25 to −0.12 V vs. Li/Li$^+$. The use of an RPC-coated Cu working electrode shifted the SEI formation peak by ~0.18 V in the positive direction. It was also found that the Li stripping signal of the RPC-stabilized Cu was more intense than that of the bare Cu, indicating that more active Li can strip out after the Li plating. Without wishing to be bound by any theory, based on the data obtained from the Current-Voltage (CV) cycles, it was implied that an SEI formed in the disclosed system is chemically different from the conventional electrolyte-derived SEI.

Figure 15:
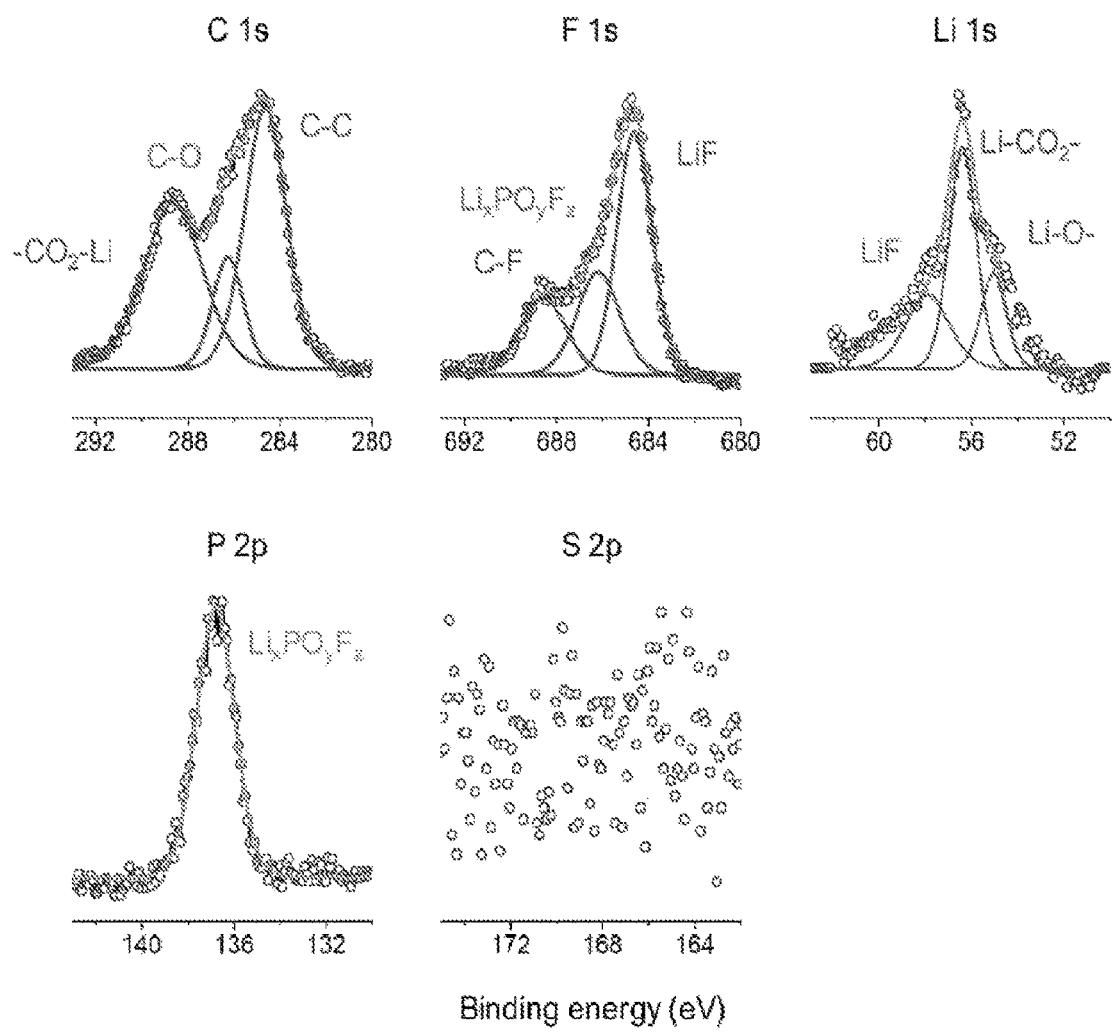
FIG. 15 depicts high-resolution XPS spectra of the SEI derived from a carbonate electrolyte.

FIG. 15 displays high-resolution C 1s, F 1s, Li 1s, P 2p, and S 2p XPS spectra of the carbonate electrolyte-derived SEI. The peak at 289.1 eV in the C 1s spectrum and the peak at 56.2 eV in the Li 1s spectrum can be assigned to Li carbonate salts such as Li—$CO_2$—OR and Li—$CO_2$—R (where R represent any hydrocarbon). The peak at 286.2 was attributed to the C—O bond, which shows a low concentration in the SEI. The peak at 684.5 eV in the F 1s spectrum and 57.9 eV in the Li 1s spectrum were corresponding to LiF. The peaks at 686.2 eV in the F 1s spectrum and 136.8 eV in the P 2p spectrum can be assigned to $Li_xPO_yF_z$.

Overall, it was found that the carbonate-based SEI was mainly composed of inorganic Li salts, including $Li_2CO_3$, $Li_xPO_yF_z$, $Li_2O$, LiF, $LiCO_2R$, etc.

It was found that the electrolyte-derived SEI contains a high-concentration of Li and F elements since it is mainly composed of inorganic salts, such as for example, $Li_2CO_3$, $LiP_xO_yF_z$, $Li_2O$, LiF, $LiCO_2R$, etc. In contrast, the RPC-derived SEI was found to contain a high concentration of carbon and oxygen.

FIG. 17 shows the FT-IR analysis of the cycled RPC-stabilized Li (pink line) and bare Li anodes (gray line). In the spectrum of the RPC-stabilized Li, the $vSO_2$—F/$SO_2$—Li signal was detected at 1482 $cm^{-1}$. vS=O signals were observed at 1409 $cm^{-1}$ and 1198 $cm^{-1}$, respectively. vCOOH and vC—OH of GO nanosheets were found at 3600 $cm^{-1}$. δC=C (GO) was detected at 977 $cm^{-1}$. Compared to the electrolyte-derived SEI, the concentrations of C—$H_x$ (2937 $cm^{-1}$) and C—O (1087 $cm^{-1}$) were found to be higher, indicating that the RPC-stabilized Li surface contains much higher organic species, which come from the unreacted RPC and the RPC-derived SEI. In the electrolyte-derived SEI, the concentration of the C=O bond, corresponding to the electrolyte decomposition products that are present in the SEI.

Example 9

FIGS. 19A-19B show the morphology of the cycled RPC-stabilized Li after 100 cycles in a carbonate electrolyte. The Li deposition amount was found to be 1.0 mAh $cm^{-2}$. FIGS. 17C-17D demonstrate the morphology of the cycled RPC-stabilized Li after 20 and 50 cycles, respectively. The Li deposition amount was found to be 2.0 mAh $cm^{-2}$. It was also found that the top surface of the electrode was covered by the unreacted RPC layer, while no Li dendrites were observed.

Figure 20:
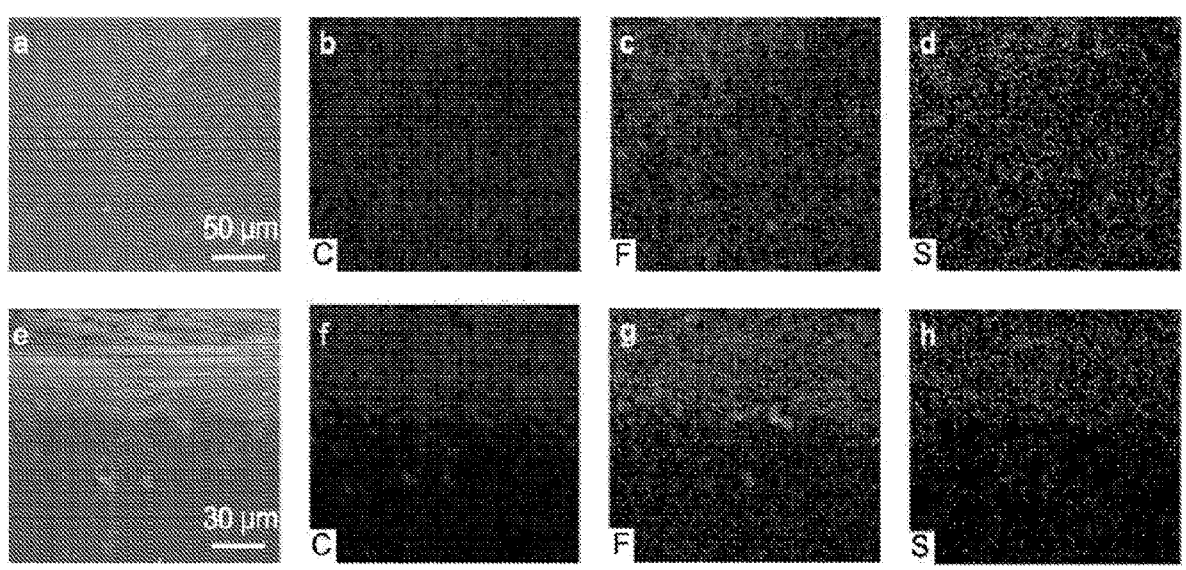
FIGS. 20A-20H show an elemental mapping of the RPC-derived SEI.

FIG. 20 displays elemental mapping images of C, S, and F based on the top- and side-view images. It was found that C, S, and F elements were uniformly distributed on the top surface of the electrode, indicating the good integrity of the RPC. This result was found to be consistent with the hypothesis that Li can electrochemically plate underneath the RPC, and the RPC with its micro-scale thickness acts as a "buffering layer" to tolerate the interfacial fluctuation and surface morphology changes of Li and to continue generating the stable SEI on the Li surface.

Example 10

It was found that when a bare Li is used as an electrode, it turns black and rough after cycling. The black species can be assigned to dead Li and accumulated SEI. In contrast, the cycled RPC-stabilized Li presents a flat surface, and the yellow RPC coating was observed on the surface. (FIGS. 21A-21D)

Example 11

In this example, the compositional and morphological evolution of the RPC-stabilized SEI via high-resolution XPS and SEM was examined. The XPS spectra of the unreacted RPC and RPC-derived SEI after 200 cycles are shown in FIGS. 22A-22B, respectively. The unreacted RPC layer shows peaks that are consistent with the pristine RPC (FIG. 5D), which include —$SO_2$—F groups (688.3, 169.4, and 170.6 eV in the F 1s and S 2p spectra, respectively), C—O—C/C—S bonds (286.2 eV in the C 1s spectrum), and —$CO_2$— groups from GO (289.8 eV in the C 1s spectrum). Without wishing to be bound by any theory, it was assumed that the chemical structure of the unreacted RPC layer is unaltered after long cycles. It was also found that the XPS spectra of the RPC-derived SEI after 200 cycles was similarly consistent with that of the SEI after 30 cycles (FIG. 10C). Peaks at 684.6 and 688.6 eV in the F 1s spectrum were attributed to LiF and —$SO_2$—F, respectively; split peaks at 170.2 and 169.0 eV in the S 2p spectrum were assigned to overlapped —$SO_2$—F and —$SO_2$—Li groups; peaks at 57.6 and 55.6 eV in the Li 1s spectrum were assigned to Li—F and —$SO^2$—Li/—C—O—Li bonds, respectively; peaks at 289.9, 288.4, 285.9, and 284.6 eV in the C 1s spectrum belong to $CO_2$— from GO, —$CO_2$—Li from reduced GO and the carbonate electrolyte, C—O and C—S bonds (overlapped) from reduced DOL and —$SO_2$-groups, and C—C bonds from the polymer backbone, respectively. No signals were observed in the P 2p spectrum. Only slight changes in the position and relative intensity of those peaks were observed, suggesting good durability of the RPC-derived SEI during cycling. —$CO_2$—Li peaks were found, however, in the carbonate electrolyte-derived SEI (FIG. 15, the peak at 289.1 eV in the C 1s spectrum)

As shown in FIG. 10C, the concentration of —$CO_2$—Li groups in the RPC-derived SEI after 30 cycles is very limited. Encouragingly, the —$CO_2$—Li concentration in the RPC-derived SEI after 200 cycles is substantially similar to that of the SEI after 20 cycles.

This result indicates that the RPC-derived SEI remains passive and durable after 200 cycles and continuously prevents the electrolyte decomposition on the Li surface. In addition, XPS elemental concentration analysis has revealed that the SEI layers after 30 and 200 cycles have very similar concentrations of C, O, Li, F, and S elements in the SEI (FIG. 22C). Further, the morphology evolution of the RPC-stabilized Li electrodes was also studied after 200, 300, 400, and 500 cycles. As shown in FIG. 22D, these Li electrodes have flat, and Li dendrite-free morphologies, with unreacted RPCs attached on the surface. Collectively, these results demonstrate that RPC-stabilized Li shows stable chemical composition and morphology during long cycling.

The morphology of Li deposition underneath of the unreacted RPC layer was also examined. The unreacted RPC layer was removed by washing the cycled Li electrodes with DMF solvent to expose the surface of deposited Li. The morphology of the exposed surface was studied with the SEM. As shown in FIG. 23A, the Li electrode surface after 200 cycles is flat and covered by an unreacted RPC layer. After DMF wash, the deposited Li coated with RPC-derived SEI was exposed (FIG. 23B). It was found that the Li plates and strips in a dense and dendrite-free manner, which was enabled by RPC-derived SEI.

To confirm that the unreacted RPC layer was fully removed, the XPS depth profiling on the cycled Li electrode after DMF wash was performed (FIG. 23C). LiF (peaks at ~684 eV in the F 1s spectrum and ~56 eV in the Li 1s spectrum), Li—O (the peak at ~55 eV in the Li is spectrum), —$SO_2$—F (the peak at ~689 eV in the F 1s spectrum), C—C (the peak at ~285 eV in the C 1s spectrum), C—O/C—S(the peak at ~286 eV in the C 1s spectrum), and —$CO_2$— (the peak at ~289 eV in the C 1s spectrum) were observed in the top surface curves. These peaks correspond to the components of the RPC-derived SEI layer, indicating a substantial removal of the unreacted RPC layer from the surface. After sputtering for 3 min, a tiny amount of LiF (peaks at ~684 eV in the F 1s spectrum and ~56 eV in the Li 1s spectrum) and large amount of metallic Li (the peak at ~53 eV in the Li 1s spectrum) were observed, indicating that the SEI residue layer is also very thin (~30 nm) after DMF wash.

The analysis of the lattice spacing using the corresponding FFT images was performed. FIG. 24 depicts the corresponding FFT images of the Li (FIG. 18H) and RPC-derived SEI (FIG. 18I) regions taken from the interface of the RPC-stabilized Li. Despite the insufficiently clear TEM images, the presence of LiF lattice in the FFT image corresponding to FIG. 18I (FIGS. 24A-24B) and Li metal lattice in the FFT image corresponding to FIG. 18H (FIGS. 24C-24D) could be observed. The measured lattice spacings of 0.20 and 0.23 nm were consistent {200} and {111}LiF planes, respectively. Other salts (—C—O—Li, —SO$_2$—F, and SO$_2$—Li) bonded to the polymer has shown an amorphous morphology. Li$_2$CO$_3$ was not detected in the RPC-derived SEI.

FIG. 25 depicts a high-resolution TEM image of the unreacted RPC region taken from the RPC-stabilized Li in FIG. 18G. The unreacted RPC presents an amorphous majority phase embedded with GO nanosheets. FIG. 26 displays TEM and STEM images of the RPC-derived SEI regions taken from the interface of the RPC-stabilized Li. Under the relatively low magnification, some wavy areas (as indicated by the arrows) in the RPC-derived SEI were observed, which are probably the GO nanosheets in the SEI. The polymer-GO nanosheet structure leads to a good density of the SEI layer and the RPC material.

Example 12

XPS depth profiling on the surface of the cycled RPC-stabilized Li was performed. Li and F were selected as the signature elements for structural identification (FIG. 27). The top two curves (purple and green lines) depict the —SO$_2$—F signal (peaks at 688.3 eV in the F 1s spectrum) and show no Li signal, and therefore they can be assigned to the unreacted RPC.

The 3$^{rd}$ curve (blue line) demonstrated the presence of both the —SO$_2$—F signal from the unreacted RPC and Li salts signals (peaks at 688.3 eV in the F 1s spectrum and 57.8 eV in the Li 1s spectrum), which correspond to the RPC-derived SEI. The middle two curves (pink and orange lines) depict Li salt signals and, therefore, can be attributed to the SEI layer. The bottom curve, in grey, contains the metallic Li signal (peaks at 53.2 eV in the Li 1s spectrum) and has no F signal, and therefore can be attributed to metallic Li.

Example 13

The mechanical strength of SEI was examined. The modulus of electrolyte-derived SEI, RPC-derived SEI without GO, and RPC-derived SEI were compared using AFM indentation. The electrolyte-derived SEI has shown loading and unloading curves overlapping with little hysteresis (FIG. 28A), and the calculated modulus based on the Oliver-Pharr model was found to be 820 MPa (FIG. 29).

Without wishing to be bound by any theory, it was implied that the SEI is brittle and rigid. In contrast, a clear hysteresis between the loading and unloading curves and meniscus dragging during the tip snap-off were observed for RPC-stabilized Li (FIG. 28B), and the calculated modulus was 714 MPa, implying good flexibility and stiffness. Interestingly, the P(SF-DOL) polymer-derived SEI without GO displays less elastic behavior than the RPC-derived SEI, which is evidenced by a larger hysteresis between the loading and unloading curves and easier yielding under an applied force. The calculated modulus was 504 MPa (FIG. 28C). Correspondingly, a dendrite-free morphology was seen for the cycled Li with this SEI within 50 cycles. Li dendrites were found after 100 cycles (FIG. 30 and FIG. 31).

FIG. 30 shows the morphology of Li with P(SF-DOL) after 50 cycles in a carbonate electrolyte. The pristine Li with P(SF-DOL) has a flat surface morphology, and a clear surface film can be viewed from the side-view SEM image. After 20 and 50 cycles, the P(SF-DOL) still protects the top surface of the Li electrode. However, Li dendrite penetrates the P(SF-DOL) film after 100 cycles. In contrast, no Li dendrites were found in the SEM images of the RCP-stabilized Li anodes after 100 cycles (FIG. 19A-19B) and 500 cycles (FIG. 21). Without wishing to be bound by any theory, it was assumed that the mechanical strength of the P(SF-DOL)-derived SEI is too poor to tolerate the interfacial fluctuation of Li, leading to some cracks. Therefore, the deposited Li is contacted with the carbonate electrolyte, triggering the Li dendrite growth. In addition, the use of GO nanosheets has been reported to be capable of effectively eliminating the "tip effect" in the Li deposition and leads to more homogeneous Li nucleation.

Compared to the cycled bare Li, Li with P(SF-DOL) displays a flat surface morphology. However, the height differences were up to 2.7 µm, which is much larger than that of the RPC-stabilized Li. Some defects were observed on the electrode surface, indicating the inadequate integrity of the polymer.

Figure 33:
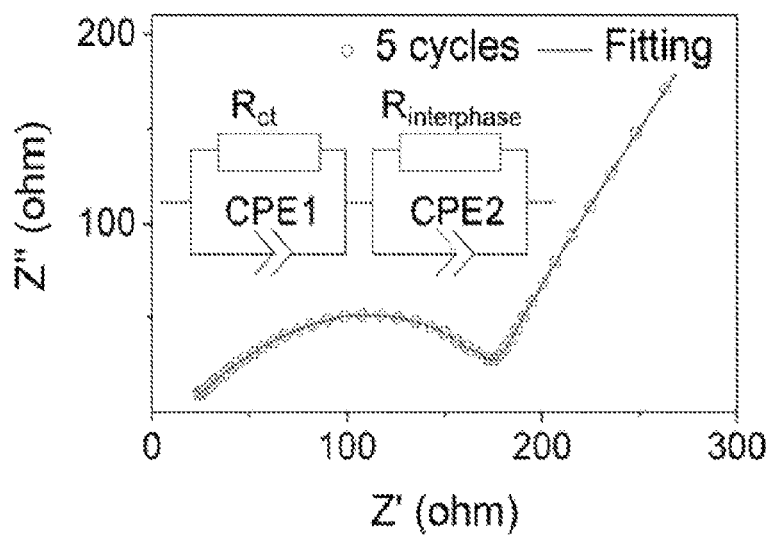
FIG. 33 depicts an electrochemical impedance spectroscopy measurement of the RPC-stabilized Li after 5 cycles. The resistance of the RPC coating and RPC-derived SEI ($R_{interphase}$) is ~140Ω. The area of the Li anode is 2.0 cm$^{-2}$.
Figure 34:
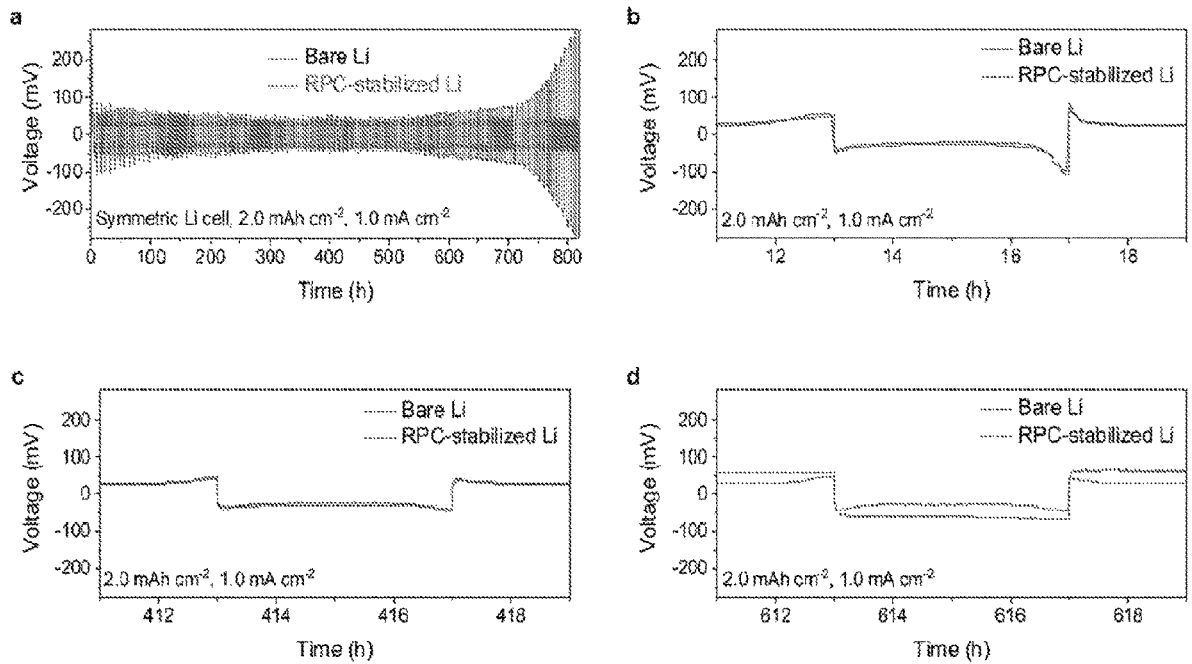
FIGS. 34A-34D depict various voltage profiles of a symmetric RPC-stabilized Li cell over 800 h.

As shown in FIG. 33, the resistance of the RPC coating and RPC-derived SEI ($R_{interphase}$) is only ~140Ω, which is acceptable for battery operation. FIG. 34 shows voltage profiles of a symmetric RPC-stabilized Li cell over 800 h.

Figure 35:
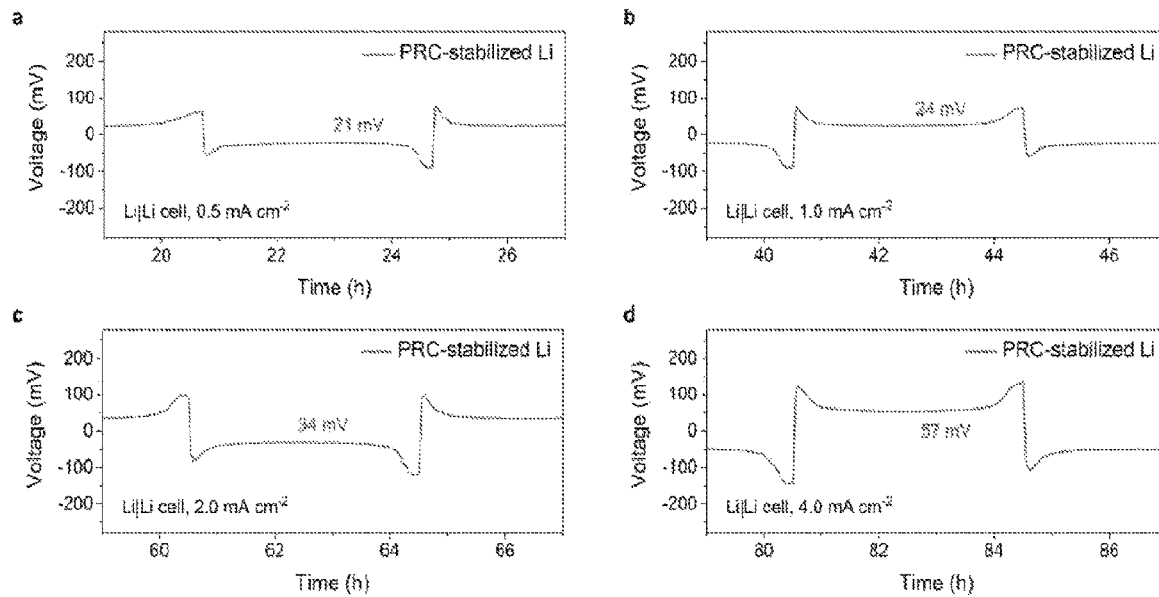
FIGS. 35A-35D depict Li deposition overpotentials of the RPC-stabilized Li electrodes at different current densities. The overpotentials of Li deposition are 21, 24, 34 and 57 mV at the current densities of 0.5, 1.0, 2.0, and 4.0 mA cm$^{-2}$, respectively.
Figure 36:
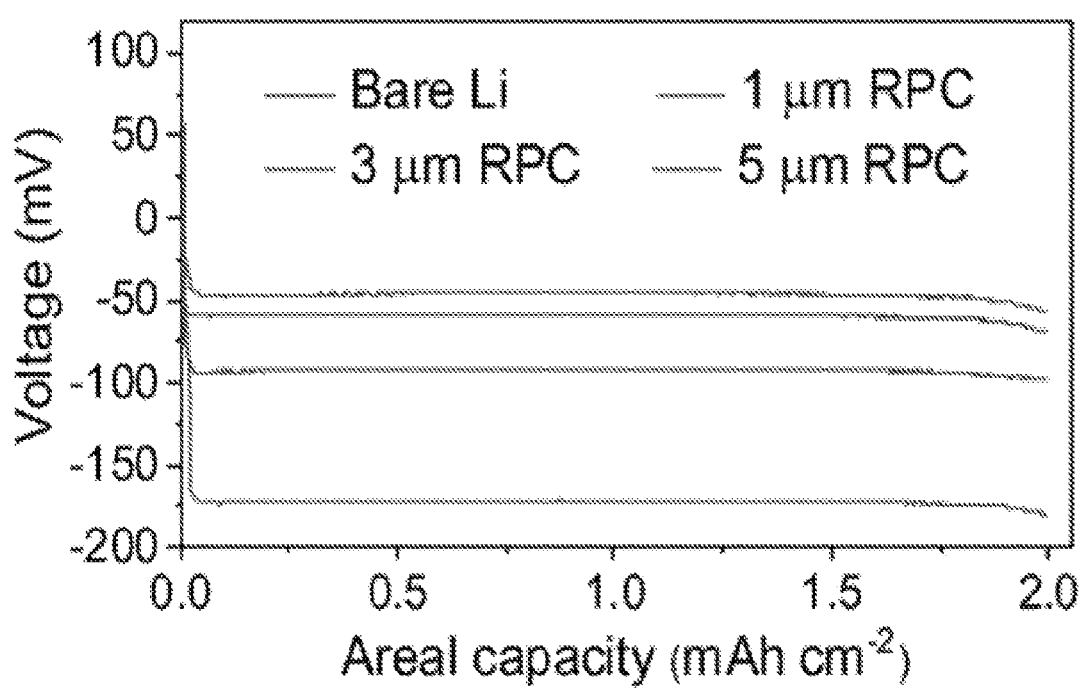
FIG. 36 depicts a thickness optimization of the RPC layer. The Li deposition overpotential of the Li electrodes coated with RPC with different thicknesses.

As shown in FIG. 35, the Li deposition overpotentials of the RPC-stabilized Li electrodes are 21, 24, 34 and 57 mV at the current densities of 0.5, 1.0, 2.0, and 4.0 mA cm$^{-2}$, respectively. FIG. 36 depicts the voltage profiles of the initial Li deposition underneath the RPC at a high current density of 2.0 mA cm$^{-2}$. An acceptable overpotential of ~90 mV was achieved by controlling the thickness of the RPC at ~3 µm. The thicker one (~5 µm) induces a high deposition overpotential of ~167 mV.

Example 14

To prepare the RPC-stabilized Li@3D host electrodes (FIG. 37A), a certain amount of Li was electrochemically deposited onto the surface of the host (~1 cm$^{-2}$), and then the SEI generated in the electrodeposition process was removed. After drying the electrode, RPC was coated onto the surface of Li by immersing the Li@3D host electrode into a concentrated solution of P(SF-DOL)-GO. FIG. 37B-37D show the SEM images of the bare carbon-based 3D host, SEI-removed Li@3D host, and RPC-stabilized Li@3D host (from left to right). Li was deposited on the 3D host uniformly. The removal of the SEI layer was confirmed by an XPS measurement. It was found that ~87% of metallic Li is present on the surface of the Li@3D host.

A small amount of Li$_2$O (peaks at ~526 eV in the O 1s spectrum and ~55 eV in the Li 1s spectrum) and LiF (peaks at ~684 eV in the F 1s spectrum and ~56 eV in the Li 1s spectrum) were also found.

After being coated with an RPC layer, the surface morphology turned slightly blurred. The presence of the RPC layer was also confirmed by XPS. The XPS spectra taken from the surface of an RPC-stabilized Li@3D host electrode were found to be consistent with the pristine RPC, including C—C (the peak at 284.6 eV in the C 1s spectrum), C—O/C—S(the peak at 286.3 eV in the C 1s spectrum), —CO$_2$— (the peak at 289.6 eV in the C 1s spectrum), —SO$_2$—F (peaks at 688.3 eV in the F 1s spectrum and 169.4 and 170.6 eV in the S 2p spectrum) (FIG. 34F).

Example 15

The electrochemical deposition of Li onto the surface of the 3D host was conducted in a Li|3D host cell using 4 M lithium bis(fluorosulfonyl) imide in dimethoxyethane electrolyte. 1.0 mAh cm$^{-2}$ was pre-plated onto the 3D host and then stripped out at a current of 0.5 mA cm$^{-2}$. The process has served as an activation step to pre-form an SEI layer on the 3D host surface. Next, a certain amount of Li (e.g., 3.4 mAh cm$^{-2}$) was plated onto the 3D host at a current density of 0.5 mA cm$^{-2}$.

The efficiency was measured by casting an RPC layer on the surface of the stainless steel and pre-plated 1.0 mAh cm$^{-2}$ Li onto the stainless steel foil with a current density of 1.0 mA cm$^{-2}$ and calculated the efficiency by measuring the capacity of stripped Li.

Taking the fabrication of the unprotected Li|NCM 523 cell as an example (FIG. 40A), the as-prepared NCM 523 cathode was charged to 4.2 V for delithiation. 10 mAh cm$^{-2}$ active Li was initially stored in the 3D host. These two electrodes were then assembled using a small amount of electrolyte (7 μL mAh$^{-1}$). After 50 cycles, the cell was disassembled, paired the cycled NCM 523 cathode, and 3D host were paired with Li counter electrodes. A fresh electrolyte was also added. The new Li (fresh)|NCM 523 (cycled) cell was charged to 4.2 V. This new cell showed a capacity of 0.27 mAh cm$^{-2}$ (FIG. 44B). It was assumed based on these results that about 0.27 mAh cm$^{-2}$ was left in the cycled NCM 523 electrode.

The 3D host has released 5.02 mAh cm$^{-2}$ Li in the delithiation process (FIG. 44C). The total Li that was left in the NCM 523 cathode and the 3D host was 5.3 mAh cm$^{-2}$ (FIG. 44D). Based on these results, it was determined that about 53% of Li was left in the cell after cycling. The Li leftover in the protected Li|NCM 523 cell (FIG. 45) was measured using the same method described above in the discussion of FIG. 44.

The devices, systems, and methods of the appended claims are not limited in scope by the specific devices, systems, and methods described herein, which are intended as illustrations of a few aspects of the claims. Any devices, systems, and methods that are functionally equivalent are intended to fall within the scope of the claims. Various modifications of the devices, systems, and methods in addition to those shown and described herein, are intended to fall within the scope of the appended claims. Further, while only certain representative devices, systems, and method steps disclosed herein are specifically described, other combinations of the devices, systems, and method steps also are intended to fall within the scope of the appended claims, even if not specifically recited. Thus, a combination of steps, elements, components, or constituents may be explicitly mentioned herein or less; however, other combinations of steps, elements, components, and constituents are included, even though not explicitly stated.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove and that many modifications and other embodiments are intended to be included within the scope of the appended claims. Moreover, although specific terms are employed herein, as well as in the claims which follow, they are used only in a generic and descriptive sense and not for the purposes of limiting the described invention nor the claims which follow.

Unless defined otherwise, all technical and scientific terms used herein have the same meanings as commonly understood by one of skill in the art to which the disclosed invention belongs. Publications cited herein and the materials for which they are cited are specifically incorporated by reference.

The claims are not intended to include, and should not be interpreted to include, means-plus- or step-plus-function limitations, unless such a limitation is explicitly recited in a given claim using the phrase(s) "means for" or "step for," respectively.

In view of the described processes and compositions, hereinbelow are described certain more particularly described aspects of the inventions. These particularly recited aspects should not, however, be interpreted to have any limiting effect on any different claims containing different or more general teachings described herein, or that the "particular" aspects are somehow limited in some way other than the inherent meanings of the language and formulas literally used therein.

Aspect 1: A reactive polymer composite comprising a reactive functionalized polymer having a main polymer chain with functionalization along the main polymer chain, wherein the functionalization comprises one or more functional groups that are configured to react with a metal electrode to form a polymeric metal salt and one or more functional groups configured to electrochemically decompose.

Aspect 2: The reactive polymer composite of Aspect 1, wherein the reactive polymer composite further comprises a filler from greater than 0 to about 60 wt %.

Aspect 3: The reactive polymer composite of any one of Aspects 1-2, wherein the main polymer chain comprises an aliphatic backbone, a polyaromatic backbone, a polycyclic backbone, a polysaccharide backbone, or any combination thereof.

Aspect 4: The reactive polymer composite of any one of Aspects 1-3, wherein the one or more the functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH-SO_2-F$, $N(R^1)-SF_3$ group, $SO_2-N(F)-SO_2-R^2$ group, substituted or unsubstituted fluoropyridinium triflate; wherein L is independently selected from null, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, —NH—, pyridine, and wherein L is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein $R^1$ and $R^2$, each independent of the other, selected from hydrogen, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, amine, pyridine, and wherein each of $R^1$ and $R^2$ independent of the other, is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

Aspect 5: The reactive polymer composite of any one of Aspects 2-4, wherein the filler comprises graphene oxide, reduced graphene oxide, borophene, molybdenite, silicon oxide, metal oxide, metal halides, or any combination thereof.

Aspect 6: The reactive polymer composite of any one of Aspects 1-5, wherein the reactive functionalized polymer comprises one or more monomeric units selected from:

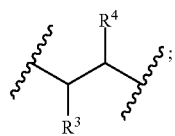

wherein

R³ is independently selected at each occurrence from an epoxide group; a cyclic acetal group; a cyclic carbonate group; and R⁴ is hydrogen; or R³ and R⁴ are brought together with the carbons to which they are attached to form a cyclic carbonate group.

Aspect 7: The reactive polymer composite of any one of Aspects 1-6, wherein the polymer comprises one or more of

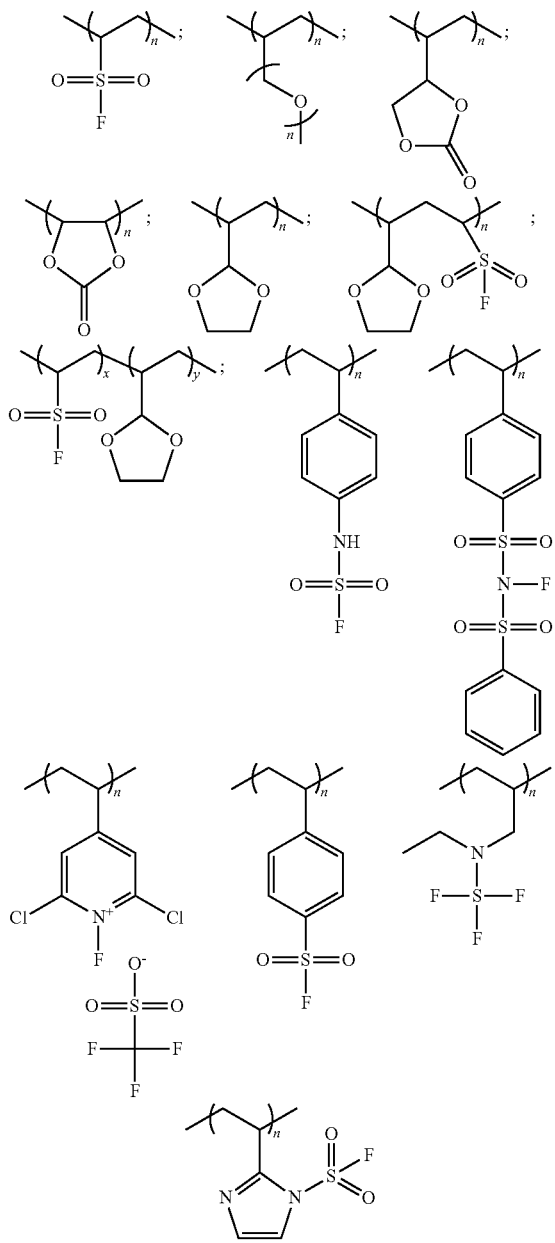

wherein n is an integer number from 1 to 100, and wherein x and y each, independently, is an integer number from 1 to 100 and present in a ration from 1:10 to 10:1.

Aspect 8: The reactive polymer composite of any one of Aspects 1-7, wherein the metal electrode comprises lithium, sodium, zinc, or any alloys thereof.

Aspect 9: The reactive polymer composite of any one of Aspects 2-8, wherein the reactive polymer composite is lamellar.

Aspect 10: An electrode comprising: a) an active electrode material comprising a metal; b) reactive polymer composite comprising a reactive functionalized polymer having a main polymer chain with functionalization along the main polymer chain, wherein the functionalization comprises one or more functional groups that are configured to react with a metal electrode to form a polymeric metal salt and one, or more functional groups configured to electrochemically decompose; and c) a solid-electrolyte interphase layer, wherein the solid-electrolyte interphase layer comprises the polymeric metal salt.

Aspect 11: The electrode of Aspect 10, wherein the reactive polymer composite further comprises a filler from greater than 0 to about 60 wt %.

Aspect 12: The electrode of any one of Aspects 10-11, wherein the main polymer chain comprises an aliphatic backbone, a polyaromatic backbone, a polycyclic backbone, a polysaccharide backbone, or any combination thereof.

Aspect 13: The electrode of any one of Aspects 10-12, wherein the one or more functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH$—$SO_2$—F, $N(R^1)$—$SF_3$ group, $SO_2$—N(F)—$SO_2$—$R^2$ group, substituted or unsubstituted fluoropyridinium triflate; wherein L is independently selected from null, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, —NH—, pyridine, and wherein L is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein $R^1$ and $R^2$, each independent of the other, selected from hydrogen, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, amine, pyridine, and wherein each of $R^1$ and $R^2$ independent of the other, is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl. Aspect 14: The electrode of any one of Aspects 10-13, wherein the filler comprises graphene oxide, reduced graphene oxide, borophene, molybdenite, silicon oxide, metal oxide, metal halides, or any combination thereof.

Aspect 15: The electrode of any one of Aspects 10-14, wherein the reactive functionalized polymer comprises one or more monomeric units selected from:

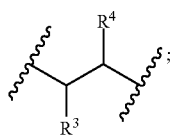

wherein
R³ is independently selected at each occurrence from an epoxide group; a cyclic acetal group; a cyclic carbonate group; and R⁴ is hydrogen; or R³ and R⁴ are brought together with the carbons to which they are attached to form a cyclic carbonate group.

Aspect 16: The electrode of any one of Aspects 10-15, wherein the polymer comprises one or more of

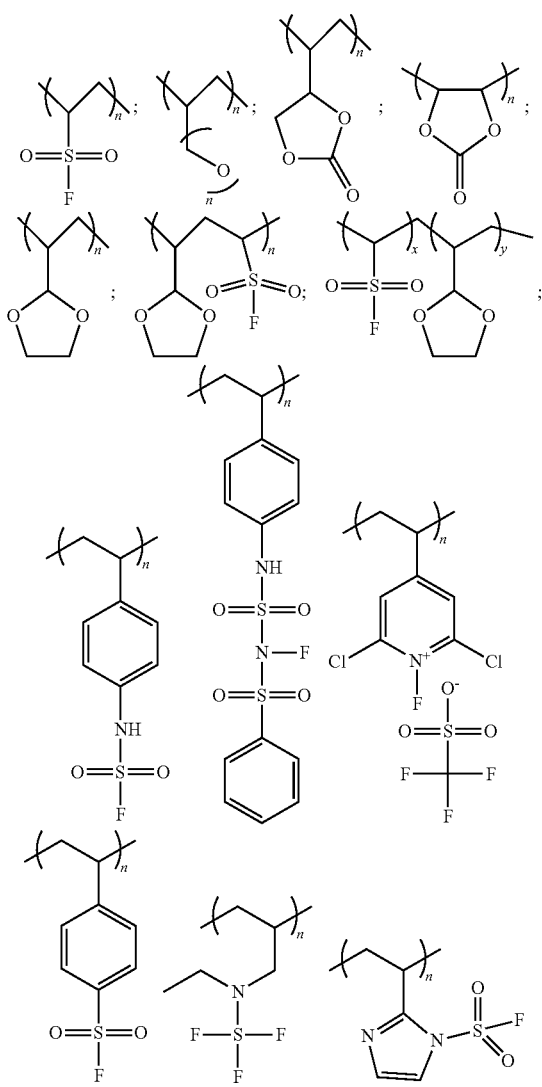

wherein n is an integer number from 1 to 100, and wherein x and y each, independently, is an integer number from 1 to 100 and present in a ration from 1:10 to 10:1.

Aspect 17: The electrode of any one of Aspects 10-16, wherein the reactive polymer composite is lamellar.

Aspect 18: The electrode of any one of Aspects 10-17, wherein the metal comprises lithium, sodium, zinc, or any alloys thereof.

Aspect 19: The electrode of any one of Aspects 10-18, wherein the solid-electrolyte interphase layer further comprises one or more metal salts.

Aspect 20: The electrode of any one of Aspects 11-19, wherein the solid-electrolyte interphase layer comprises the filler.

Aspect 21: The electrode of any one of Aspects 10-20, wherein the solid-electrolyte interphase layer is homogeneous.

Aspect 22: The electrode of any one of Aspects 10-21, wherein the electrode is configured to maintain substantially defect-free morphology for about 600 charge/discharge cycles in an electrolyte solution.

Aspect 23: The electrode of any one of Aspects 10-22, wherein the solid-electrolyte interphase layer has a thickness from about 50 nm to about 200 nm.

Aspect 24: The electrode of any one of Aspects 10-23, wherein the solid-electrolyte interphase layer is substantially stable at a temperature from about −10° C. to about 50° C.

Aspect 25: The electrode of any one of Aspects 10-24, wherein the reactive polymer composite has a thickness from about 500 nm to about 10 microns.

Aspect 26: The electrode of any one of Aspects 10-25, wherein the electrode further comprises a 3-D host material.

Aspect 27: A battery comprising: a) an anode material comprising: i) an active electrode material comprising a metal; ii) a reactive polymer composite comprising a reactive functionalized polymer having a main polymer chain with functionalization along the main polymer chain, wherein the functionalization comprises one or more functional groups that are configured to react with a metal electrode to form a polymeric metal salt and one or more functional groups configured to electrochemically decompose; and iii) a solid-electrolyte interphase layer, wherein the solid-electrolyte interphase layer comprises the polymeric metal salt; and b) an electrolyte; and c) a cathode, and wherein the battery exhibits substantially stable cycling for at least 600 cycles.

Aspect 28: The battery of Aspect 27, wherein the reactive polymer composite further comprises a filler from greater than 0 to about 60 wt %.

Aspect 29: The battery of any one of Aspects 27-28, wherein the main polymer chain comprises an aliphatic backbone, a polyaromatic backbone, a polycyclic backbone, a polysaccharide backbone, or any combination thereof.

Aspect 30: The battery of any one of Aspects 27-29, wherein the one or more functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH-SO_2-F$, $N(R')-SF_3$ group, $SO_2-N(F)-SO_2-R^2$ group, substituted or unsubstituted fluoropyridinium triflate; wherein L is independently selected from null, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, $-NH-$, pyridine, and wherein L is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein $R^1$ and $R^2$, each independent of the other, selected from hydrogen, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, amine, pyridine, and wherein each of $R^1$ and $R^2$ independent of the other, is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

Aspect 31: The battery of any one of Aspects 27-30, wherein the filler comprises graphene oxide, reduced graphene oxide, borophene, molybdenite, silicon oxide, metal oxide, metal halides, or any combination thereof.

Aspect 32: The battery of any one of Aspects 27-31, wherein the reactive functionalized polymer comprises one or more monomeric units selected from:

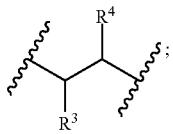

wherein $R^3$ is independently selected at each occurrence from an epoxide group; a cyclic acetal group; a cyclic carbonate group; and $R^4$ is hydrogen; or $R^3$ and $R^4$ are brought together with the carbons to which they are attached to form a cyclic carbonate group.

Aspect 33: The battery of any one of Aspects 27-32, wherein the polymer comprises one or more of

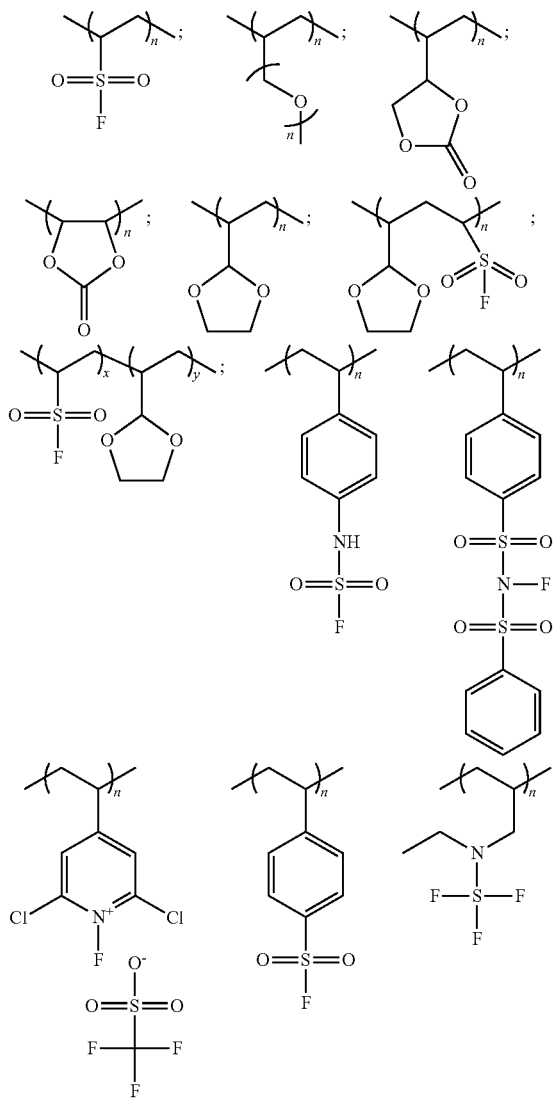

-continued

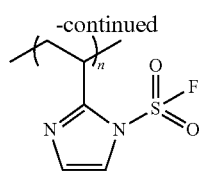

wherein n is an integer number from 1 to 100, and wherein x and y each, independently, is an integer number from 1 to 100 and present in a ration from 1:10 to 10:1.

Aspect 34: The battery of any one of Aspects 28-33, wherein the reactive polymer composite is lamellar.

Aspect 35: The battery of any one of Aspects 27-34, wherein the metal comprises lithium, sodium, zinc, or any alloys thereof.

Aspect 36: The battery of any one of Aspects 27-35, wherein the solid-electrolyte interphase layer further comprises one or more metal salts.

Aspect 37: The battery of any one of Aspects 28-36, wherein the solid-electrolyte interphase comprises the filler.

Aspect 38: The battery of any one of Aspects 27-37, wherein the solid-electrolyte interphase layer is homogeneous.

Aspect 39: The battery of any one of Aspects 27-39, wherein the electrode is configured to maintain substantially defect-free morphology for about 600 charge/discharge cycles in the electrolyte.

Aspect 40: The battery of any one of Aspects 27-39, wherein the solid-electrolyte interphase layer has a thickness from about 50 nm to about 200 nm.

Aspect 41: The battery of any one of Aspects 27-40, wherein the reactive polymer composite has a thickness from about 500 nm to about 10 microns.

Aspect 42: The battery of any one of Aspects 27-41, wherein the electrode further comprises a 3-D host material.

Aspect 43: The battery of any one of Aspects 27-42, wherein the battery exhibits an electrolyte-to-capacity ratio of less than about 15 μL mAh$^{-1}$.

Aspect 44: The battery of any one of Aspects 27-43, wherein the battery exhibits a coulombic efficiency for a metal deposition greater than about 95% when measured at a predetermined current density.

Aspect 45: The battery of Aspect 44, wherein the predetermined current density is from about 0.1 mAh cm$^{-2}$ to about 10 mAh cm$^{-2}$.

Aspect 46: The battery of any one of Aspects 27-45, wherein the battery exhibits electrolyte retention of at least 70% after at least 100 cycles.

Aspect 47: The battery of any one of Aspects 27-46, wherein the solid-electrolyte interphase layer is substantially stable at a temperature from about −10° C. to about 50° C.

Aspect 48: A method comprising: disposing a reactive polymer composite on an active electrode material, wherein the reactive polymer composite comprises a reactive functionalized polymer having a main polymer chain with functionalization along the main polymer chain, wherein the functionalization comprises one or more functional groups that are configured to react with a metal electrode to form a polymeric metal salt and one or more functional groups configured to electrochemically decompose; and wherein the active electrode material comprises a metal; and forming an electrode comprising a solid-electrolyte interphase layer comprising the polymeric metal salt.

Aspect 49: The method of Aspect 48, wherein the reactive polymer composite further comprises a filler from greater than 0 to about 60 wt %.

Aspect 50: The method of any one of Aspects 48-49, wherein the main polymer chain comprises an aliphatic backbone, a polyaromatic backbone, a polycyclic backbone, a polysaccharide backbone, or any combination thereof.

Aspect 51: The method of any one of Aspects 48-50, wherein the one or more functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH—SO_2—F$, $N(R^1)—SF_3$ group, $SO_2—N$ $(F)—SO_2—R^2$ group, substituted or unsubstituted fluoropyridinium triflate; wherein L is independently selected from null, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, —NH—, pyridine, and wherein L is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein $R^1$ and $R^2$, each independent of the other, selected from hydrogen, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, amine, pyridine, and wherein each of $R^1$ and $R^2$ independent of the other, is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

Aspect 52: The method of any one of Aspects 48-51, wherein the filler comprises graphene oxide, reduced graphene oxide, borophene, molybdenite, silicon oxide, metal oxide, metal halides, or any combination thereof.

Aspect 53: The method of any one of Aspects 48-52, wherein the reactive functionalized polymer comprises one or more monomeric units selected from:

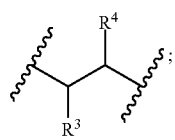

wherein
$R^3$ is independently selected at each occurrence from an epoxide group; a cyclic acetal group; a cyclic carbonate group; and $R^4$ is hydrogen; or $R^3$ and $R^4$ are brought together with the carbons to which they are attached to form a cyclic carbonate group.

Aspect 54: The method of any one of Aspects 48-53, wherein the polymer comprises one or more of

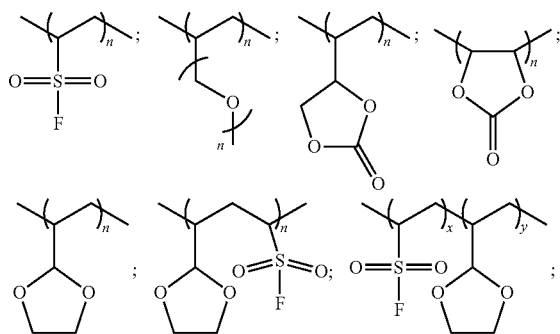

wherein n is an integer number from 1 to 100, and wherein x and y each, independently, is an integer number from 1 to 100 and present in a ration from 1:10 to 10:1.

Aspect 55: The method of any one of Aspects 49-54, wherein the reactive polymer composite is lamellar.

Aspect 56: The method of any one of Aspects 48-55, wherein the metal comprises lithium, sodium, zinc, or any alloys thereof.

Aspect 57: The method of any one of Aspects 48-55, wherein the solid-electrolyte interphase layer further comprises one or more metal salts.

Aspect 58: The method of any one of Aspects s 49-57, wherein the solid-electrolyte interphase layer comprises the filler.

Aspect 59: The method of any one of Aspects 48-58, wherein the solid-electrolyte interphase layer is homogeneous.

Aspect 60: The method of any one of Aspects 48-59, wherein the electrode is configured to maintain substantially defect-free morphology for about 600 charge/discharge cycles in an electrolyte solution.

Aspect 61: The method of any one of Aspects 48-60, wherein the solid-electrolyte interphase layer has a thickness from about 50 nm to about 200 nm.

Aspect 62: The method of any one of Aspects 48-61, wherein the solid-electrolyte interphase layer is substantially stable at a temperature from about −10° C. to about 50° C.

Aspect 63: The method of any one of Aspects 48-62, wherein the reactive polymer composite has a thickness from about 500 nm to about 10 microns.

Aspect 64: The method of any one of Aspects 48-63, wherein the metal is deposited on a 3-D host material to form the active electrode material.

Aspect 65: A method comprising: providing a) an electrode of any one of claims 10-26, wherein the electrode is an anode; b) an electrolyte; and c) a cathode to form a battery exhibiting substantially stable cycling for at least 600 cycles.

Aspect 66: The method of Aspect 65, wherein the battery exhibits an electrolyte-to-capacity ratio of less than about 15 µL mAh$^{-1}$.

Aspect 67: The method of Aspect 65 or 66, wherein the battery exhibits a coulombic efficiency for a metal deposition greater than about 95% as measured at a predetermined current density.

Aspect 68: The method of any one of Aspects 65-67, wherein the predetermined current density is from about 0.1 mAh cm$^{-2}$ to about 10 mAh cm$^{-2}$.

Aspect 69: The method of any one of Aspects 65-68, wherein the battery exhibits electrolyte retention of at least 70% after at least 100 cycles.

REFERENCES

1. Tarascon, J. M. & Armand, M. Issues and challenges facing rechargeable lithium batteries. *Nature* 414, 359-67 (2001).
2. Goodenough, J. B. & Park, K.-S. S. The Li-ion rechargeable battery: A perspective. *J. Am. Chem. Soc.* 135, 1167-76 (2013).
3. Choi, N. S. et al. Challenges facing lithium batteries and electrical double-layer capacitors. *Angew. Chemie-Int. Ed.* 51, 9994-10024 (2012).
4. Kim, H. et al. Metallic anodes for next generation secondary batteries. *Chem. Soc. Rev.* 42, 9011-34 (2013).
5. Peled, E. & Menkin, S. Review-SEI: Past, Present and Future. *J. Electrochem. Soc.* 164, A1703-A1719 (2017).
6. Aurbach, D. Review of selected electrode-solution interactions which determine the performance of Li and Li ion batteries. *J. Power Sources* 89, 206-218 (2000).
7. Lin, D., Liu, Y. & Cui, Y. Reviving the lithium metal anode for high-energy batteries. *Nat. Nanotechnol.* 12, 194-206 (2017).
8. Xu, W. et al. Lithium metal anodes for rechargeable batteries. *Energy Environ. Sci.* 7, 513-537 (2014).
9. Cheng, X. B., Zhang, R., Zhao, C. Z. & Zhang, Q. Toward Safe Lithium Metal Anode in Rechargeable Batteries: A Review. *Chem. Rev.* 117, 10403-10473 (2017).
10. Tikekar, M. D., Choudhury, S., Tu, Z. & Archer, L. A. Design principles for electrolytes and interfaces for stable lithium-metal batteries. *Nat. Energy* 1, 16114 (2016).
11. Sacci, R. L. et al. Direct visualization of initial SEI morphology and growth kinetics during lithium deposition by in situ electrochemical transmission electron microscopy. *Chem. Commun.* 50, 2104 (2014).
12. Lin, D. et al. Layered reduced graphene oxide with nanoscale interlayer gaps as a stable host for lithium metal anodes. *Nat. Nanotechnol.* 11, 626-632 (2016).
13. Ye, H. et al. Stable Li Plating/Stripping Electrochemistry Realized by a Hybrid Li Reservoir in Spherical Carbon Granules with 3D Conducting Skeletons. *J. Am. Chem. Soc.* 139, 5916-5922 (2017).
14. Yan, K. et al. Selective deposition and stable encapsulation of lithium through heterogeneous seeded growth. *Nat. Energy* 1, 16010 (2016).
15. Li, G. et al. Stable metal battery anodes enabled by polyethylenimine sponge hosts by way of electrokinetic effects. *Nat. Energy* 3, 1076-1083 (2018).
16. Tung, S.-O., Ho, S., Yang, M., Zhang, R. & Kotov, N. A. A dendrite-suppressing composite ion conductor from aramid nanofibres. *Nat. Commun.* 6, 6152 (2015).
17. Cheng, X.-B. et al. Nanodiamonds suppress the growth of lithium dendrites. *Nat. Commun.* 8, 336 (2017).
18. Li, N.-W., Yin, Y.-X., Yang, C.-P. & Guo, Y.-G. An Artificial Solid Electrolyte Interphase Layer for Stable Lithium Metal Anodes. *Adv. Mater.* 28, 1853-1858 (2016).
19. Dudney, N. J. Addition of a thin-film inorganic solid electrolyte (Lipon) as a protective film in lithium batteries with a liquid electrolyte. *J. Power Sources* 89, 176-179 (2000).
20. Kazyak, E., Wood, K. N. & Dasgupta, N. P. Improved Cycle Life and Stability of Lithium Metal Anodes through Ultrathin Atomic Layer Deposition Surface Treatments. *Chem. Mater.* 27, 6457-6462 (2015).
21. Zhao, J. et al. Surface Fluorination of Reactive Battery Anode Materials for Enhanced Stability. *J. Am. Chem. Soc.* 139, 11550-11558 (2017).
22. Liang, X. et al. A facile surface chemistry route to a stabilized lithium metal anode. *Nat. Energy* 6, 17119 (2017).
23. Tu, Z. et al. Designing Artificial Solid-Electrolyte Interphases for Single-Ion and High-Efficiency Transport in Batteries. *Joule* 1, 394-406 (2017).
24. Liu, K. et al. Lithium Metal Anodes with an Adaptive "Solid-Liquid" Interfacial Protective Layer. *J. Am. Chem. Soc.* 139, 4815-4820 (2017).
25. Choi, S. M. et al. Cycling characteristics of lithium metal batteries assembled with a surface modified lithium electrode. *J. Power Sources* 244, 363-368 (2013).
26. Qian, J. et al. High rate and stable cycling of lithium metal anode. *Nat. Commun.* 6, 6362 (2015).
27. Suo, L., Hu, Y.-S., Li, H., Armand, M. & Chen, L. A new class of Solvent-in-Salt electrolyte for high-energy rechargeable metallic lithium batteries. *Nat. Commun.* 4, 1481 (2013).
28. Basile, A., Bhatt, A. I. & O'Mullane, A. P. Stabilizing lithium metal using ionic liquids for long-lived batteries. *Nat. Commun.* 7, ncomms11794 (2016).
29. Lu, Y., Korf, K., Kambe, Y., Tu, Z. & Archer, L. A. Ionic-liquid-nanoparticle hybrid electrolytes: Applications in lithium metal batteries. *Angew. Chemie-Int. Ed.* 53, 488-492 (2014).
30. Fan, X. et al. Non-flammable electrolyte enables Li-metal batteries with aggressive cathode chemistries. *Nat. Nanotechnol.* 1-8 (2018).
31. Zheng, J. et al. Electrolyte additive enabled fast charging and stable cycling lithium metal batteries. *Nat. Energy* 2, 17012 (2017).
32. Lu, Y., Tu, Z. & Archer, L. A. Stable lithium electrodeposition in liquid and nanoporous solid electrolytes. *Nat. Mater.* 13, 961-969 (2014).
33. Markevich, E., Salitra, G. & Aurbach, D. Fluoroethylene Carbonate as an Important Component for the Formation of an Effective Solid Electrolyte Interphase on Anodes and Cathodes for Advanced Li-Ion Batteries. *ACS Energy Lett.* 2, 1337-1345 (2017).
34. Zhang, Y. et al. Dendrite-free lithium deposition with self-aligned nanorod structure. *Nano Lett.* 14, 6889-6896 (2014).
35. Chen, S. et al. Functional Organosulfide Electrolyte Promotes an Alternate Reaction Pathway to Achieve High Performance in Lithium-Sulfur Batteries. *Angew. Chemie Int. Ed.* 55, 4231-4235 (2016).
36. Ding, F. et al. Dendrite-Free Lithium Deposition via Self-Healing Electrostatic Shield Mechanism. *J. Am. Chem. Soc.* 135, 4450-4456 (2013).
37. Li, G. et al. Organosulfide-plasticized solid-electrolyte interphase layer enables stable lithium metal anodes for long-cycle lithium-sulfur batteries. *Nat. Commun.* 8, 850 (2017).
38. Zhang, H. et al. Electrolyte additives for lithium metal anodes and rechargeable lithium metal batteries: progresses and perspectives. *Angew. Chemie* Int. Ed. (2018). doi:dx.doi.org/10.1002/anie.201712702
39. Aurbach, D., Zinigrad, E., Cohen, Y. & Teller, H. A short review of failure mechanisms of lithium metal and lithiated graphite anodes in liquid electrolyte solutions. *Solid State Ionics* 148, 405-416 (2002).
40. Gao, Y. et al. Interfacial Chemistry Regulation via a Skin-Grafting Strategy Enables High-Performance Lithium-Metal Batteries. *J. Am. Chem. Soc.* 139, 15288-15291 (2017).
41. Gao, Y. et al. Salt-Based Organic-Inorganic Nanocomposites: Towards A Stable Lithium Metal/$Li_{10}GeP_2S_{12}$ Solid Electrolyte Interface. *Angew. Chemie Int. Ed.* 57, 13608-13612 (2018).
42. Li, Y. et al. Atomic structure of sensitive battery materials and interfaces revealed by cryo-electron microscopy. *Science* (80-.). 358, 506-510 (2017).
43. Wang, X. et al. New Insights on the Structure of Electrochemically Deposited Lithium Metal and Its Solid Electrolyte Interphases via Cryogenic TEM. *Nano Lett.* 17, 7606-7612 (2017).
44. Zachman, M. J., Tu, Z., Choudhury, S., Archer, L. A. & Kourkoutis, L. F. Cryo-STEM mapping of solid-liquid interfaces and dendrites in lithium-metal batteries. *Nature* 560, 345-349 (2018).
45. Foroozan, T. et al. Synergistic Effect of Graphene Oxide for Impeding the Dendritic Plating of Li. *Adv. Funct. Mater.* 28, 1705917 (2018).
46. Kovtyukhova, N. I. et al. Layer-by-Layer Assembly of Ultrathin Composite Films from Micron-Sized Graphite Oxide Sheets and Polycations. *Chem. Mater.* 11, 771-778 (1999).
47. Green, C. P. & Sader, J. E. Frequency response of cantilever beams immersed in viscous fluids near a solid surface with applications to the atomic force microscope. *J. Appl. Phys.* 98, 114913 (2005).
48. Kuznetsov, V. et al. Wet Nanoindentation of the Solid Electrolyte Interphase on Thin Film Si Electrodes. *ACS Appl. Mater. Interfaces* 7, 23554-23563 (2015).
49. Greaves, G. N., Greer, A. L., Lakes, R. S. & Rouxel, T. Poisson's ratio and modern materials. *Nat. Mater.* 10, 823-837 (2011).
50. Carpick, R. W., Ogletree, D. F. & Salmeron, M. and Friction vs Load Measurements. 400, 395-400 (1999).
51. Piétrement, 0. & Troyon, M. General equations describing elastic indentation depth and normal contact stiffness versus load. *J. Colloid Interface Sci.* 226, 166-171 (2000).
52. Ebenstein, D. M. & Wahl, K. J. A comparison of JKR-based methods to analyze quasi-static and dynamic indentation force curves. *J. Colloid Interface Sci.* 298, 652-62 (2006).
53. Fujigaya, T. et al., New photoresist materials for 157-nm lithography. Poly[vinylsulfonyl fluoride-co-4-(1,1,1,3,3, 3-hexafluoro-2-hydroxypropyl)-styrene]partially protected with tert-butoxycarbonyl. *Chem. Mater.* 15, 1512-1517 (2003).
54. El Ouatani, L. et al., The Effect of Vinylene Carbonate Additive on Surface Film Formation on Both Electrodes in Li-Ion Batteries. *J. Electrochem. Soc.* 156, A103 (2009).
55. Gao, Y. et al. Salt-Based Organic-inorganic Nanocomposites: Towards A Stable Lithium Metal/Li 10 GeP 2 S 12 Solid Electrolyte Interface. *Angew. Chemie Int. Ed.* 57, 13608-13612 (2018).
56. Meyer, B. M., Leifer, N., Sakamoto, S., Greenbaum, S. G. & Grey, C. P. High Field Multinuclear NMR Investigation of the SEI Layer in Lithium Rechargeable Batteries. *Electrochem. Solid-State Lett.* 8, A145 (2005).
57. Gao, Y. et al. Interfacial Chemistry Regulation via a Skin-Grafting Strategy Enables High-Performance Lithium-Metal Batteries. *J. Am. Chem. Soc.* 139, 15288-15291 (2017).
58. Gao, Y. et al. General Method of Manipulating Formation, Composition, and Morphology of Solid-Electrolyte Interphases for Stable Li-Alloy Anodes. *J. Am. Chem. Soc.* 139, 17359-17367 (2017).
59. Li, N.-W., Yin, Y.-X., Yang, C.-P. & Guo, Y.-G. An Artificial Solid Electrolyte Interphase Layer for Stable Lithium Metal Anodes. *Adv. Mater.* 28, 1853-1858 (2016).
60. Li, G. et al. Organosulfide-plasticized solid-electrolyte interphase layer enables stable lithium metal anodes for long-cycle lithium-sulfur batteries. *Nat. Commun.* 8, 850 (2017).
61. Foroozan, T. et al. Synergistic Effect of Graphene Oxide for Impeding the Dendritic Plating of Li. *Adv. Funct. Mater.* 28, 1705917 (2018).

What is claimed is:

1. A reactive polymer composite comprising a reactive functionalized polymer having a main polymer chain with functionalization along the main polymer chain, wherein the functionalization comprises one or more functional groups that are configured to react with a metal electrode to form a polymeric metal salt and one or more functional groups configured to electrochemically decompose to generate a stable solid electrolyte interphase (SEI) layer on the metal electrode.

2. The reactive polymer composite of claim 1, wherein the reactive polymer composite further comprises a filler from greater than 0 to about 60 wt %, and wherein the filler comprises graphene oxide, reduced graphene oxide, borophene, molybdenite, silicon oxide, metal oxide, metal halides, or any combination thereof.

3. The reactive polymer composite of claim 1, wherein the main polymer chain comprises an aliphatic backbone, a polyaromatic backbone, a polycyclic backbone, a polysaccharide backbone, or any combination thereof.

4. The reactive polymer composite of claim 1, wherein the one or more functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH-SO_2-F$, $N(R')-SF_3$ group, $SO_2-N(F)-SO_2-R^2$ group, substituted or unsubstituted fluoropyridinium triflate; wherein L is independently selected from null, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, —NH—, pyridine, and wherein L is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and wherein $R^1$ and $R^2$, each independent of the other, selected from hydrogen, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, amine, pyridine, and wherein each of $R^1$ and $R^2$ independent of the other, is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

5. The reactive polymer composite of claim 1, wherein the reactive functionalized polymer comprises one or more monomeric units selected from:

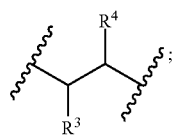

wherein
$R^3$ is independently selected at each occurrence from an epoxide group; a cyclic acetal group;
a cyclic carbonate group; and
$R^4$ is hydrogen; or
$R^3$ and $R^4$ are brought together with the carbons to which they are attached to form a cyclic carbonate group.

6. The reactive polymer composite of claim 1, wherein the polymer comprises one or more of

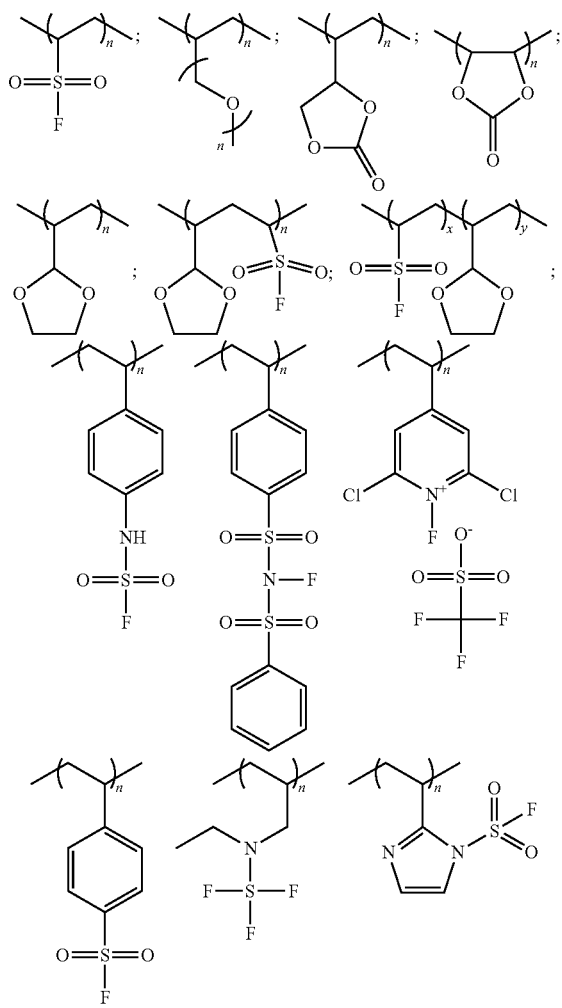

wherein n is an integer number from 1 to 100, and wherein x and y each, independently, is an integer number from 1 to 100 and present in a ration from 1:10 to 10:1.

7. The reactive polymer composite of claim 1, wherein the metal electrode comprises lithium, sodium, zinc, or any alloys thereof.

8. An electrode comprising:
a) an active electrode material comprising a metal;
b) a reactive polymer composite comprising a reactive functionalized polymer having a main polymer chain with functionalization along the main polymer chain, wherein the functionalization comprises one or more functional groups that are configured to react with a metal electrode to form a polymeric metal salt and one or more functional groups configured to electrochemically decompose; and
c) a solid-electrolyte interphase layer, wherein the solid-electrolyte interphase layer comprises the polymeric metal salt, and
wherein the solid-electrolyte interphase layer is a product of a reaction between the metal and the reactive polymer composite and/or
wherein the solid-electrolyte interphase layer is a product of the decomposition of one or more functional groups.

9. The electrode of claim 8, wherein the reactive polymer composite further comprises a filler from greater than 0 to about 60 wt %, and wherein the filler comprises graphene oxide, reduced graphene oxide, borophene, molybdenite, silicon oxide, metal oxide, metal halides, or any combination thereof.

10. The electrode of claim 8, wherein the main polymer chain comprises an aliphatic backbone, a polyaromatic backbone, a polycyclic backbone, a polysaccharide backbone, or any combination thereof.

11. The electrode of claim 8, wherein the one or more functional groups are linked to the main polymer chain via linker L and comprise one or more of a sulfonyl halide, a metal sulfonate, a cyclic sulfone, a cyclic ether, a cyclic carbonate, a linear ether, an epoxide group, a cyclic acetal group, a cyclic carbonate ester group, $SO_2F$ group, $NH-SO_2-F$, $N(R^1)-SF_3$ group, $SO_2-N(F)-SO_2-R^2$ group, substituted or unsubstituted fluoropyridinium triflate; wherein
L is independently selected from null, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, —NH—, pyridine, and wherein L is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl; and
wherein $R^1$ and $R^2$, each independent of the other, selected from hydrogen, $C_1$-$C_{10}$ alkyl, $C_1$-$C_{10}$ alkoxy, $C_6$-$C_{14}$ aryl, $C_1$-$C_{14}$ heteroaryl, $C_6$-$C_{14}$ aryloxy, imidazole, amine, pyridine, and wherein each of $R^1$ and $R^2$ independent of the other, is optionally substituted with $C_1$-$C_{10}$ alkyl, $C_1$-$C_{10}$ alkoxy, $C_2$-$C_{10}$ alkenyl, $C_2$-$C_{10}$ alkynyl, $C_6$-$C_{14}$ aryl, $C_1$-$C_{14}$ heteroaryl, amino, carbonyl, ester, ether, halide, carboxyl, hydroxy, nitro, cyano, silyl, sulfo-oxo, sulfonyl, sulfone, sulfoxide, thiol, or phosphonyl.

12. The electrode of claim 8, wherein the reactive functionalized polymer comprises one or more monomeric units selected from:

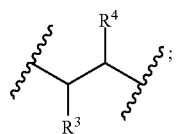

wherein
R³ is independently selected at each occurrence from an epoxide group; a cyclic acetal group;
a cyclic carbonate group; and
R⁴ is hydrogen; or
R³ and R⁴ are brought together with the carbons to which they are attached to form a cyclic carbonate group.

13. The electrode of claim 8, wherein the polymer comprises one or more of

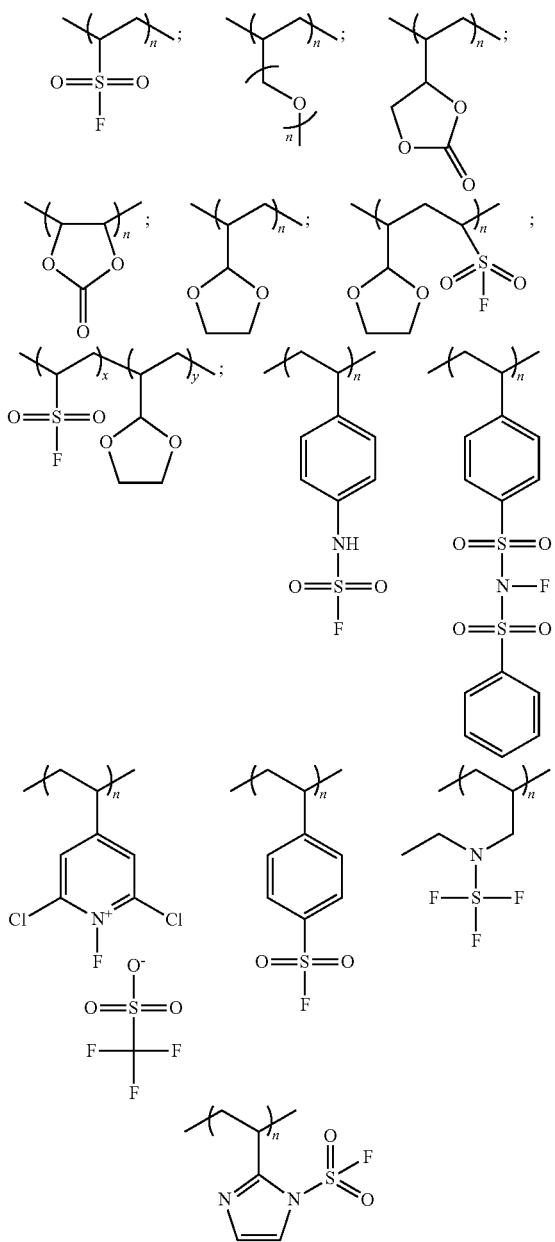

wherein n is an integer number from 1 to 100, and wherein x and y each, independently, is an integer number from 1 to 100 and present in a ratio from 1:10 to 10:1.

14. The electrode of claim 8, wherein the metal comprises lithium, sodium, zinc, or any alloys thereof.

15. The electrode of claim 8, wherein the solid-electrolyte interphase layer further comprises one or more metal salts, and wherein the solid-electrolyte interphase has a thickness from about 50 nm to about 200 nm.

16. The electrode of claim 8, wherein the electrode is configured to maintain substantially defect-free morphology for about 600 charge/discharge cycles in an electrolyte solution.

17. The electrode of claim 8, wherein the solid-electrolyte interphase layer is substantially stable at a temperature from about −10° C. to about 50° C.

18. The electrode of claim 8, wherein the electrode further comprises a 3-D host material.

19. A battery comprising:
a) the anode material of claim 8:
b) an electrolyte; and
c) a cathode, and
wherein the battery exhibits substantially stable cycling for at least 600 cycles.

20. The battery of claim 19, wherein the electrode is configured to maintain substantially defect-free morphology for about 600 charge/discharge cycles in the electrolyte.

21. The battery of claim 19, wherein the battery exhibits an electrolyte-to-capacity ratio of less than about 15 μL $mAh^{-1}$.

22. The battery of claim 19, wherein the battery exhibits a coulombic efficiency for a metal deposition greater than about 95% when measured at a predetermined current density.

23. The battery of claim 22, wherein the predetermined current density is from about 0.1 mA $cm^{-2}$ to about 10 mA $cm^{-2}$.

24. The battery of claim 19, wherein the battery exhibits electrolyte retention of at least 70% after at least 100 cycles.

25. A method comprising:
disposing a reactive polymer composite on an active electrode material, wherein the reactive polymer composite comprises a reactive functionalized polymer having a main polymer chain with functionalization along the main polymer chain, wherein the functionalization comprises one or more functional groups that are configured to react with a metal electrode to form a polymeric metal salt and one or more functional groups configured to electrochemically decompose; and wherein the active electrode material comprises a metal; and
forming an electrode comprising a solid-electrolyte interphase layer comprising the polymeric metal salt, wherein the solid-electrolyte interphase layer is a product of a reaction between the metal and the reactive polymer composite and/or
wherein the solid-electrolyte interphase layer is a product of the decomposition of one or more functional groups.

26. The method of claim 25, wherein the metal is deposited on a 3-D host material to form the active electrode material.

27. A method comprising:
providing
a) the electrode of claim 8, wherein the electrode is an anode;
b) an electrolyte; and
c) a cathode to form a battery exhibiting substantially stable cycling for at least 600 cycles.

\* \* \* \* \*

UNITED STATES PATENT AND TRADEMARK OFFICE
CERTIFICATE OF CORRECTION

| | |
|---|---|
| PATENT NO. | : 12,261,298 B2 |
| APPLICATION NO. | : 17/437202 |
| DATED | : March 25, 2025 |
| INVENTOR(S) | : Wang et al. |

It is certified that error appears in the above-identified patent and that said Letters Patent is hereby corrected as shown below:

In the Specification

Column 14, Line 1, reading:
bare Li electrodes before (FIG. 21A) and after (FIG. 221B)
Should read:
bare Li electrodes before (FIG. 21A) and after (FIG. 21B)

Column 14, Line 65, reading:
($R_{interphase}$) is ~140Ω. The area of the Li anode is 2.0 cm$^{-2}$.
Should read:
($R_{interphase}$) is ~140Ω. The area of the Li anode is 2.0 cm$^2$.

Column 18, Line 17, reading:
herein, the term "Cn-Cm alkyl," employed alone or in
Should read:
herein, the term "$C_n$-$C_m$ alkyl," employed alone or in Column 19, Line 60, reading:
"CO" is a shorthand notation for C=0, which is also
Should read:
"CO" is a shorthand notation for C=O, which is also Column 33, Line 42, reading:
as shown in FIG. 11B), containing polymers, nanoscale salt
Should read:
as shown in FIG. 1B), containing polymers, nanoscale salt Column 37, Line 42, reading:
electrolyte-to-capacity ratio of less than about 15 μL mAh$^1$ Signed and Sealed this
Eighth Day of July, 2025

Coke Morgan Stewart
*Acting Director of the United States Patent and Trademark Office*

Should read:
electrolyte-to-capacity ratio of less than about 15 μL mAh$^{-1}$

Column 37, Lines 45-47, reading:
less than about 10 μL mAh$^{1}$, less than about 9 μL mAh$^{1}$, less than about 8 μL mAh$^{-1}$, less than about 7 μL mAh$^{1}$, less than about 6 μL mAh$^{1}$, or even less than about 5 μL mAh$^{1}$.
Should read:
less than about 10 μL mAh$^{-1}$, less than about 9 μL mAh$^{-1}$, less than about 8 μL mAh$^{-1}$, less than about 7 μL mAh$^{-1}$, less than about 6 μL mAh$^{-1}$, or even less than about 5 μL mAh$^{-1}$.

Column 41, Lines 37-67, reading:

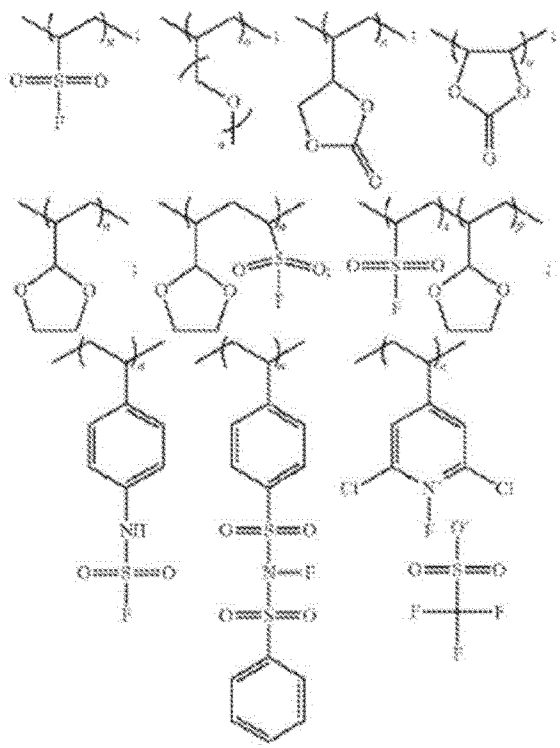

Should read:

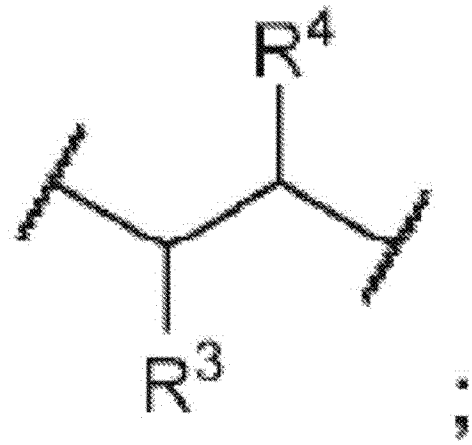

Column 42, Lines 2-12, the following structure:

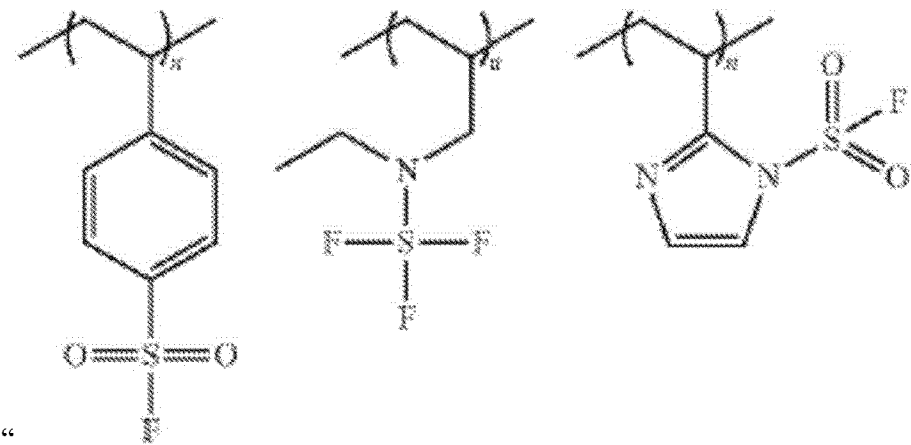

" should be deleted before the word "wherein" on Line 14

Column 44, Line 6, reading:
ited onto the surface of the host (1 cm$^{-2}$) and then vigorously
Should read:
ited onto the surface of the host (1 cm$^2$) and then vigorously Column 48, Line 19, reading:
C–O (286.2 eV in the C is spectrum and 532.3 eV in the O
Should read:
C–O (286.2 eV in the C 1s spectrum and 532.3 eV in the O Column 48, Line 37, reading:
(286.3 eV in the C is spectrum, and 532.3 eV in the O 2p
Should read:
(286.3 eV in the C 1s spectrum, and 532.3 eV in the O 2p Column 49, Line 14, reading:
--$CO_2$ (289.7 eV in the C is spectrum), and $SO_2$–F (688.3
Should read:
--$CO_2$ (289.7 eV in the C 1s spectrum), and $SO_2$–F (688.3

Column 51, Line 59, reading:
169.5 eV in the S 2p spectrum and 55.6 eV in the Li is
Should read:
169.5 eV in the S 2p spectrum and 55.6 eV in the Li 1s Column 54, Line 52, reading:
spectrum), Li–O (the peak at ~55 eV in the Li is spectrum),
Should read:
spectrum), Li–O (the peak at ~55 eV in the Li 1s spectrum), Column 56, Lines 51-52, reading:
spectrum and ~55 eV in the Li 1 s spectrum) and LiF (peaks
at ~684 eV in the F is spectrum and ~56 eV in the Li 1 s
Should read:
spectrum and ~55 eV in the Li 1s spectrum) and LiF (peaks
at ~684 eV in the F 1s spectrum and ~56 eV in the Li 1s Column 61, Line 12-18, the second formula, reading:

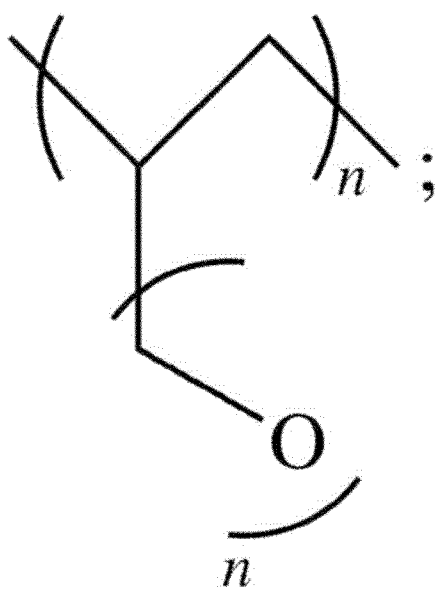

CERTIFICATE OF CORRECTION (continued)
U.S. Pat. No. 12,261,298 B2

Should read:

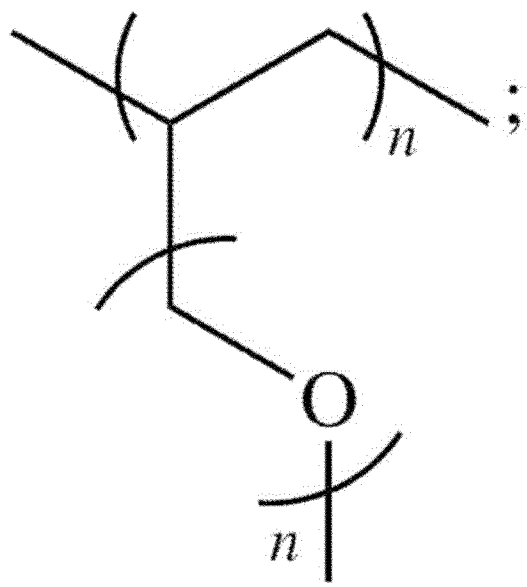

Column 61, Line 24-42, reading:

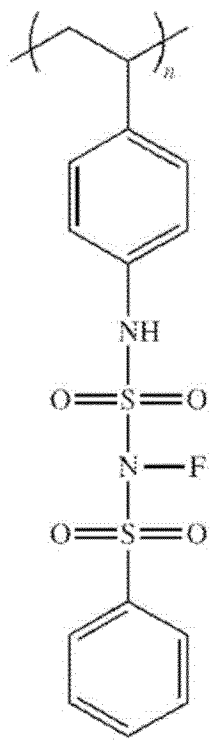

Should read:
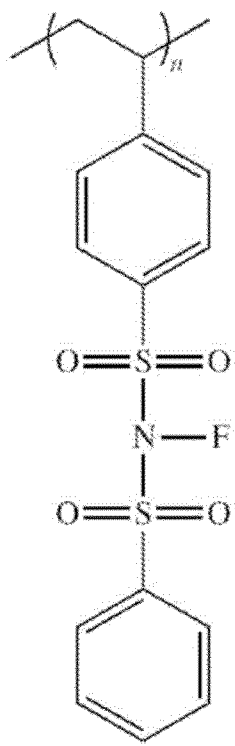
Column 62, Line 47, reading:
SO$_2$F group, NH–SO$_2$–F, N(R')–SF$_3$ group, SO$_2$–N
Should read:
SO$_2$F group, NH–SO$_2$–F, N(R$^1$)–SF$_3$ group, SO$_2$–N
In the Claims
Claim 4, Line 5, Column 70, Line 50, reading:
group, NH–SO$_2$–F, N(R')–SF$_3$ group, SO$_2$–N(F)--
Should read:
group, NH–SO$_2$–F, N(R$^1$)–SF$_3$ group, SO$_2$–N(F)--